US011263761B2

(12) United States Patent
Qian et al.

(10) Patent No.: US 11,263,761 B2
(45) Date of Patent: Mar. 1, 2022

(54) SYSTEMS AND METHODS FOR VISUAL TARGET TRACKING

(71) Applicant: SZ DJI TECHNOLOGY CO., LTD., Shenzhen (CN)

(72) Inventors: Jie Qian, Shenzhen (CN); Cong Zhao, Shenzhen (CN); Xuyang Feng, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 126 days.

(21) Appl. No.: 16/111,722

(22) Filed: Aug. 24, 2018

(65) Prior Publication Data
US 2019/0096069 A1    Mar. 28, 2019

Related U.S. Application Data

(63) Continuation of application No. PCT/CN2016/074693, filed on Feb. 26, 2016.

(51) Int. Cl.
*G06K 9/00* (2006.01)
*G06T 7/246* (2017.01)
(Continued)

(52) U.S. Cl.
CPC ............ *G06T 7/248* (2017.01); *B64C 39/024* (2013.01); *G05D 1/0094* (2013.01); *G06T 7/74* (2017.01);
(Continued)

(58) Field of Classification Search
CPC ......... G06T 7/248; G06T 7/74; B64C 39/024; G05D 1/0094
(Continued)

(56) References Cited

U.S. PATENT DOCUMENTS 5,434,617 A * 7/1995 Bianchi ................ G01S 3/7865
  348/169
6,785,080 B1 * 8/2004 Sun ..................... G11B 5/59622
  360/75
(Continued)

FOREIGN PATENT DOCUMENTS

CN    102142147 A    8/2011
CN    102750708 A    10/2012
(Continued)

OTHER PUBLICATIONS

The World Intellectual Property Organization (WIPO) International Search Report and Written Opinion for PCT/CN2016/074693 Jun. 29, 2016 7 pages.
(Continued)

*Primary Examiner* — Stephen P Coleman
(74) *Attorney, Agent, or Firm* — Anova Law Group, PLLC

(57) ABSTRACT

A method for controlling a movable object to track a target object includes determining a change in one or more features between a first image frame and a second image frame, and adjusting a movement of the movable object based on the change in the one or more features between the first image frame and the second image frame. The one or more features are associated with the target object, and the first image frame and the second image frame are captured at different points in time using an imaging device on the movable object.

19 Claims, 24 Drawing Sheets

(51) Int. Cl.
*B64C 39/02* (2006.01)
*G05D 1/00* (2006.01)
*G06T 7/73* (2017.01)

(52) U.S. Cl.
CPC .. *B64C 2201/123* (2013.01); *B64C 2201/127* (2013.01); *B64C 2201/141* (2013.01); *B64C 2201/146* (2013.01)

(58) Field of Classification Search
USPC ........................................................ 382/103
See application file for complete search history.

(56) References Cited

U.S. PATENT DOCUMENTS

| | | | |
|---|---|---|---|
| 8,554,462 | B2 | 10/2013 | Lee et al. |
| 2011/0316968 | A1* | 12/2011 | Taguchi ................... G06T 5/50 348/36 |
| 2012/0307042 | A1* | 12/2012 | Lee ....................... G05D 1/0094 348/114 |
| 2016/0031559 | A1* | 2/2016 | Zang .................... G05D 1/0038 701/2 |

FOREIGN PATENT DOCUMENTS

| | | |
|---|---|---|
| CN | 202583884 U | 12/2012 |
| CN | 103149939 A | 6/2013 |
| CN | 103604427 A | 2/2014 |
| CN | 104484868 A | 4/2015 |

OTHER PUBLICATIONS

Michael McErlean, An FPGA Implementation of Hierarchical Motion Estimation for Embedded Object Tracking, 2006 IEEE International Symposium on Signal Processing and Information Technology, IEEE, PI, Aug. 1, 2006, pp. 242-247.

* cited by examiner

Part A

Part B

SYSTEMS AND METHODS FOR VISUAL TARGET TRACKING

CROSS-REFERENCE TO RELATED APPLICATION

This application is a continuation of International Application No. PCT/CN2016/074693, filed on Feb. 26, 2016, the entire contents of which are incorporated herein by reference.

BACKGROUND

In some surveillance, reconnaissance and exploration tasks for real-world applications, a moving target object may need to be detected and tracked. A movable object carrying a payload (e.g., an aerial vehicle carrying a camera) can be used to track a target object using, for example visual tracking methods. However, existing visual tracking methods often may not account for the spatial dispositions of the aerial vehicle and/or camera relative to the target. In some cases, one or more operators may have to manually select the target object to be tracked, and manually control the aerial vehicle and/or camera to track the moving target. This limited tracking ability may reduce the usefulness of aerial vehicles in certain applications.

SUMMARY

A need exists to improve existing methods for visual tracking of a moving target. The improved tracking capabilities may enable a movable object carrying an imaging device to accurately track a target, even though the movable object and the imaging device may be at different spatial dispositions relative to the target. The improved tracking capabilities can allow a target object and its movement to be automatically detected. The movable object and the imaging device can be used to autonomously track the target object without requiring manual input or operation by a user. The improved tracking capabilities may be particularly useful when the movable object and the imaging device are at different heights, distances, and/or orientations relative to the target. The improved tracking capabilities can be incorporated into an aerial vehicle, such as an unmanned aerial vehicle (UAV).

In vision-based tracking methods, a target object may be tracked using an imaging device located on an aerial vehicle. Visual tracking methods may be manual or automatic.

In some manual visual tracking methods, one or more image frames may be first captured using an imaging device, and an operator may manually select a target object to be tracked from the one or more image frames. The manual selection may be performed using an input device, for example, a tablet, a mobile device, or a personal computer (PC). In some instances, an aerial vehicle may be configured to automatically track the target object after the target object has been manually selected by the operator using the input device. In other instances, the operator may continue to manually control the aerial vehicle to track the target object even after it has been selected.

In some automatic visual tracking methods, tracking may be implemented using tracking algorithms that can automatically detect a particular type of object, or an object carrying a marker. The type of object may be based on different object classes (e.g., people, buildings, landscape, etc.). The marker may include one or more optical markers comprising unique patterns. A target object may also be defined based on predetermined features (e.g., color, structure, salient features, etc.) and/or by modeling (e.g., object class). After a target object has been defined, movement of the features and/or model may be detected and calculated in real-time as the target object moves. In these methods, a high-level consistency in the features and/or model may be typically required for precise tracking of the target. In particular, the level of tracking precision may depend on the spatial relations between the features and/or an error in the model.

In some cases, an image of a target object may be annotated by a tracking indicator, to distinguish the target object from other non-tracked objects within an image frame. The tracking indicator may be a box, circle, or any other geometric shape surrounding the image of the target object within the image frame. The image frame and the tracking indicator typically lie on a 2-dimensional image plane. As a result, the tracking indicator alone may not provide sufficient information about the spatial disposition between the aerial vehicle/imaging device and the target. For example, a spatial indicator can have a same size, shape, and/or position within a set of image frames, even though the set of image frames may be captured while the aerial vehicle/imaging device are at different spatial dispositions relative to the target. Therefore, existing visual tracking methods may be inadequate for tracking a moving target, particularly when the aerial vehicle/imaging device are at different distances (lateral/vertical) and/or different orientations (pitch/roll/yaw) relative to the target.

Accordingly, a need exists to improve the tracking capabilities and robustness of a movable object (e.g., an aerial vehicle) under different conditions for a variety of applications requiring high accuracy/precision. The conditions may include both indoor and outdoor environments, places without GPS signals or places that have poor GPS signal reception, etc. The applications may include precise tracking of a moving target object when the movable object/imaging device are at different spatial dispositions relative to the target object. The target object may include objects that do not carry GPS apparatus, objects that are capable of moving in any direction, or any combination of the above. Systems, methods, and devices are provided herein to address at least the above needs.

For instance, in some aspects of the disclosure, a method for controlling a movable object to track a target object may be provided. The method may comprise: determining a change in one or more features between a first image frame and a second image frame, wherein the one or more features are associated with the target object, and wherein the first image frame and the second image frame are captured at different points in time; and adjusting a movement of the movable object based on the change in the one or more features between the first image frame and the second image frame.

According to another aspect of the disclosure, an apparatus for controlling a movable object to track a target object may be provided. The apparatus may comprise one or more processors that are, individually or collectively, configured to: determine a change in one or more features between a first image frame and a second image frame, wherein the one or more features are associated with the target object, and wherein the first image frame and the second image frame are captured at different points in time; and adjust a movement of the movable object based on the change in the one or more features between the first image frame and the second image frame.

Further aspects of the disclosure may be directed to a non-transitory computer-readable medium storing instructions that, when executed, causes a computer to perform a method for controlling a movable object to track a target object. The method may comprise: determining a change in one or more features between a first image frame and a second image frame, wherein the one or more features are associated with the target object, and wherein the first image frame and the second image frame are captured at different points in time; and adjusting a movement of the movable object based on the change in the one or more features between the first image frame and the second image frame.

An unmanned aerial vehicle (UAV) system may be provided in accordance with an additional aspect of the disclosure. The UAV system may comprise: an apparatus operable to control the UAV to track a target object, said apparatus comprising one or more processors that are, individually or collectively, configured to: determine a change in one or more features between a first image frame and a second image frame, wherein the one or more features are associated with the target object, and wherein the first image frame and the second image frame are captured at different points in time; and adjust a movement of the UAV based on the change in the one or more features between the first image frame and the second image frame.

It shall be understood that different aspects of the disclosure can be appreciated individually, collectively, or in combination with each other. Various aspects of the disclosure described herein may be applied to any of the particular applications set forth below or for any other types of movable objects. Any description herein of an aerial vehicle may apply to and be used for any movable object, such as any vehicle. Additionally, the systems, devices, and methods disclosed herein in the context of aerial motion (e.g., flight) may also be applied in the context of other types of motion, such as movement on the ground or on water, underwater motion, or motion in space.

Other objects and features of the present disclosure will become apparent by a review of the specification, claims, and appended figures.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present disclosure will be obtained by reference to the following detailed description that sets forth illustrative embodiments, in which the principles of the disclosure are utilized, and the accompanying drawings of which:

DETAILED DESCRIPTION

Figure 1:
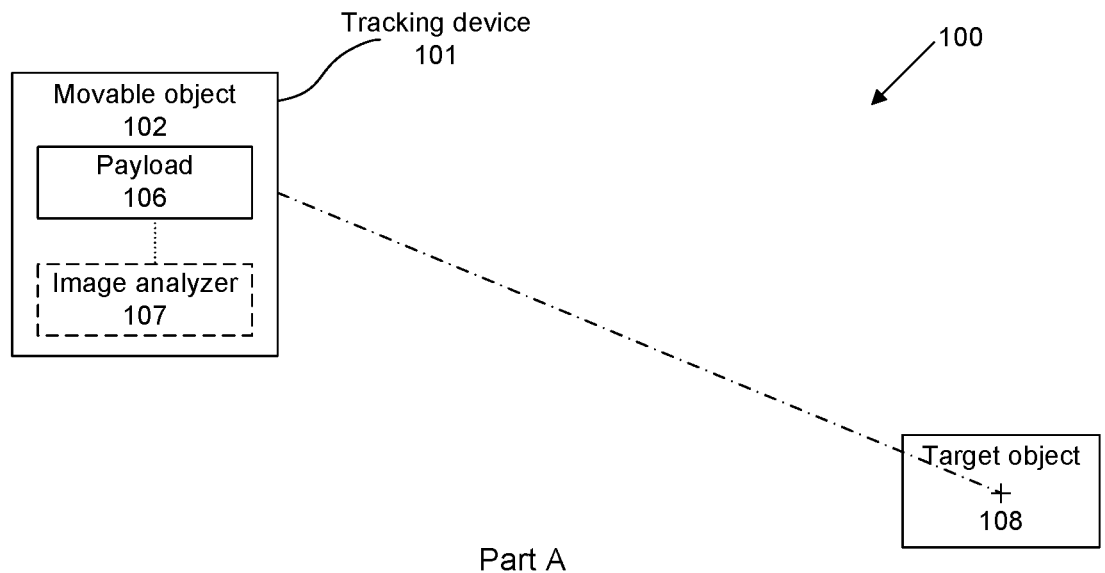
FIG. 1 illustrates visual tracking systems in accordance with some embodiments.
Figure 1:
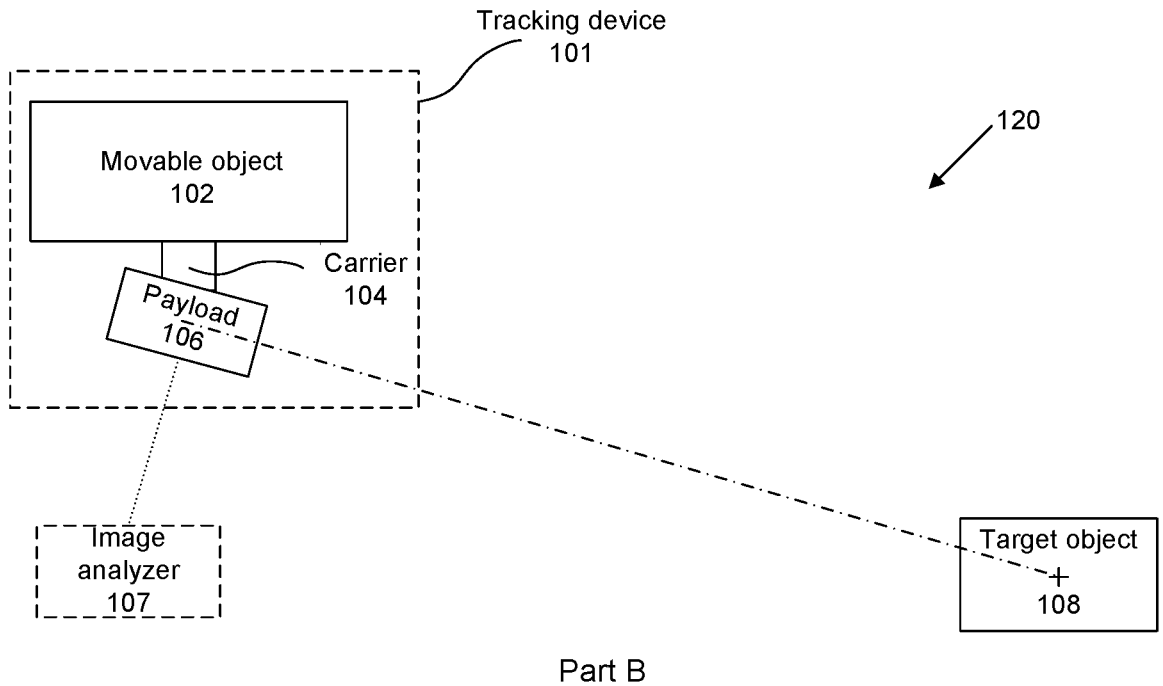

The systems, methods, and devices described herein permit a target object to be tracked with high precision and accuracy. This can improve the tracking capabilities of a tracking device. For example, the systems, methods, and devices can be used to accurately track a moving target object while the tracking device is at different spatial dispositions relative to the target object. The tracking device may comprise a movable object configured to track and/or follow the target object. The movable object may carry a payload comprising an imaging device that provides visual tracking capabilities. In some embodiments, the imaging device may be rigidly attached to the movable object, such that translational and/or rotational movement of the movable and object and the imaging device is the same about one or more axes. Optionally, the imaging device may be integrated into a housing of the movable object to form part of the movable object. In other embodiments, the imaging device may be rotatably coupled to the movable object via a carrier. The carrier may comprise one or more gimbal stages that can permit movement of the carrier relative to the movable object about one or more axes. A tracking device as used herein may refer to an imaging device. A tracking device as used herein may also refer to a movable object to which an imaging device is attached/coupled. Optionally, a tracking device as used herein may refer to a non-movable object to which an imaging device is attached/coupled. A movable object and an imaging device thereon may be collectively referred to as a tracking device in various embodiments of the disclosure. One of ordinary skill in the art would readily appreciate that a tracking device as used herein may include movable and/or nonmovable objects, optical and/or mechanical devices, hardware and/or software components, etc. that can be used to support visual tracking of a target object.

The imaging device may be configured to capture images of the target object. The images of the target object may be depicted within a plurality of image frames. For example, a first image frame may comprise a first image of the target object, and a second image frame may comprise a second image of the target object. The first and second images of the target object may be captured at different points in time.

The tracking device may comprise an image analyzer. The image analyzer may be configured to analyze the first image frame and the second image frame to determine a change in one or more features between the first image of the target object and the second image of the target object. The one or more features may be associated with the images of the target object. The change in the one or more features may comprise a change in size and/or position of the one or more features. The one or more features may also be associated with a tracking indicator. The images of the target object may be annotated by the tracking indicator, to distinguish the target object from other non-tracked objects within the image frames. The tracking indicator may be a box, a circle, or any other geometric shape surrounding the images of the target object within the image frames.

The image analyzer may be implemented using software and/or hardware, and may be located anywhere on the tracking device or remote from the tracking device. For example, in some embodiments, the image analyzer may be provided with the imaging device. In other embodiments, the image analyzer may be provided with a motion controller for the movable object. The motion controller may be located on or remote from the movable object. In some other embodiments, the image analyzer may be provided on a remote user terminal that is used for controlling the tracking device. For example, a user can use the remote user terminal to control movement and/or sensing functions of each of the movable object and the imaging device. In some further embodiments, the image analyzer may be provided at a remote server or at a ground station. The remote server or ground station may be in direct communication with the tracking device. Alternatively, the remote server or ground station may be in communication with the tracking device via a remote user terminal.

In some embodiments, the tracking indicator may be a bounding box. The bounding box may be configured to substantially surround the first and second images of the target object within the first and second image frames. The bounding box may have a regular shape or an irregular shape. For example, the bounding box may be a circle, an ellipse, a polygon, or any other geometric shape.

The one or more features may correspond to geometrical and/or positional characteristic(s) of a bounding box. The geometrical characteristic(s) of the bounding box may, for example, correspond to a size of the bounding box within an image frame. The size of the bounding box may include, for example a height of the bounding box. The positional characteristic of the bounding box may correspond to a position of the bounding box within an image frame. The position of the bounding box may be denoted by a set of image coordinates within the image frame. The size and/or position of the bounding box may change as the spatial disposition between the target object and the tracking device changes. In some cases, the change in spatial disposition may be between the target object and the imaging device. Alternatively, the change in spatial disposition may be between the target object and the movable object. The change in spatial disposition may include a change in distance and/or orientation between the target object and the tracking device. In some cases, the change in distance and/or orientation may be between the target object and the imaging device. Alternatively, the change in distance and/or orientation may be between the target object and the movable object.

In some embodiments, the image analyzer may be configured to determine the change in size and/or position of the bounding box between a first image frame and a second image frame. The image analyzer may be further configured to provide data indicative of the change in size and/or position of the bounding box to a motion controller. The motion controller may be configured to adjust a movement of the tracking device to track the target object, based on the change in size and/or position of the bounding box between the first and second image frames. The motion controller can adjust movement of one or more components of the tracking device. For example, the motion controller can adjust a movement of the imaging device and/or the movable object to track the target object, based on the change in size and/or position of the bounding box between the first and second image frames.

Accordingly, a target object can be accurately and precisely tracked using one or more of the above-described systems, methods, or devices. The target object may include objects that do not carry GPS apparatus, objects that are capable of moving in any direction, or any combination of the above.

It shall be understood that different aspects of the disclosure can be appreciated individually, collectively, or in combination with each other. Various aspects of the disclosure described herein may be applied to any of the particular applications set forth below or for any other types of remotely controlled vehicles or movable objects.

The present disclosure provides embodiments of systems, devices, and/or methods for improving the tracking capabilities of a tracking device. The tracking device may be a movable object such as an unmanned aerial vehicle (UAV) carrying an imaging device for supporting visual tracking of a target object. The improved tracking capabilities can enable autonomous tracking of a moving target object while the tracking device is at different spatial dispositions relative to the target object. The different spatial dispositions may include different heights, distances, and/or orientations of the tracking device relative to the target. Description of the UAV may apply to any type of vehicle, such as land-bound, underground, underwater, water surface, aerial, or space-based vehicles.

FIG. 1 illustrates visual tracking systems in accordance with some embodiments. A visual tracking system may include one or more tracking devices. A tracking device may be configured to track or follow one or more target objects. A tracking device may be an imaging device, or a movable object carrying an imaging device. The imaging device may form part of a payload carried by the movable object. Optionally, the imaging device may be integrated into and form part of the movable object.

Part A of FIG. 1 shows a visual tracking system 100 comprising a tracking device 101 configured to track or follow a target object 108 within an environment. The tracking device may include a movable object 102 configured to track or follow the target object within the environment. The movable object may be any object capable of traversing the environment. The movable object may be capable of traversing air, water, land, and/or space. The environment may include objects that are incapable of motion (stationary objects) and objects that are capable of motion. Examples of stationary objects may include geographic features, plants, landmarks, buildings, monolithic structures, or any fixed structures. Examples of objects that are capable of motion include people, vehicles, animals, projectiles, etc.

In some cases, the environment may be an inertial reference frame. The inertial reference frame may be used to describe time and space homogeneously, isotropically, and in a time-independent manner. The inertial reference frame may be established relative to the movable object, and move in accordance with the movable object. Measurements in the inertial reference frame can be converted to measurements in another reference frame (e.g., a global reference frame) by a transformation (e.g., Galilean transformation in Newtonian physics).

The movable object may be a vehicle. The vehicle may be a self-propelled vehicle. The vehicle may traverse an environment with aid of one or more propulsion units. The vehicle may be an aerial vehicle, a land-based vehicle, a water-based vehicle, or a space-based vehicle. The vehicle may be an unmanned vehicle. The vehicle may be capable of traversing an environment without a human passenger onboard. Alternatively, the vehicle may carry a human passenger. In some embodiments, the movable object may be an unmanned aerial vehicle (UAV).

Any description herein of a UAV or any other type of movable object may apply to any other type of movable object or various categories of movable objects in general, or vice versa. For instance, any description herein of a UAV may apply to any unmanned land-bound, water-based, or space-based vehicle. Further examples of movable objects are provided in greater detail elsewhere herein.

As mentioned above, the movable object may be capable of traversing an environment. The movable object may be capable of flight within three dimensions. The movable object may be capable of spatial translation along one, two, or three axes. The one, two or three axes may be orthogonal to one another. The axes may be along a pitch, yaw, and/or roll axis. The movable object may be capable of rotation about one, two, or three axes. The one, two, or three axes may be orthogonal to one another. The axes may be a pitch, yaw, and/or roll axis. The movable object may be capable of movement along up to 6 degrees of freedom. The movable object may include one or more propulsion units that may aid the movable object in movement. For instance, the movable object may be a UAV with one, two or more propulsion units. The propulsion units may be configured to generate lift for the UAV. The propulsion units may include rotors. The movable object may be a multi-rotor UAV.

The movable object may have any physical configuration. For instance, the movable object may have a central body with one or arms or branches extending from the central body. The arms may extend laterally or radially from the central body. The arms may be movable relative to the central body or may be stationary relative to the central body. The arms may support one or more propulsion units. For instance, each arm may support one, two or more propulsion units.

The movable object may have a housing. The housing may be formed from a single integral piece, two integral pieces, or multiple pieces. The housing may include a cavity within where one or more components are disposed. The components may be electrical components, such as a flight controller, one or more processors, one or more memory storage units, one or more sensors (e.g., one or more inertial sensors or any other type of sensor described elsewhere herein), one or more navigational units (e.g., a global positioning system (GPS) unit), one or communication units, or any other type of component. The housing may have a single cavity or multiple cavities. In some instances, a flight controller may in communication with one or more propulsion units and/or may control operation of the one or more propulsion units. The flight controller may communicate and/or control operation of the one or more propulsion units with aid of one or more electronic speed control (ESC) modules. The flight controller may communicate with the ESC modules to control operation of the propulsion units.

The movable object may support an on-board payload 106. In part A of FIG. 1, the payload may be fixed or integrated into the movable object, such that the payload has a fixed position relative to the movable object. Optionally, the payload may be coupled to the movable object and capable of movement relative to the movable object, as described later with reference to part B of FIG. 1.

The payload may include a device capable of sensing the environment about the movable object, a device capable of emitting a signal into the environment, and/or a device capable of interacting with the environment.

One or more sensors may be provided as a payload, and may be capable of sensing the environment. The one or more sensors may include an imaging device. An imaging device may be a physical imaging device. An imaging device can be configured to detect electromagnetic radiation (e.g., visible, infrared, and/or ultraviolet light) and generate image data based on the detected electromagnetic radiation. An imaging device may include a charge-coupled device (CCD) sensor or a complementary metal-oxide-semiconductor (CMOS) sensor that generates electrical signals in response to wavelengths of light. The resultant electrical signals can be processed to produce image data. The image data generated by an imaging device can include one or more images, which may be static images (e.g., photographs), dynamic images (e.g., video), or suitable combinations thereof. The image data can be polychromatic (e.g., RGB, CMYK, HSV) or monochromatic (e.g., grayscale, black-and-white, sepia). The imaging device may include a lens configured to direct light onto an image sensor.

The imaging device can be a camera. A camera can be a movie or video camera that captures dynamic image data (e.g., video). A camera can be a still camera that captures static images (e.g., photographs). A camera may capture both dynamic image data and static images. A camera may switch between capturing dynamic image data and static images. Although certain embodiments provided herein are described in the context of cameras, it shall be understood that the present disclosure can be applied to any suitable imaging device, and any description herein relating to cameras can also be applied to any suitable imaging device, and any description herein relating to cameras can also be applied to other types of imaging devices. A camera can be used to generate 2D images of a 3D scene (e.g., an environment, one or more objects, etc.). The images generated by the camera can represent the projection of the 3D scene onto a 2D image plane. Accordingly, each point in the 2D image corresponds to a 3D spatial coordinate in the scene. The camera may comprise optical elements (e.g., lens, mirrors, filters, etc). The camera may capture color images, greyscale image, infrared images, and the like. The camera may be a thermal imaging device when it is configured to capture infrared images.

In some embodiments, the payload may include multiple imaging devices, or an imaging device with multiple lenses and/or image sensors. The payload may be capable of taking multiple images substantially simultaneously. The multiple images may aid in the creation of a 3D scene, a 3D virtual environment, a 3D map, or a 3D model. For instance, a right image and a left image may be taken and used for stereo-mapping. A depth map may be calculated from a calibrated binocular image. Any number of images (e.g., 2 or more, 3 or more, 4 or more, 5 or more, 6 or more, 7 or more, 8 or more, 9 or more) may be taken simultaneously to aid in the creation of a 3D scene/virtual environment/model, and/or for depth mapping. The images may be directed in substantially the same direction or may be directed in slightly different directions. In some instances, data from other sensors (e.g., ultrasonic data, LIDAR data, data from any other sensors as described elsewhere herein, or data from external devices) may aid in the creation of a 2D or 3D image or map.

The imaging device may capture an image or a sequence of images at a specific image resolution. In some embodiments, the image resolution may be defined by the number of pixels in an image. In some embodiments, the image resolution may be greater than or equal to about 352×420 pixels, 480×320 pixels, 720×480 pixels, 1280×720 pixels, 1440×1080 pixels, 1920×1080 pixels, 2048×1080 pixels, 3840×2160 pixels, 4096×2160 pixels, 7680×4320 pixels, or 15360×8640 pixels. In some embodiments, the camera may be a 4K camera or a camera with a higher resolution.

The imaging device may capture a sequence of images at a specific capture rate. In some embodiments, the sequence of images may be captured standard video frame rates such as about 24p, 25p, 30p, 48p, 50p, 60p, 72p, 90p, 100p, 120p, 300p, 50i, or 60i. In some embodiments, the sequence of images may be captured at a rate less than or equal to about one image every 0.0001 seconds, 0.0002 seconds, 0.0005 seconds, 0.001 seconds, 0.002 seconds, 0.005 seconds, 0.01 seconds, 0.02 seconds, 0.05 seconds. 0.1 seconds, 0.2 seconds, 0.5 seconds, 1 second, 2 seconds, 5 seconds, or 10 seconds. In some embodiments, the capture rate may change depending on user input and/or external conditions (e.g. rain, snow, wind, unobvious surface texture of environment).

The imaging device may have adjustable parameters. Under differing parameters, different images may be captured by the imaging device while subject to identical external conditions (e.g., location, lighting). The adjustable parameter may comprise exposure (e.g., exposure time, shutter speed, aperture, film speed), gain, gamma, area of interest, binning/subsampling, pixel clock, offset, triggering, ISO, etc. Parameters related to exposure may control the amount of light that reaches an image sensor in the imaging device. For example, shutter speed may control the amount of time light reaches an image sensor and aperture may control the amount of light that reaches the image sensor in a given time. Parameters related to gain may control the amplification of a signal from the optical sensor. ISO may control the level of sensitivity of the camera to available light. Parameters controlling for exposure and gain may be collectively considered and be referred to herein as EXPO.

In some alternative embodiments, an imaging device may extend beyond a physical imaging device. For example, an imaging device may include any technique that is capable of capturing and/or generating images or video frames. In some embodiments, the imaging device may refer to an algorithm that is capable of processing images obtained from another physical device.

The payload may include one or more types of sensors. Some examples of types of sensors may include location sensors (e.g., global positioning system (GPS) sensors, mobile device transmitters enabling location triangulation), vision sensors (e.g., imaging devices capable of detecting visible, infrared, or ultraviolet light, such as cameras), proximity or range sensors (e.g., ultrasonic sensors, lidar, time-of-flight or depth cameras), inertial sensors (e.g., accelerometers, gyroscopes, and/or gravity detection sensors, which may form inertial measurement units (IMUs)), altitude sensors, attitude sensors (e.g., compasses), pressure sensors (e.g., barometers), temperature sensors, humidity sensors, vibration sensors, audio sensors (e.g., microphones), and/or field sensors (e.g., magnetometers, electromagnetic sensors, radio sensors).

The payload may include one or more devices capable of emitting a signal into an environment. For instance, the payload may include an emitter along an electromagnetic spectrum (e.g., visible light emitter, ultraviolet emitter, infrared emitter). The payload may include a laser or any other type of electromagnetic emitter. The payload may emit one or more vibrations, such as ultrasonic signals. The payload may emit audible sounds (e.g., from a speaker). The payload may emit wireless signals, such as radio signals or other types of signals.

The payload may be capable of interacting with the environment. For instance, the payload may include a robotic arm. The payload may include an item for delivery, such as a liquid, gas, and/or solid component. For example, the payload may include pesticides, water, fertilizer, fire-repellant materials, food, packages, or any other item.

Any examples herein of payloads may apply to devices that may be carried by the movable object or that may be part of the movable object. For instance, one or more sensors may be part of the movable object. The one or more sensors may or may be provided in addition to the payload. This may apply for any type of payload, such as those described herein.

The movable object may travel towards, follow, and/or track the target object. The target object may be a stationary target or a moving target. In some instances, a user may identify a target object from an image frame, and may further specify whether the target object is a stationary target or a moving target. Alternatively, the user may provide any other type of indicator of whether the target object is a stationary target or a moving target. Alternatively, no indication may be provided, and a determination may be automatically made with aid of one or more processors, optionally without requiring user input whether the target object is a stationary target or a moving target. A target object may be classified as a stationary target or a moving target depending on its state of motion. In some cases, a target object may be moving or stationary at any given point in time. When the target object is moving, the target object may be classified as a moving target. Conversely, when the same target object is stationary, the target object may be classified as a stationary target. Alternatively, the target object may be carried by a living subject, such as a human or an animal, or a movable object such as a vehicle.

A stationary target may remain substantially stationary within an environment. Examples of stationary targets may include, but are not limited to landscape features (e.g., trees, plants, mountains, hills, rivers, streams, creeks, valleys, boulders, rocks, etc.) or manmade features (e.g., structures, buildings, roads, bridges, poles, fences, unmoving vehicles, signs, lights, etc.). Stationary targets may include large targets or small targets. A user may select a stationary target. Alternatively, the stationary target may be recognized using one or more image recognition methods. Optionally, the stationary target may be mapped. The movable object may travel to the stationary target. A path (e.g., flight path) may be planned for the movable object to travel to the stationary target. Alternatively, the movable object may travel to the stationary target without requiring a planned path. In some instances, the stationary target may correspond to a selected portion of a structure or object. For example, the stationary target may correspond to a particular section (e.g., top floor) of a skyscraper.

A moving target may be capable of moving within the environment. The moving target may always be in motion, or may be at motions for portions of a time. The moving target may move in a fairly steady direction or may change direction. The moving target may move in the air, on land, underground, on or in the water, and/or in space. The moving target may be a living moving target (e.g., human, animal) or a non-living moving target (e.g., moving vehicle, moving machinery, object blowing in wind or carried by water, object carried by living target). The moving target may include a single moving object or a group of moving objects. For instance, the moving target may include a single human or a group of moving humans. Moving targets may be large targets or small targets. A user may select a moving target. The moving target may be recognized. Optionally, the moving target may be mapped. The movable object may travel to the moving target and/or visually track the moving target. A path (e.g., flight path) may be planned for the movable object to travel to the moving target. The path may be changed or updated as the moving target moves. Alternatively, the movable object may travel to the moving target and/or visually track the moving target without requiring a planned path.

A moving target may be any object configured to move within any suitable environment, such as in air (e.g., a fixed-wing aircraft, a rotary-wing aircraft, or an aircraft having neither fixed wings nor rotary wings), in water (e.g., a ship or a submarine), on ground (e.g., a motor vehicle, such as a car, truck, bus, van, motorcycle; a movable structure or frame such as a stick, fishing pole; or a train), under the ground (e.g., a subway), in space (e.g., a spaceplane, a satellite, or a probe), or any combination of these environments.

A moving target may be capable of moving freely within the environment with respect to six degrees of freedom (e.g., three degrees of freedom in translation and three degrees of freedom in rotation). Alternatively, the movement of the moving target can be constrained with respect to one or more degrees of freedom, such as by a predetermined path, track, or orientation. The movement can be actuated by any suitable actuation mechanism, such as an engine or a motor. The actuation mechanism of the moving target can be powered by any suitable energy source, such as electrical energy, magnetic energy, solar energy, wind energy, gravitational energy, chemical energy, nuclear energy, or any suitable combination thereof. The moving target may be self-propelled via a propulsion system, such as described further below. The propulsion system may optionally run on an energy source, such as electrical energy, magnetic energy, solar energy, wind energy, gravitational energy, chemical energy, nuclear energy, or any suitable combination thereof.

In some instances, the moving target can be a vehicle, such as a remotely controlled vehicle. Suitable vehicles may include water vehicles, aerial vehicles, space vehicles, or ground vehicles. For example, aerial vehicles may be fixed-wing aircraft (e.g., airplane, gliders), rotary-wing aircraft (e.g., helicopters, rotorcraft), aircraft having both fixed wings and rotary wings, or aircraft having neither (e.g., blimps, hot air balloons). A vehicle can be self-propelled, such as self-propelled through the air, on or in water, in space, or on or under the ground. A self-propelled vehicle can utilize a propulsion system, such as a propulsion system including one or more engines, motors, wheels, axles, magnets, rotors, propellers, blades, nozzles, or any suitable combination thereof. In some instances, the propulsion system can be used to enable the movable object to take off from a surface, land on a surface, maintain its current position and/or orientation (e.g., hover), change orientation, and/or change position.

The movable object may be, for example, a UAV. The target object may be a same type of movable object as the tracking device, or may be a different type of movable object as the tracking device. For instance, in some embodiments, both the tracking device and the target object may be UAVs. The tracking device and the target object may be the same type of UAV or different types of UAVs. Different types of UAVs may have different shapes, form factors, functionality, or other characteristics. The target object and the tracking device may move in 3-dimensional space relative to one or more background objects. Background objects as used herein may refer to objects that are substantially affixed at a location. Background objects may be incapable of motion, such as stationary objects. Examples of background objects may include geographic features (e.g., mountains), landmarks (e.g., bridges), buildings (e.g., skyscrapers, stadiums, etc.), or any fixed structures. Additionally, background objects may include objects that are stationary at a location at a first time instance, and moving at a second time instance. Some of the background objects or a portion of the background objects may be capable of motion (e.g., a stadium having a retractable rooftop, a movable bridge that lifts up to allow passage of water-bound vehicles, etc.).

As shown in part A of FIG. 1, the visual tracking system 100 may further include an image analyzer 107. The image analyzer may be hardware and/or software components located on the tracking device or remote from the tracking device. The image analyzer may be in operable communication with the payload. For example, the image analyzer may be configured to receive and analyze image data collected by the payload (e.g., by an imaging device). The image data may include images of the target object captured by the imaging device. The images of the target object may be depicted within a plurality of image frames. For example, a first image frame may comprise a first image of the target object, and a second image frame may comprise a second image of the target object. The first and second images of the target object may be captured at different points in time.

The image analyzer may be configured to analyze the first image frame and the second image frame to determine a change in one or more features between the first image of the target object and the second image of the target object. The one or more features may be associated with the images of the target object. The change in the one or more features may comprise a change in size and/or position of the one or more features. The one or more features may also be associated with a tracking indicator. The images of the target object may be annotated by the tracking indicator, to distinguish the target object from other non-tracked objects within the image frames. The tracking indicator may be a box, a circle, or any other geometric shape surrounding the images of the target object within the image frames.

In some embodiments, the tracking indicator may be a bounding box. The bounding box may be configured to substantially surround the first/second images of the target object within the first/second image frames. The bounding box may have a regular shape or an irregular shape. For example, the bounding box may be a circle, an ellipse, a polygon, or any other geometric shape.

The one or more features may correspond to a geometrical and/or positional characteristic(s) of a bounding box. The geometrical characteristic(s) of the bounding box may, for example, correspond to a size of the bounding box within an image frame. The positional characteristic of the bounding box may correspond to a position of the bounding box within an image frame. The size and/or position of the bounding box may change as the spatial disposition between the target object and the tracking device changes. The change in spatial disposition may include a change in distance and/or orientation between the target object and the tracking device.

In some embodiments, the image analyzer may be configured to determine the change in size and/or position of the bounding box between the first image frame and the second image frame. The image analyzer may be further configured to provide data indicative of the change in size and/or position of the bounding box to a feedback controller (not shown). The feedback controller may be configured to adjust a movement of the tracking device to track the target object, based on the change in size and/or position of the bounding box between the first and second image frames. The feedback controller may be provided anywhere within the visual tracking system 100. For example, the feedback controller may be part of a motion controller for the tracking device. The motion controller may be located on a body of the movable object, or remote from the tracking device. For example, the motion controller may be located on a remote user terminal (not shown) that is used for controlling the tracking device. In some embodiments, the feedback controller may be configured to adjust a movement of the imaging device to track the target object, based on the change in size and/or position of the bounding box between the first and second image frames.

As previously mentioned, the one or more features may be associated with the images of the target object. In some embodiments, the one or more features may comprise one or more feature points. A feature point can be a portion of an image (e.g., an edge, corner, interest point, blob, ridge, etc.) that is uniquely distinguishable from the remaining portions of the image and/or other feature points in the image. Optionally, a feature point may be relatively invariant to transformations of the imaged object (e.g., translation, rotation, scaling) and/or changes in the characteristics of the image (e.g., brightness, exposure). A feature point may be detected in portions of an image that is rich in terms of informational content (e.g., significant 2D texture). A feature point may be detected in portions of an image that are stable under perturbations (e.g., when varying illumination and brightness of an image).

Feature points can be detected using various algorithms (e.g., texture detection algorithm) which may extract one or more feature points from image data. The algorithms may additionally make various calculations regarding the feature points. For example, the algorithms may calculate a total number of feature points, or "feature point number." The algorithms may also calculate a distribution of feature points. For example, the feature points may be widely distributed within an image (e.g., image data) or a subsection of the image. For example, the feature points may be narrowly distributed within an image (e.g., image data) or a subsection of the image. The algorithms may also calculate a quality of the feature points. In some instances, the quality of feature points may be determined or evaluated based on a value calculated by algorithms mentioned herein (e.g., FAST, Corner detector, Harris, etc).

The algorithm may be an edge detection algorithm, a corner detection algorithm, a blob detection algorithm, or a ridge detection algorithm. In some embodiments, the corner detection algorithm may be a "Features from accelerated segment test" (FAST). In some embodiments, the feature detector may extract feature points and make calculations regarding feature points using FAST. In some embodiments, the feature detector can be a Canny edge detector, Sobel operator, Harris & Stephens/Plessy/Shi-Tomasi corner detection algorithm, the SUSAN corner detector, Level curve curvature approach, Laplacian of Gaussian, Difference of Gaussians, Determinant of Hessian, MSER, PCBR, or Grey-level blobs, ORB, FREAK, or suitable combinations thereof.

In some embodiments, a feature point may comprise one or more non-salient features. As used herein, non-salient features may refer to non-salient regions or non-distinct (e.g., non-recognizable) objects within an image. Non-salient features may refer to elements within an image that are unlikely to stand out or catch attention of a human observer. Examples of non-salient features may include individual pixels or groups of pixels that are non-distinct or non-identifiable to a viewer, when viewed outside of the context of their surrounding pixels.

In some alternative embodiments, a feature point may comprise one or more salient features. Salient features may refer to salient regions or distinct (e.g., recognizable) objects within an image. As used herein, salient features may refer to salient regions or distinct (e.g., recognizable) objects within an image. Salient features may refer to elements within an image that are likely to stand out or catch attention of a human observer. A salient feature may have semantic meaning. Salient features may refer to elements that may be identified consistently under computer vision processes. A salient feature may refer to animate objects, inanimate objects, landmarks, marks, logos, obstacles, and the like within an image. A salient feature may be persistently observed under differing conditions. For example, a salient feature may be persistently identified (e.g., by a human observer or by computer programs) in images acquired from different points of view, during different times of the day, under different lighting conditions, under different weather conditions, under different image acquisition settings (e.g., different gain, exposure, etc), and the like. For example, salient features may include humans, animals, faces, bodies, structures, buildings, vehicles, planes, signs, and the like.

Salient features may be identified or determined using any existing saliency calculating methods. For example, salient features may be identified by contrast based filtering (e.g., color, intensity, orientation, size, motion, depth based, etc), using a spectral residual approach, via frequency-tuned salient region detection, via a binarized normed gradients for objectness estimation, using a context-aware top down approach, by measuring visual saliency by site entropy rate, and the like. For example, salient features may be identified in a saliency map that is generated by subjecting one or more images to contrast based filtering (e.g., color, intensity, orientation, etc). A saliency map may represent areas with feature contrasts. A saliency map may be a predictor where people will look. A saliency map may comprise a spatial heat map representation of features or fixations. For example, in a saliency map, salient regions may have a higher luminance contrast, color contrast, edge content, intensities, etc than non-salient regions. In some embodiments, salient features may be identified using object recognition algorithms (e.g., feature based methods, appearance based methods, etc). Optionally, one or more objects or types of patterns, objects, figures, colors, logos, outlines, etc may be pre-stored as possible salient features. An image may be analyzed to identify salient features that are pre-stored (e.g., an object or types of objects). The pre-stored salient features may be updated. Alternatively, salient features may not need to be pre-stored. Salient features may be recognized on a real time basis independent to pre-stored information.

In some embodiments, the image data captured by the imaging device (payload 106) may be stored in a media storage (not shown) before the image data is provided to the image analyzer 107. The image analyzer may be configured to receive the image data directly from the media storage. In some embodiments, the image analyzer may be configured to receive image data concurrently from both the imaging device and the media storage. The media storage can be any type of storage medium capable of storing image data of a plurality of objects. As previously described, the image data may include video or still images. The video or still images may be processed and analyzed by the image analyzer, as described later in the specification. The media storage can be provided as a CD, DVD, Blu-ray disc, hard disk, magnetic tape, flash memory card/drive, solid state drive, volatile or non-volatile memory, holographic data storage, and any other type of storage medium. In some embodiments, the media storage can also be a computer capable of providing image data to the image analyzer.

As another example, the media storage can be a web server, an enterprise server, or any other type of computer server. The media storage can be computer programmed to accept requests (e.g., HTTP, or other protocols that can initiate data transmission) from the image analyzer and to serve the image analyzer with requested image data. In addition, the media storage can be a broadcasting facility, such as free-to-air, cable, satellite, and other broadcasting facility, for distributing image data. The media storage may also be a server in a data network (e.g., a cloud computing network).

In some embodiments, the media storage may be located on-board the imaging device. In some other embodiments, the media storage may be located on-board the movable object but off-board the imaging device. In some further embodiments, the media storage may be located on one or more external devices off-board the movable object and/or the imaging device. In those further embodiments, the media storage may be located on a remote controller, a ground station, a server, etc. Any arrange or combination of the above components may be contemplated. In some embodiments, the media storage may communicate with the imaging device and the movable object via a peer-to-peer network architecture. In some embodiments, the media storage may be implemented using a cloud computing architecture.

The image data may be provided in the form of image signals to the image analyzer for image processing/analysis. The image analyzer can be implemented as a software program executing in a processor and/or as hardware that analyzes the plurality of image frames to determine a change in one or more features between a plurality of images of the target object. For example, the image analyzer may be configured to analyze a first image frame and a second frame to determine a change in one or more features between a first image and a second image of the target object between consecutive or non-consecutive image frames. In some embodiments, the image analyzer may be configured to determine the change in the one or more features while at least one of the movable object, imaging device, and/or the target object is in motion. At any given moment in time, the movable object, imaging device, and/or target object may be capable of moving and/or stopping. For instance, the movable object supporting the imaging device may hover for a period of time before moving to a different location to track and/or follow the target object.

Part B of FIG. 1 shows a visual tracking system 120 similar to system 100 shown in part A of FIG. 1, except for the following difference. In part B of FIG. 1, a payload 106 may be movably coupled to a movable object 102 via a carrier 104, and may be located outside a housing of the movable object. The payload may be movable relative to the movable object. The payload may move in a translational motion relative to the movable object. For instance, the payload may move along one, two or three axes relative to the movable object. The payload may also rotate relative to the movable object. For instance, the payload may rotate about one, two or three axes relative to the movable object. The axes may be orthogonal to on another. The axes may be a pitch, yaw, and/or roll axis of the carrier, imaging device, and/or the movable object.

The payload may move relative to the movable object with aid of the carrier. The carrier may include one or more gimbal stages that may permit movement of the carrier relative to the movable object. For instance, the carrier may include a first gimbal stage that may permit rotation of the carrier relative to the movable object about a first axis, a second gimbal stage that may permit rotation of the carrier relative to the movable object about a second axis, and/or a third gimbal stage that may permit rotation of the carrier relative to the movable object about a third axis. Any descriptions and/or characteristics of carriers as described elsewhere herein may apply.

While shown in FIG. 1 as separate components that are operatively connected, it is noted that the imaging device (payload 106) and the image analyzer may be co-located in one device. For example, the image analyzer can be located within or form part of the imaging device. Conversely, the imaging device can be located within or form part of the image analyzer.

Optionally, the image analyzer may be located remotely from the imaging device. For example, the image analyzer may be disposed in a remote server that is in communication with the imaging device. The image analyzer may be provided at any other type of external device (e.g., a remote controller for the movable object, an object carried by the target object, a reference location such as a base station, or a tracking device), or may be distributed on a cloud computing infrastructure.

In some embodiments, the image analyzer and the media storage for storing image data may be located on a same device. In other embodiments, the image analyzer and the media storage for storing image data may be located on different devices. The image analyzer and the media storage may communicate either via wired or wireless connections.

In some embodiments, the image analyzer may be located on the movable object. For example, the image analyzer may be disposed in a housing of the movable object. In some other embodiments, the image analyzer may be located on the target object. For example, the image analyzer may be disposed on a body of the target object. In some further embodiments, the image analyzer may be disposed at a base station that is in communication with the movable object, imaging device, and/or target object. The image analyzer may be located anywhere, as long as the image analyzer is capable of receiving a plurality of image frames captured at different times using the imaging device, and analyzing the plurality of image frames to determine a change in one or more features between images of a target object in the image frames. The image analyzer may communicate with one or more of the aforementioned movable object, imaging device, target object, base station, and/or any other devices to receive image data from which the change in the one more features can be determined. As previously mentioned, a feedback controller (which may be part of a motion controller) may be configured to adjust a movement of the movable object to track the target object, based on the change in the one or more features between the first image and the second image. It should be understood that the configuration shown in FIG. 1 is for illustrative purposes only. Certain components or devices may be removed or combined, and other components or devices may be added.

Figure 2:
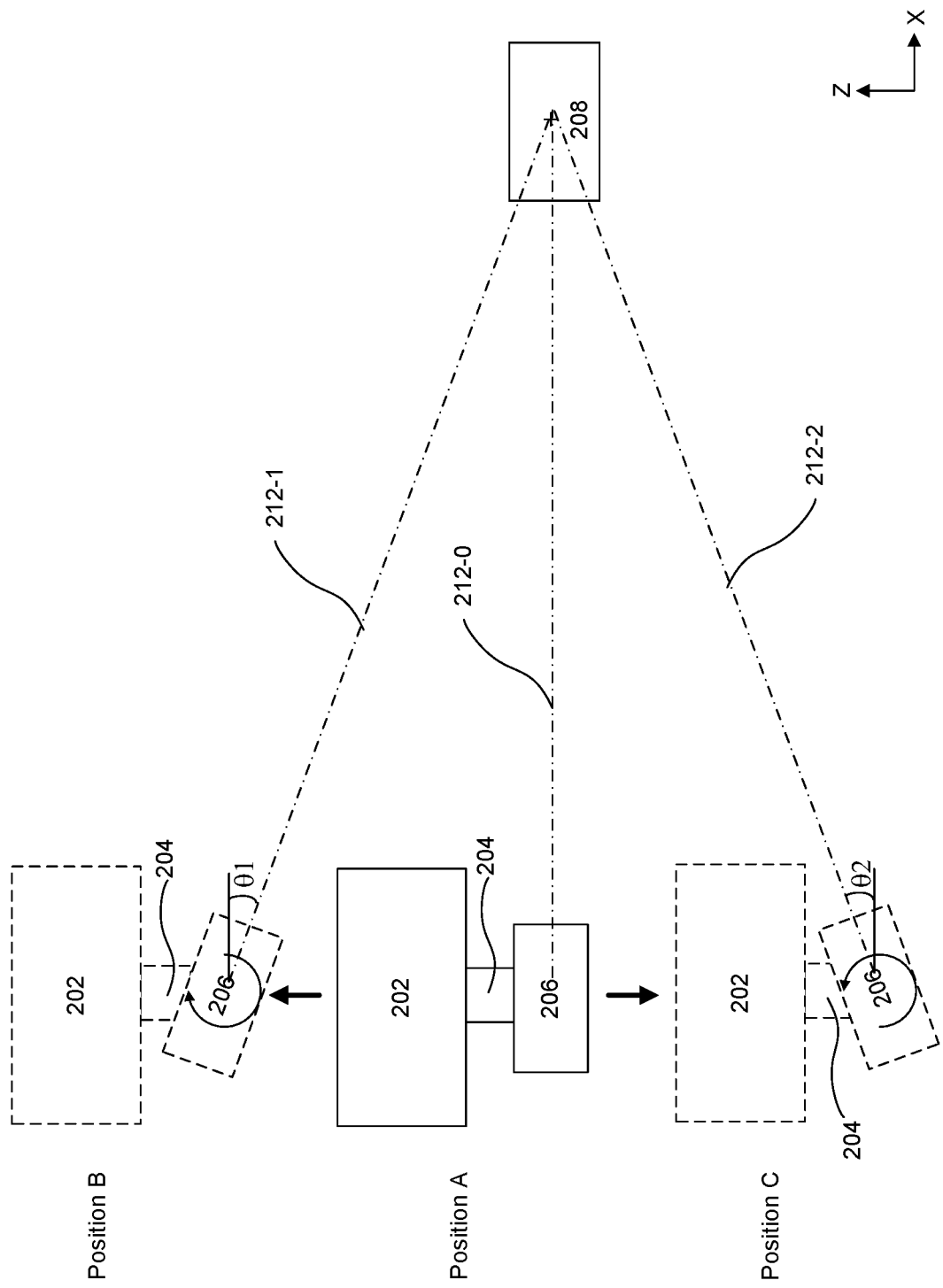
FIG. 2 illustrates different spatial dispositions of a tracking device relative to a target object, in accordance with some embodiments.

FIG. 2 illustrates different spatial dispositions of a tracking device relative to a target object, in accordance with some embodiments. The tracking device may include a movable object 202 configured to support a payload. The payload may comprise an imaging device 206. The imaging device may be coupled to the movable object using a carrier 204. The carrier may allow the imaging device to move (e.g., rotate) about one or more axes relative to the movable object. Optionally, the imaging device may be rigidly affixed to the movable object without using a carrier, such that the imaging device moves in accordance with the movable object. An optical axis 212 may extend from the imaging device towards the target object. The optical axis may be a line along which there is a degree of rotational symmetry in an optical system (e.g., the imaging device). The optical axis may be an imaginary line that defines a path along which light propagates through the system, up to a first approximation.

As shown in FIG. 2, the tracking device may be initially at position A relative to the target object. In this position, an optical axis 212-0 may extend from a center of the imaging device to the target object in a direction that is parallel to an X-axis of a world coordinate system.

Next, the tracking device may move to position B relative to the target object, such that there is a height difference between the tracking device and the target object. The height difference may be along the positive Z-axis. In order to maintain the target object in a field-of-view of the imaging device, the imaging device may be rotated by an angle θ1 clockwise about the Y-axis, which results in a downward pitch of the imaging device relative to the movable object. Accordingly, an optical axis 212-1 extending from a center of the imaging device may also rotate by the same angle θ1 clockwise about the Y-axis.

Next, the tracking device may move to position C relative to the target object, such that there is a height difference between the tracking device and the target object. Unlike position B, the height difference at position C may be generated in an opposite direction along the negative Z-axis. In order to maintain the target object in a field-of-view of the imaging device, the imaging device may be rotated by an angle θ2 counterclockwise about the Y-axis, which results in an upward pitch of the imaging device relative to the movable object. Accordingly, an optical axis 212-2 extending from a center of the imaging device may also rotate by the same angle θ2 counterclockwise about the Y-axis.

Figure 3:
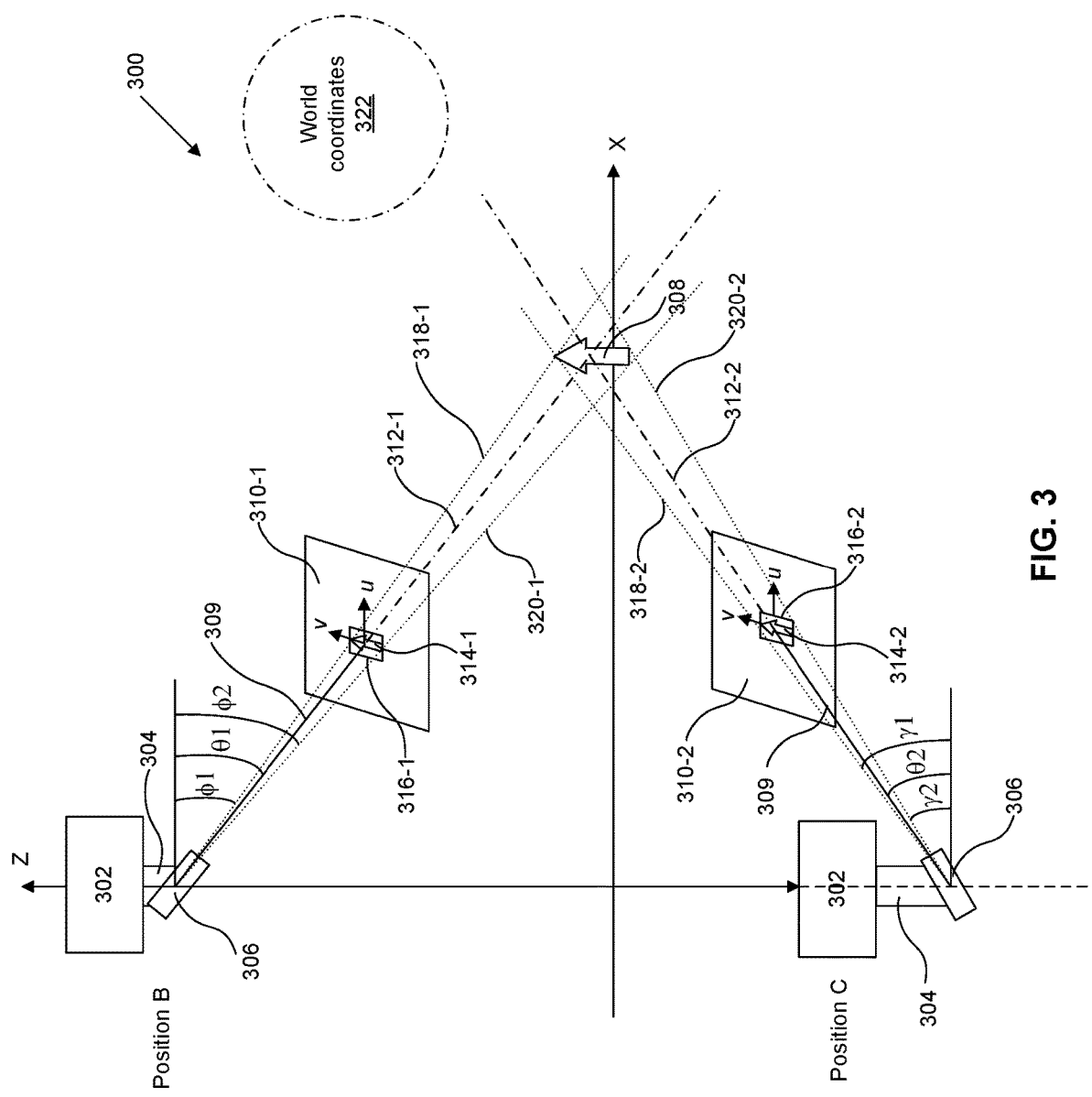
FIG. 3 illustrates the projections of a target object onto an image plane when a tracking device is located at different positions relative to a target object, in accordance with some embodiments.

The effects of the different spatial dispositions in FIG. 2 (for example, positions B and C) can be observed in FIG. 3, which illustrates the projections of a target object 308 onto an image plane 310 when a tracking device (comprising a movable object 302 and an imaging device 306) is located at positions B and C relative to the target object. The imaging device may be coupled to the movable object using a carrier 304. The carrier may allow the imaging device to move (e.g., rotate) about one or more axes relative to the movable object. Optionally, the imaging device may be rigidly affixed to the movable object without using a carrier, such that the imaging device moves in accordance with the movable object.

As shown in FIG. 3, the imaging of the target object may be approximated using an aperture imaging model, which assumes that a light ray from a point on the target object in a three dimensional space can be projected onto the image plane 310 to form an image point. The imaging device may comprise a mirror (or lens). An optical axis 312 may pass through a center of the mirror and a center of the image plane 310. A distance between the mirror center and the image center may be substantially equal to a focal length 309 of the imaging device. For purposes of illustration, the image plane 310 may be depicted at the focal length distance along the optical axis 312, between the imaging device and the target object.

When the tracking device is at position B relative to the target object, the imaging device may be rotated by an angle θ1 clockwise about the Y-axis of world coordinates 322, which results in a downward pitch of the imaging device relative to the movable object. Accordingly, an optical axis 312-1 extending from the mirror center of the imaging device may also rotate by the same angle θ1 clockwise about the Y-axis. The optical axis 312-1 may pass through the center of a first image plane 310-1 located at the focal length distance 309. At position B, the imaging device may be configured to capture a first image 314-1 of the target object onto the first image plane 310-1. Points on the first image plane 310-1 may be represented by a set of (u, v) image coordinates. A first bounding box 316-1 may be configured to substantially surround the first image 314-1 of the target object. The bounding box can be used to enclose one or more points of interest (for example, enclosing the image of the target object). The use of the bounding box can simplify tracking of the target object. For example, complex geometrical shapes may be enclosed within the bounding box and tracked using the bounding box, which eliminates the need to monitor discrete changes in the size/shape/position of the complex geometrical shapes. The bounding box may be configured to vary in size and/or position as the image of the target object changes from one image frame to the next. In some cases, a shape of the bounding box may vary between image frames (e.g., changing from a square box to a circle, or vice versa, or between any shapes).

The target object 308 may have a top target point $(x_t, y_t, z_t)$ and a bottom target point $(x_b, y_b, z_b)$ in world coordinates 322, which may be projected onto the first image plane 310-1 as a top image point $(u_t, v_t)$ and a bottom image point $(u_b, v_b)$ respectively in the first target image 314-1. An optical ray 318-1 may pass through the mirror center of the imaging device, the top image point on the first image plane 310-1, and the top target point on the target object 308. The optical ray 318-1 may have an angle 41 clockwise about the Y-axis of the world coordinates 322. Similarly, another optical ray 320-1 may pass through the mirror center of the imaging device, the bottom image point on the first image plane 310-1, and the bottom target point on the target object 308. The optical ray 320-1 may have an angle 42 clockwise about the Y-axis of the world coordinates 322. As shown in FIG. 3, Θ2 (bottom target/image point)>θ1 (center of image plane)>φ1 (top target/image point) when the tracking device is at position B relative to the target object. The above optical angles are defined such that when the tracking device is at position B, the first bounding box 316-1 may be located substantially at a center portion of the first image plane 310-1.

Next, when the tracking device is at position C relative to the target object, the imaging device may be rotated by an angle θ2 counterclockwise about the Y-axis of world coordinates 322, which results in an upward pitch of the imaging device relative to the movable object. Accordingly, an optical axis 312-2 extending from mirror center of the imaging device may also rotate by the same angle θ2 counterclockwise about the Y-axis. The optical axis 312-2 may pass through the center of a second image plane 310-2 located at the focal length distance 309. At position C, the imaging device may be configured to capture a second image 314-2 of the target object onto the second image plane 310-2. Points on the second image plane 310-2 may also be represented by a set of (u, v) image coordinates. A second bounding box 316-2 may be configured to substantially surround the second image 314-2 of the target object on the second image plane 310-2.

The top target point $(x_t, y_t, z_t)$ and the bottom target point $(x_b, y_b, z_b)$ in world coordinates 322 of the target object 308 may be projected onto the second image plane 310-2 as a top image point $(u_t, v_t)'$ and a bottom image point $(u_b, v_b)'$ respectively in the second target image 314-2. An optical ray 318-2 may pass through the mirror center of the imaging device, the top image point on the second image plane 310-2, and the top target point on the target object 308. The optical ray 318-2 may have an angle γ1 counterclockwise about the Y-axis of the world coordinates 322. Similarly, another optical ray 320-2 may pass through the mirror center of the imaging device, the bottom image point on the second image plane 310-2, and the bottom target point on the target object 308. The optical ray 320-2 may have an angle γ2 counterclockwise about the Y-axis of the world coordinates 322. As shown in FIG. 3, γ1 (top target/image point)>θ1 (center of image plane)>γ2 (bottom target/image point) when the tracking device is at position C relative to the target object. The above optical angles are defined such that when the tracking device is at position C, the second bounding box 316-2 may be located substantially at a center portion of the second image plane 310-2.

Comparing the first and second bounding boxes 316-1 and 316-2, it may be observed that the size and/or position of the bounding boxes do not differ significantly between the first image plane 310-1 and the second image plane 310-2. For example, both the first and second bounding boxes 316-1 and 316-2 may lie substantially at a center portion of each of the first and second image planes 310-1 and 310-2. However, as shown in FIG. 3, the tracking device is physically located at substantially different positions (B and C) relative to the target object when the above images of the target object (and corresponding bounding boxes) are generated. For example, when the tracking device is at position B, the tracking device is located above the target object, and the imaging device has a downward pitch angle θ1. Conversely, when the tracking device is at position C, the tracking device is located below the target object, and the imaging device has an upward pitch angle θ2. The upward pitch angle θ2 may be the same or different from the downward pitch angle θ1. As shown in FIG. 3, bounding boxes in different image frames can have the same sizes and/or positions, even though the image frames may be captured when the tracking device is at substantially different spatial positions relative to the target object. Accordingly, there is a need for methods and systems that can correlate changes in relative spatial position between the tracking device and the target object, with changes in the size and/or position of the bounding box between image frames, in order to achieve real-time accurate tracking of the target object. Various embodiments of the disclosure can address the above needs, as described in detail later in the specification.

Figure 4:
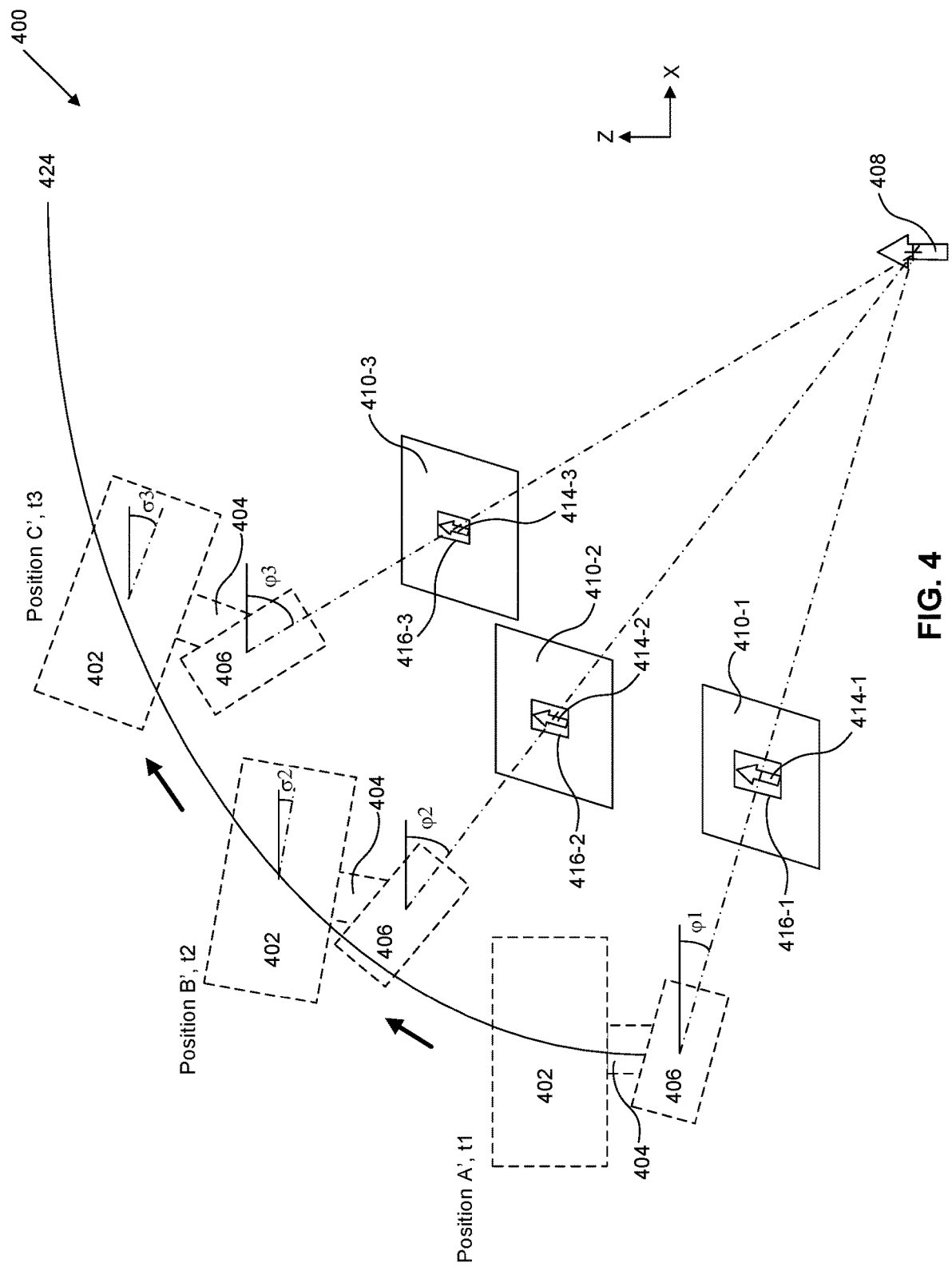
FIG. 4 illustrates the projections of a target object onto an image plane when a tracking device is at different spatial dispositions relative to a target object during motion of the tracking device, in accordance with some embodiments.

FIG. 4 illustrates the projections of a target object onto an image plane when a tracking device is at different spatial dispositions relative to the target while the tracking device is in motion, in accordance with some embodiments.

As shown in FIG. 4, a tracking device may comprise a movable object 402 configure to carry a payload (e.g., an imaging device 406). The imaging device may be coupled to the movable object using a carrier 404. The carrier may allow the imaging device to move (e.g., rotate) about one or more axes relative to the movable object. Optionally, the imaging device may be rigidly affixed to the movable object without using a carrier, such that the imaging device moves in accordance with the movable object. The tracking device may be configured to track a target object 408.

The tracking device may be configured to move along a motion path 424 such that the tracking device is at position A' at time t1, position B' at time t2, and position C' at time t3 relative to the target object. Times t1, t2, and t3 may be different points in time.

When the tracking device is at position A' relative to the target object, the imaging device may be rotated by an angle $\varphi1$ clockwise about the Y-axis. The movable object may be horizontally disposed (parallel to the X-axis), and may not have any tilt at position A'. An optical axis extending from the mirror center of the imaging device may also rotate by the same angle $\varphi1$ clockwise about the Y-axis. The optical axis may pass through the center of a first image plane 410-1 located at a focal length distance from the imaging device. At position A', the imaging device may be configured to capture a first image 414-1 of the target object onto the first image plane 410-1. A first bounding box 416-1 may be configured to substantially surround the first image 414-1 of the target object within the first image frame.

When the tracking device is at position B' relative to the target object, the imaging device may be rotated by an angle $\varphi2$ clockwise about the Y-axis. In the example of FIG. 4, $\varphi2>\varphi1$, but the disclosure is not limited thereto. In other embodiments, $\varphi2$ may be less than or equal to $\varphi1$. An optical axis extending from the mirror center of the imaging device may also rotate by the same angle $\varphi2$ clockwise about the Y-axis. Since the movable object may be in motion at position B', the movable object may be tilted depending on a magnitude of the centripetal forces acting on the movable object. For example, the movable object may be tilted by an angle $\sigma2$ clockwise about the Y-axis. The optical axis may pass through the center of a second image plane 410-2 located at the focal length distance from the imaging device. At position B', the imaging device may be configured to capture a second image 414-2 of the target object onto the second image plane 410-2. A second bounding box 416-2 may be configured to substantially surround the second image 414-2 of the target object.

When the tracking device is at position C' relative to the target object, the imaging device may be rotated by an angle $\varphi3$ clockwise about the Y-axis. In the example of FIG. 4, $\varphi3>\varphi2>\varphi1$, but the disclosure is not limited thereto. In other embodiments, $\varphi3$ may be less than or equal to $\varphi2$ and/or $\rho1$. An optical axis extending from the mirror center of the imaging device may also rotate by the same angle $\varphi3$ clockwise about the Y-axis. Since the movable object may be in motion at position C', the movable object may be tilted depending on a magnitude of the centripetal forces acting on the movable object. For example, the movable object may be tilted by an angle $\sigma3$ clockwise about the Y-axis. In the example of FIG. 4, $\sigma3>\sigma2$, but the disclosure is not limited thereto. In other embodiments, $\sigma3$ may be less than or equal to $\sigma2$. The optical axis may pass through the center of a third image plane 410-3 located at the focal length distance from the imaging device. At position C', the imaging device may be configured to capture a third image 414-3 of the target object onto the third image plane 410-3. A third bounding box 416-3 may be configured to substantially surround the third image 414-3 of the target object.

As shown in FIG. 4, the positions of the bounding boxes 416-1, 416-2, and 416-3 may be located at substantially a same position within the image planes 410-1, 410-2, and 410-3. Although the target object may be located at substantially a same distance from the tracking device at positions A', B', and C', the sizes of the bounding boxes 416-1, 416-2, and 416-3 may differ depending on the orientations of the tracking device relative to the target object. Accordingly, there is a need for methods and systems that can correlate changes in orientation of the tracking device relative to the target object, with changes in the size and/or position of the bounding box between image frames, in order to achieve real-time accurate tracking of the target object.

The systems, methods, and devices provided herein can extract useful information from changes in one or more features of the bounding box between image frames. The changes may be generated due to relative movement between the target object and the tracking device. For example, the systems, methods, and devices provided herein can determine changes in size and/or position of the bounding box between images frames, and adjust movement of the tracking device to accurately track the target object based on the changes in size and/or position of the bounding box. Embodiments of the disclosure are next described in detail with reference to FIGS. 5 through 24.

Figure 5:
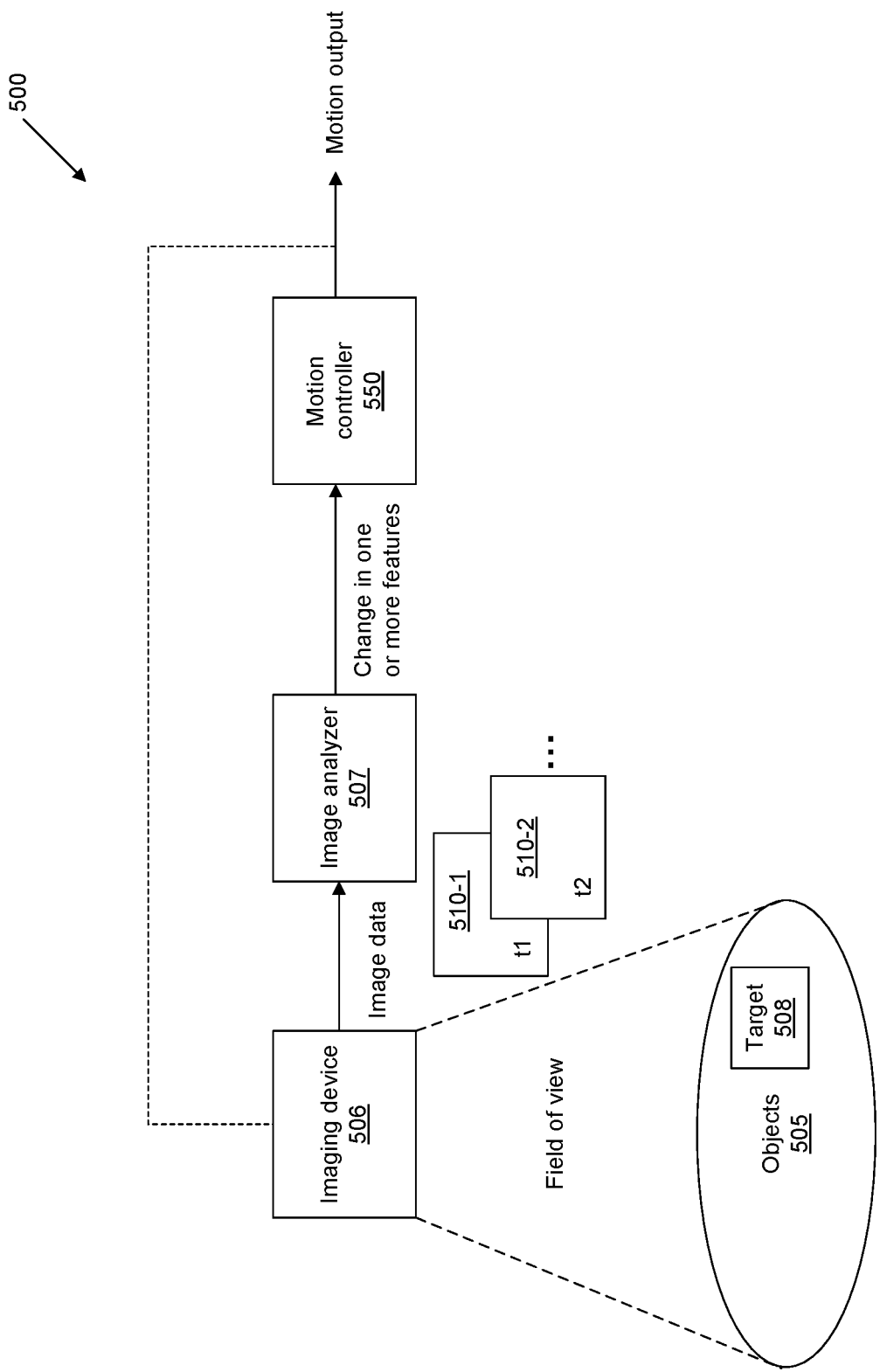
FIG. 5 illustrates a block diagram of a visual tracking system configured to control a tracking device to track a target object, in accordance with some embodiments.

FIG. 5 illustrates a block diagram of a visual tracking system configured to control a tracking device to track or follow a target object, in accordance with some embodiments. The tracking device may constitute part of the visual tracking system. The tracking device may include a movable object configured to carry a payload. The payload may be an imaging device that supports visual tracking. In some embodiments, the visual tracking system may be implemented as a stand-alone system, and need not be provided on the movable object. In some other embodiments, the visual tracking system may be provided on the movable object. As shown in FIG. 5, a visual tracking system 500 may include an imaging device 506, an image analyzer 507, and a motion controller 550. The visual tracking system may be configured to determine a change in one or more features (e.g., a change in size and/or position of a bounding box) between a plurality of image frames, and to adjust a movement of the tracking device based on the change in the one or more features. The plurality of image frames may comprise images of the target object captured when the target object and the tracking device are at different spatial dispositions relative to one another.

The imaging device may be configured to capture image data of a plurality of objects 505. The image data may correspond to, for example, still images or video frames of the plurality of objects. The objects may include any physical object or structure that can be optically identified and/or tracked in real-time by the tracking device. Optical tracking has several advantages. For example, optical tracking allows for wireless 'sensors', is less susceptible to noise, and can enable many objects (e.g., different types of objects) to be tracked simultaneously. The objects can be depicted in still images and/or video frames in a 2D or 3D format, can be real-life and/or animated, can be in color, black/white, or grayscale, and can be in any color space.

A clear visual path may be provided between the imaging device and the plurality of objects, such that the objects lie in the field-of-view of the imaging device. In some embodiments, the objects may be operatively connected to one or more of the components in FIG. 5. For example, the objects may be in communication with one or more of the components in system 500. In some embodiments, the objects may include GPS apparatus (e.g., a GPS receiver) disposed thereon.

In some other embodiments, the objects need not be operatively connected to any of the components in FIG. 5. For example, the objects need not be in communication with any of the components in system 500. The objects also need not include any GPS apparatus (e.g., a GPS receiver) disposed thereon. Instead, the objects can be any stand-alone physical object or structure. Some of the objects may be capable of motion (e.g., translation and/or rotation, land-bound travel, aerial flight, etc.). Any type, range, and magnitude of motion of some or all of the objects may be contemplated, as described below. The objects may include a target object 508 to be tracked. The visual tracking system 500 may be configured to control the tracking device to track the target object.

The image data captured by the imaging device may be encoded in a plurality of image signals. The plurality of image signals may be generated using the imaging device. The image signals may comprise a plurality of image frames captured at different times using the imaging device. For example, the image signals may comprise a first image frame 510-1 captured at time t1 and a second image frame 510-2 captured at time t2, whereby time t2 may be a point in time occurring after time t1. The first and second image frames may comprise images of the target object. For example, the first image frame may comprise a first image of the target object, and the second image frame may comprise a second image of the target object. The first image of the target object may be substantially surrounded by a first bounding box within the first image frame. The second image of the target object may be substantially surrounded by a second bounding box within the second image frame. The first and second bounding boxes may have different geometrical and/or positional characteristic(s). For example, in some embodiments, the first and second bounding boxes may have different sizes (e.g., heights) in different image frames. In other embodiments, the first and second bounding boxes may be located at different positions within different image frames.

In some embodiments, the tracking information obtained from the tracking device may be used by a control terminal to display the target object as it is being tracked (e.g., via a graphical tracking indicator such as a bounding box around an image of the target object). In various embodiments, the data received by the control terminal may include raw data (e.g., raw sensing data as acquired by the sensors) and/or processed data (e.g., tracking information as processed by one or more processors on the tracking device).

The control terminal can be configured to display data received from the tracking device via a display. The displayed data may include sensing data such as images (e.g., still images and videos) acquired by an imaging device on the tracking device. The displayed data may also include tracking information that is displayed separately from the image data or superimposed on top of the image data. For example, the display may be configured to display the images where the target object is indicated or highlighted with a tracking indicator such as a box, circle, or any other geometric shape surrounding the target object being tracked. In some embodiments, the images and the tracking indicator are displayed in substantially real-time as the image data and tracking information are received from the tracking device and/or as the image data is acquired. In other embodiments, the display may be provided after some delay.

In some embodiments, the image data may be augmented by or otherwise combined with the tracking information, as produced by one or more processors, to show a target object with a tracking indicator (e.g., a circle or box around the target object). A user may view the augmented image data to see the target object as it is being tracked by the imaging device. The user may also interact with the control terminal based on the augmented image data. For example, the user may select a different target object to track from the augmented image data (e.g., by touching an area of the screen corresponding to the different target object).

The received images may be displayed with tracking data to show the target object that is being tracked by the tracking device. For example, the tracking data may be used to determine the position and/or size of the target object being tracked in some or all of the images. Based on this information, a tracking indicator may be generated and displayed. For example, given the target location within a given image, the image may be displayed with a tracking indicator at approximately the target location and of a size large enough to cover the target object or a portion thereof. Examples of a tracking indicator may include a box, a circle, an oval, or a graphical object of any other suitable shape, color, or size.

In some embodiments, the first image frame (comprising a first image of the target object) may be captured when the tracking device and the target object are in a first position relative to one another. The second image frame (comprising a second image of the target object) may be captured when the tracking device and the target object are in a second position relative to one another. The second position may be different from the first position. A difference between the first position and the second position may comprise a change in relative orientation and/or relative distance between the tracking device and the target object.

Each image frame may comprise a plurality of pixels. In some embodiments, the plurality of image frames may comprise a plurality of color images, and the plurality of pixels may comprise color pixels. In other embodiments, the plurality of image frames may comprise a plurality of grayscale images, and the plurality of pixels may comprise grayscale pixels. In some embodiments, each pixel in the plurality of grayscale images may have a normalized grayscale value.

The plurality of pixels in the image frames may be associated with a plurality of feature points. Some of the feature points may or may not be associated with the target object. A feature point may correspond to a point or an area on an object. In some embodiments, a feature point may be represented by a single pixel in an image frame. For example, each feature point may have a 1:1 correspondence (or 1:1 correlation) with a corresponding pixel. In some embodiments, each feature point may directly correlate with a grayscale value of the corresponding pixel. In some embodiments, a feature point may be represented by a cluster of pixels in an image frame. For example, each feature point may have a 1:n correspondence (or 1:n correlation) with n pixels, where n is any integer greater than 1. The cluster of pixels may include 2, 3, 4, 5, 6, 7, 8, 9, 10, or more pixels. All pixels can be individually analyzed, either simultaneously or sequentially. Likewise, all clusters of pixels can be individually analyzed, either simultaneously or sequentially. Analysis of clusters of pixels can help to reduce the processing time (as well as processing power) required to analyze all pixels in an image frame.

In some embodiments, a feature may comprise a set of feature points. The feature may be, for example a bounding box that substantially surrounds an image of the target object within an image frame. Optionally, the feature may be a geometrical and/or positional characteristic(s) or parameter(s) associated with a set of feature points. For example, the feature may correspond to a size and/or position of a bounding box defined by the set of feature points.

In some embodiments, the image frames may be provided to an output device (not shown). For example, the images of the target object and the bounding box may be depicted in one or more resulting image frames that are displayed on the output device. The resulting image frames may be encoded in the analyzed signals. The resulting image frames may include annotations (e.g., bounding box, labels, circled regions, different color coding, etc.) distinguishing the target object from background objects. The output device can be a display device such as, for example, a display panel, monitor, television, projector, or any other display device. In some embodiments, the output device can be, for example, a cell phone or smartphone, personal digital assistant (PDA), computer, laptop, desktop, a tablet PC, media content player, set-top box, television set including a broadcast tuner, video game station/system, or any electronic device capable of accessing a data network and/or receiving analyzed image data from the image analyzer.

Figure 6:
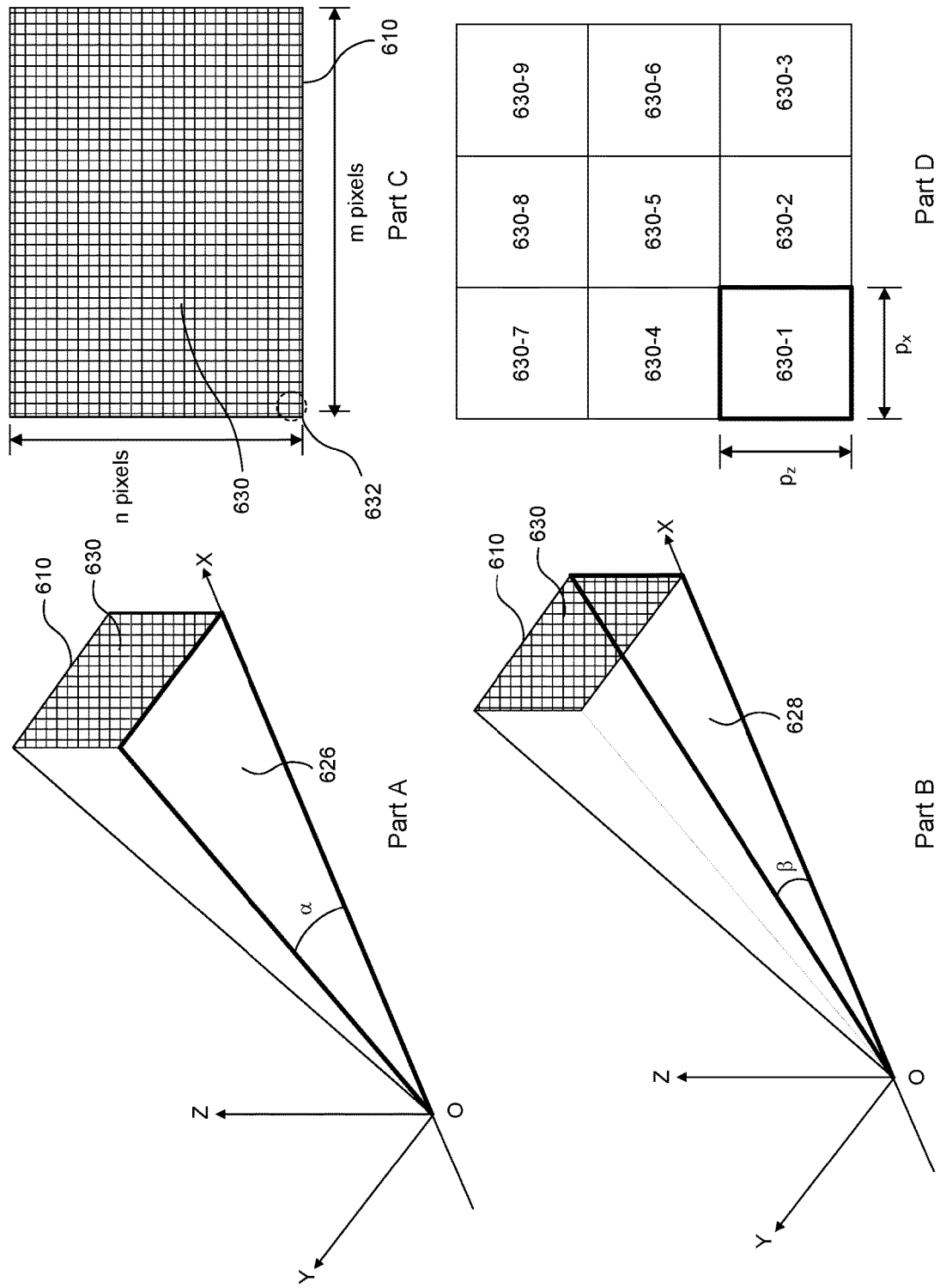
FIG. 6 illustrates exemplary angles represented by each pixel in a lateral direction and a longitudinal direction on an image plane generated by an imaging device on a tracking device, in accordance with some embodiments.

As mentioned above, each image frame may comprise a plurality of pixels. An angle may be represented by each pixel depending on the field-of-view of the imaging device and size of an image plane. FIG. 6 illustrates exemplary angles represented by each pixel in a lateral direction and a longitudinal direction on an image plane, in accordance with some embodiments. In FIG. 6, an image plane 610 may be provided at a focal length distance from a point O. The point O may correspond to a mirror center of an imaging device (not shown). The imaging device may have a field-of-view characterized by an angle α in the X-Y plane and an angle θ in the X-Z plane. The angle α may define a first triangle 626 in the X-Y plane (shown in part A), and the angle 3 may define a second triangle 628 in the X-Z plane (shown in part B). An image frame formed on the image plane may comprise m×n pixels (shown in part C). Accordingly, the image frame may have a resolution of m×n pixels. For example, the image frame may have m number of pixels in a direction parallel to the Y-axis, and n number of pixels in a direction parallel to the Z-axis. m and n may be any combination of integers. For example, in some embodiments, m may be 640 and in may be 360, such that the image frame has a resolution of 640×360. Part D shows a close-up of a section 632 of the image frame. The section 632 may comprise a plurality of pixels (e.g., nine pixels) 630-1 through 630-9. The pixels may or may not have the same size. An angle p represented by each pixel may comprise an angle $p_x$ on the X-Y plane and an angle $p_z$ on the X-Z plane. The angle $p_x$ may be given by $p_x=\alpha/m$. The angle $p_z$ may be given by $p_z=\beta/n$. In some embodiments, each pixel may be a square pixel such that $p=p_x=p_z$ (i.e., $\alpha/m=\beta/n$).

As previously described, a bounding box may be generated within an image frame. The bounding box may be configured to substantially surround pixels (or feature points) that are associated with the target object. The bounding box may have a regular shape or an irregular shape. For example, the bounding box may be a circle, an ellipse, or a polygon. The bounding box may be configured to substantially surround the images of the target object within the image frames. For example, the bounding box may substantially surround a first image of the target object within a first image frame, and a second image of the target object within a second image frame.

Referring back to FIG. 5, the image analyzer may be configured to receive and analyze image data from the imaging device. For example, the image analyzer may be configured to determine a change in position of the bounding box between the first image frame and the second image frame. The change in position (offset distance) of the bounding box between image frames may be generated when translational motion occurs between the tracking device and the target object along a direction orthogonal to an optical axis of an imaging device on the tracking device. Additionally, the change in position (offset distance) of the bounding box between image frames may be generated when the tracking device rotates relative to the target object about at least one of a yaw, roll, or pitch axis. The image analyzer may be configured to measure the change in position of the bounding box relative to a reference point within the first image frame and the second image frame. In some cases, the reference point may be located at a center portion of the first image frame and the second image frame. In other cases, the reference point may be located away from a center portion of the first image frame and the second image frame. The image analyzer may further determine an offset distance between the reference point in the image frames and a target datum point associated with the bounding box. The target datum point may be located within or on the bounding box. The offset distance may be determined based on the change in position of the bounding box between the first and second image frames.

The image analyzer may provide the change in position (offset distance) of the bounding box to the motion controller 550. As previously mentioned, the change in position (offset distance) of the bounding box may be generated due to: (1) relative translational motion between the tracking device and the target object along a direction orthogonal to an optical axis, and/or (2) relative rotational motion between the tracking device and the target object about a yaw, roll, and/or pitch axis of the tracking device. The motion controller may be configured to control relative movement between the tracking device and the target object based on the offset distance. For example, the motion controller may control the relative movement by directing the tracking device to move towards or away from the target object, and/or rotate relative to the target object (e.g., about a yaw, roll, and/or pitch axis). In some cases, the motion controller may control the relative movement by directing the tracking device to move laterally towards or away from the target object. The motion controller may also determine a change in distance and/or orientation between the tracking device and the target object based on the change in position of the bounding box. The change in orientation may include a change in attitude of the tracking device (for example, about a yaw, roll, and/or pitch axis of the tracking device). The change in distance between the tracking device and the target object may be generated as the target object moves towards or away from the tracking device. The change in orientation between the tracking device and the target object may be generated as the tracking device rotates relative to the target object about a yaw, roll, and/or pitch axis. Alternatively, the change in distance between the tracking device and the target object may be generated as the target object and the tracking device move towards and/or away from each other. The relative movement between the target object and the tracking device may be in a lateral direction. The change in distance between the tracking device and the target object may be generated in a first direction. The first direction as used herein may refer to a natural direction. The first direction may be orthogonal to an optical axis of the imaging device that extends from the imaging device. In some cases, the first direction may be parallel to a reference surface. The reference surface may be, for example a ground plane. The image analyzer may be further configured to determine a change in size of the bounding box between the first image frame and the second image frame. The change in size of the bounding box may comprise a change in height of the bounding box. The image analyzer may provide the change in size (height difference) of the bounding box to the motion controller 550. The motion controller may determine a change in distance between the tracking device and the target object based on the change in height of the bounding box. The motion controller may be configured to control relative movement between the tracking device and the target object based on the change in distance. For example, the motion controller may control the relative movement by directing the tracking device to move towards or away from the target object based on the change in distance. The change in distance between the tracking device and the target object may be generated as the target object moves towards or away from the tracking device. Alternatively, the change in distance between the tracking device and the target object may be generated as the target object and the tracking device move towards and/or away from each other. The change in distance between the tracking device and the target object may be generated in a second direction. The second direction may be parallel to an optical axis of the imaging device that extends from the tracking device. The second direction may be orthogonal to the first direction. In some cases, the second direction may be parallel to a reference surface. The reference surface may be, for example a ground plane.

Accordingly, the motion controller may be configured to control relative movement between the tracking device and the target object, based on the change in distance between the tracking device and the target object in the first and/or second direction. For example, the motion controller may direct the tracking device to move towards or away from the target object, depending on the change in distance between the tracking device and the target object, and also the directions in which the change in distance is generated. The motion controller may also direct the tracking device to change its orientation relative to the target object, depending on the change in position of the bounding box between image frames. The change in orientation of the tracking device may include a rotational motion of the tracking device about a yaw, roll, and/or pitch axis. In some embodiments, the motion controller can simultaneously control translation and rotation of the tracking device relative to the target object, based on changes in the size and/or position of the bounding box between different image frames.

The motion controller may be configured to adjust an orientation of the tracking device based on the change in the one or more features between a plurality of image frames. For example, the motion controller may adjust an orientation of the tracking device based on the change in the size and/or position of a bounding box between the first image frame and the second image frame. The motion controller may adjust the orientation of the tracking device by adjusting a yaw, roll, and/or pitch angle of the tracking device. In some cases, the motion controller may adjust the orientation of the tracking device relative to the target object based on the change in the one or more features. In other cases, the motion controller may adjust the movement of the tracking device relative to the target object based on the change in the one or more features. In some other cases, the motion controller may adjust the movement of the tracking device in at least one direction that is selected from a plurality of directions in a world coordinate system.

In some embodiments, the motion controller may adjust the movement of the tracking device based on an expected velocity vector and an expected rotational angular speed, so as to achieve tracking of the target object. The motion controller may obtain the expected velocity vector and the expected rotational angular speed based on a change in one or more characteristics associated with the one or more features. The one or more characteristics may comprise geometrical and/or positional characteristics associated with the one or more features. For example, the geometrical characteristics may comprise a size (or height) of the one or more features within one or more image frames. The positional characteristics may comprise a position of the one or more features within one or more image frames.

The motion controller may be configured to minimize a change in transverse position of the one or more features to obtain the expected rotational angular speed. The change in transverse position of the one or more features may be associated with relative movement between the tracking device and the target object in a first direction. The first direction may be parallel to a reference surface, and may be orthogonal to an optical axis that extends from the imaging device to the target object.

In some embodiments, the motion controller may minimize a change in position of the one or more features to obtain a first velocity component. The first velocity component may be in a direction that is orthogonal to an optical axis of an imaging device on the tracking device. The motion controller may also minimize a change in size of the one or more features to obtain a second velocity component. The second velocity component may be in a direction along or parallel to the optical axis of the tracking device. The motion controller may further fuse together (such as combining) the first velocity component and the second velocity component to obtain the expected velocity vector. The change in position of the one or more features may be associated with relative translational movement between the tracking device and the target object in a first direction. The change in position of the one or more features may also be associated with relative rotational movement between the tracking device and the target object. The relative rotational movement may occur about a yaw, roll, and/or pitch axis of the tracking device. The change in size of the one or more features may be associated with relative movement between the tracking device and the target object in a second direction. The first direction may be orthogonal to an optical axis of the imaging device on the tracking device. The second direction may be along or parallel to an optical axis of the imaging device on the tracking device. The second direction may be orthogonal to the first direction. The expected velocity vector may extend in a third direction that is different from the first direction and the second direction. In some embodiments, the motion controller may be configured to minimize the change in size and/or position of the one or more features using one or more feedback control loops, so as to achieve tracking of the target object. In some cases, at least one feedback control loop may be implemented using a proportional-integral-derivative (PID) controller. Optionally, at least one feedback control loop may be implemented using a proportional-derivative (PD) controller.

In some embodiments, instead of minimizing the change in position and size of the one or more features, the motion controller can calculate the relative displacements between the tracking device and the target object, and minimize the change in displacements to achieve tracking of the target object. For example, the motion controller may obtain a first displacement based on a change in position of the one or more features, and obtain a second displacement based on a change in size of the one or more features. The motion controller may combine the first displacement and the second displacement to obtain a combined displacement. The motion controller may further minimize a change in the combined displacement to obtain the expected velocity vector. The change in position of the one or more features may be associated with relative movement between the tracking device and the target object in a first direction. The change in size of the one or more features may be associated with relative movement between the tracking device and the target object in a second direction. The first direction may be orthogonal to an optical axis of the imaging device on the tracking device. The second direction may be along or parallel to the optical axis of the imaging device, and may be orthogonal to the first direction. The expected velocity vector may extend in a third direction that is different from the first direction and the second direction. In some cases, the third direction may be parallel to a reference surface. In some embodiments, the motion controller may be configured to minimize the change in the combined displacement using one or more feedback control loops, so as to achieve tracking of the target object. In some cases, at least one feedback control loop may be implemented using a proportional-integral-derivative (PID) controller. Optionally, at least one feedback control loop may be implemented using a proportional-derivative (PD) controller.

As previously described, the motion controller may be configured to minimize the change in size and/or position of the one or more features using one or more feedback control loops, so as to achieve tracking of the target object. In some cases, at least one feedback control loop may be implemented using a proportional-integral-derivative (PID) controller. Optionally, at least one feedback control loop may be implemented using a proportional-derivative (PD) controller. In some cases, the PID controller (or PD controller) may be configured to minimize a change in position of the one or more features to obtain the expected velocity vector and the expected rotational angular speed. The PID controller may be further configured to minimize a change in size of the one or more features to update/obtain the expected velocity vector.

In some embodiments, the motion controller can minimize the change in position of the one or more features by adjusting an attitude of the tracking device, and minimize the change in size of the one or more features by adjusting a distance of the tracking device from the target object. The motion controller can minimize the change in position first, followed by the change in size of the one or more features. Alternatively, the motion controller can minimize the change in size first, followed by the change in position of the one or more features. Optionally, the motion controller can simultaneously minimize the change in position and size of the one or more features. The attitude of the tracking device, and the distance of the tracking device from the target object, can be measured with aid of sensors including global positioning system (GPS) sensors, motion sensors, inertial sensors, proximity sensors, lidar, radar, time-of-flight cameras, etc.

Figure 7:
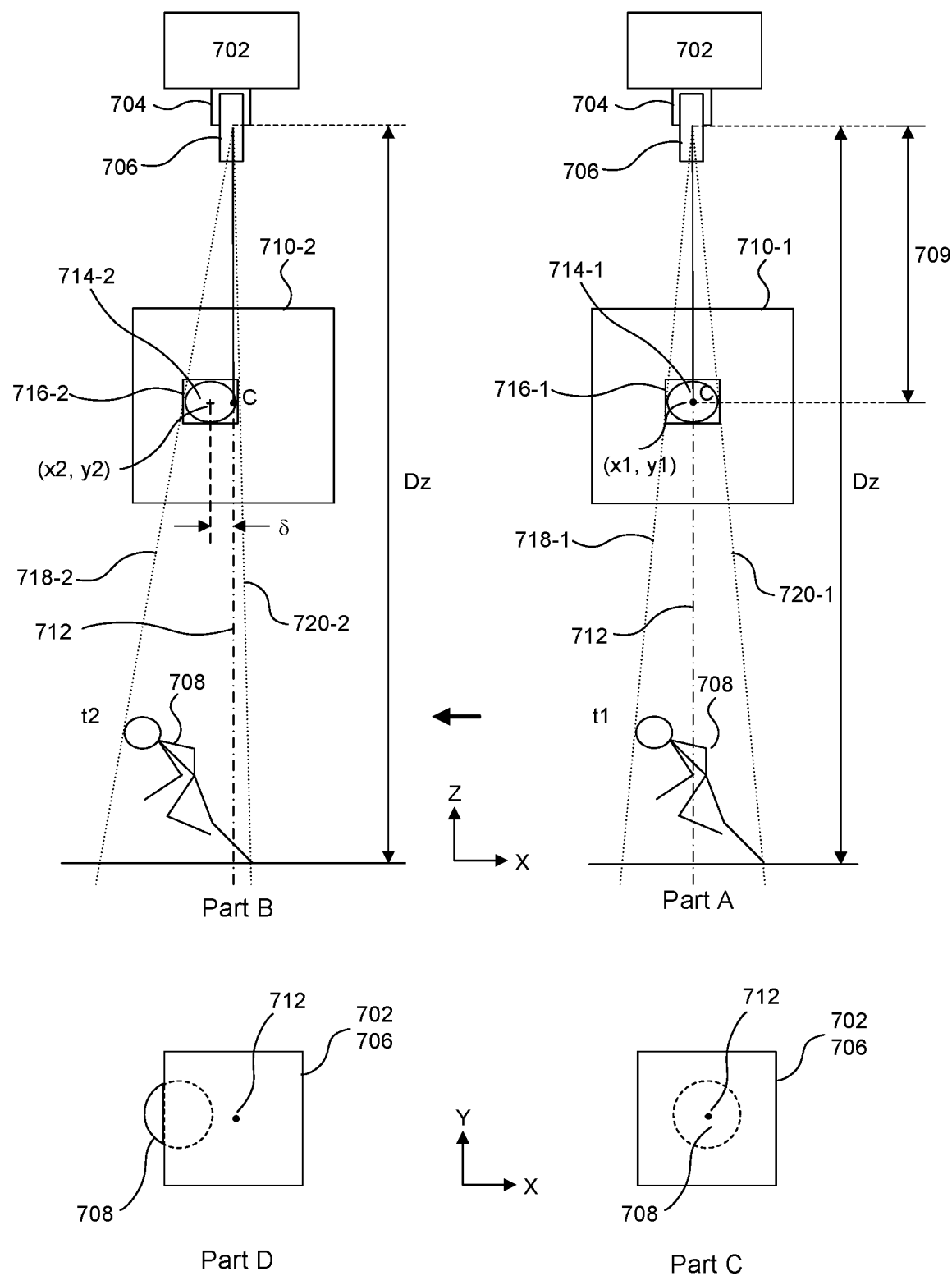
FIG. 7 illustrates the change in position of a bounding box in a plurality of image frames when a target object moves relative to a tracking device in a direction that is orthogonal to an optical axis of an imaging device on the tracking device, in accordance with some embodiments.
Figure 8:
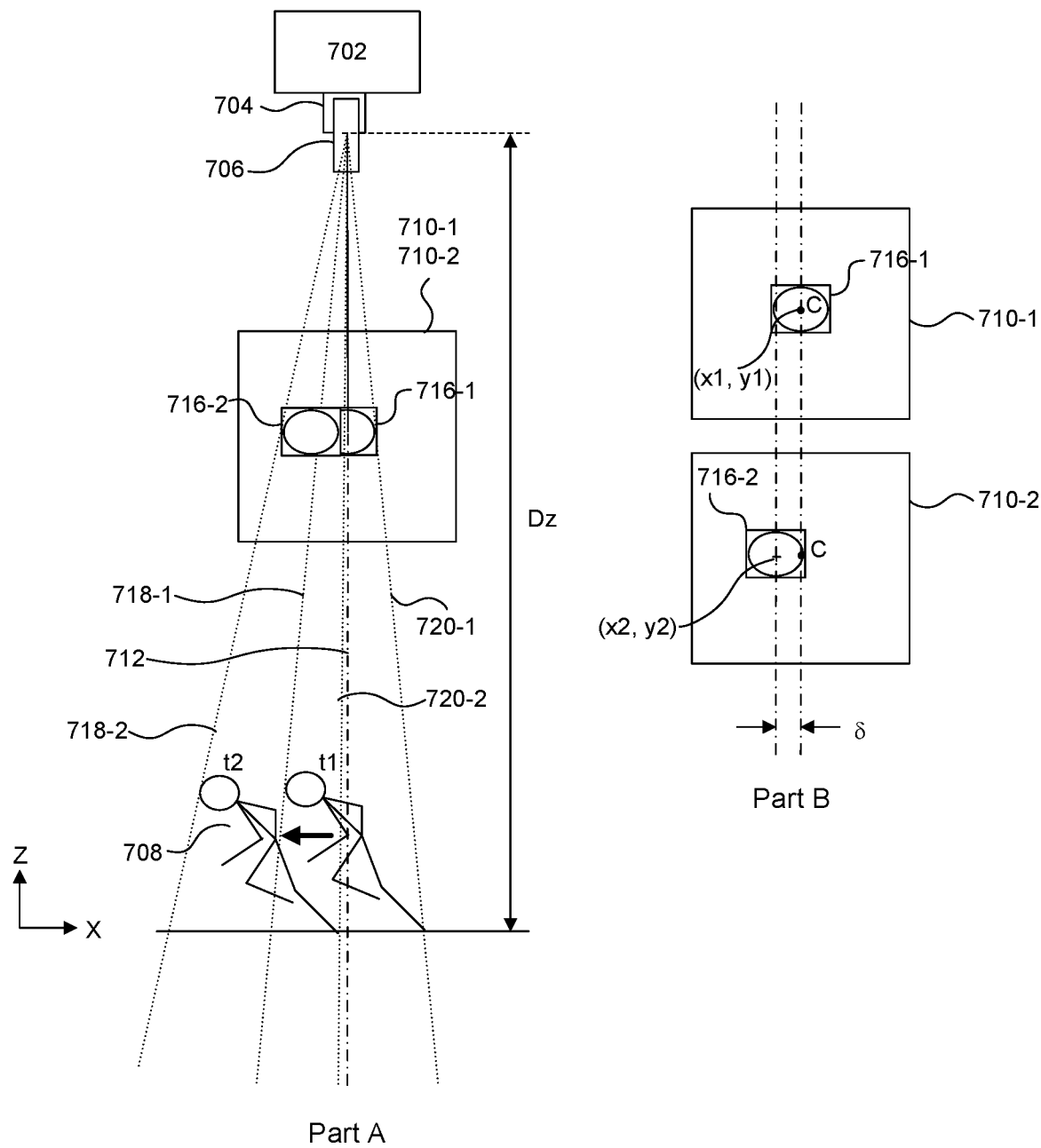
FIG. 8 illustrates a different visual depiction of the embodiment of FIG. 7, in accordance with some embodiments.
Figure 9:
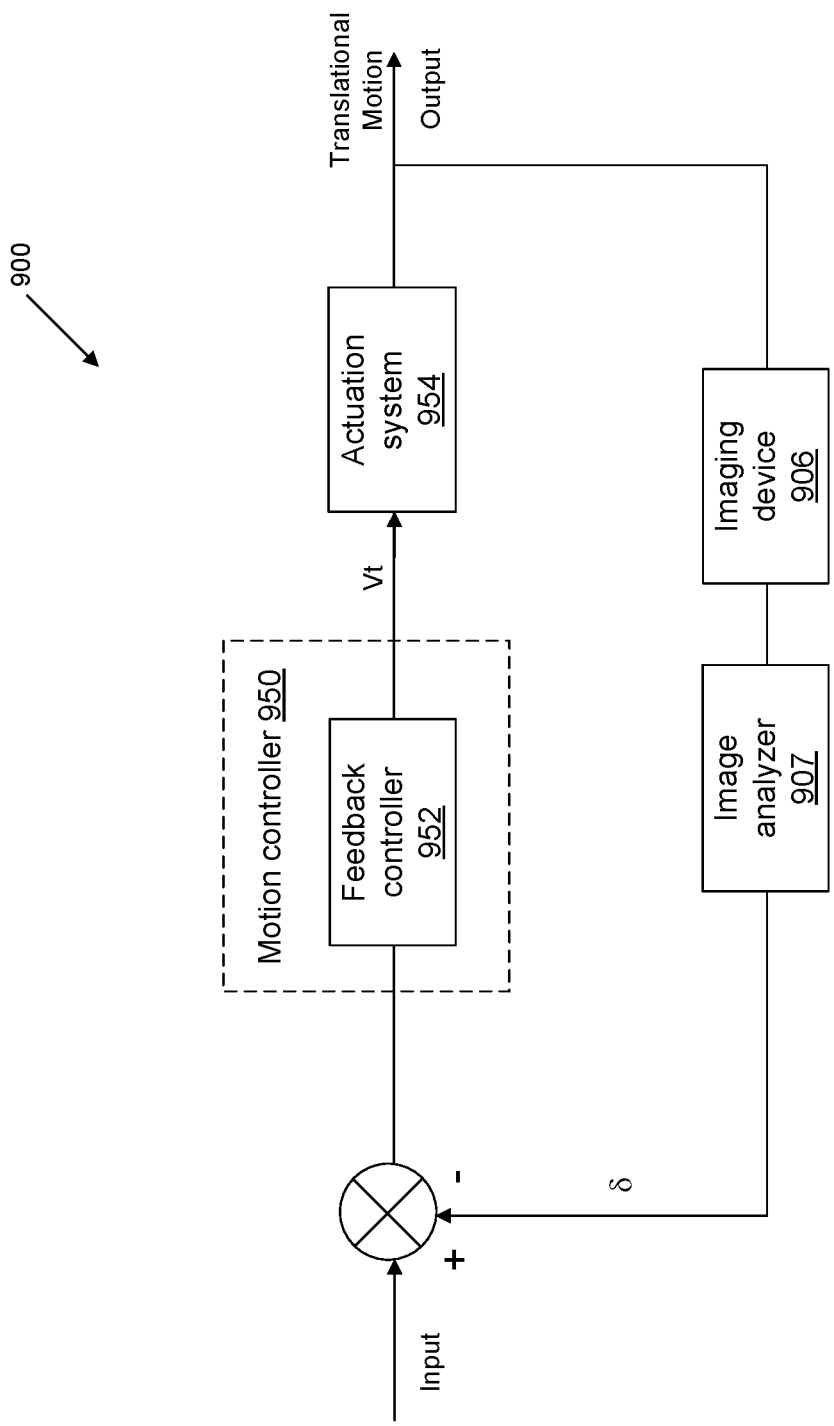
FIG. 9 illustrates a block diagram of an exemplary feedback control loop for tracking the target object in FIGS. 7 and 8 based on relative translational movement between the tracking device and the target object in a direction orthogonal to the optical axis, in accordance with some embodiments.

As previously described, the motion controller may be configured to obtain the expected velocity vector by minimizing the change in the one or more features (e.g., change in size and/or position of bounding box) between image frames using one or more feedback control loops. FIGS. 7 and 8 illustrate a change in position of a bounding box within a plurality of image frames. FIG. 9 illustrates an exemplary feedback control loop for minimizing the change in position of the bounding box to obtain a first velocity component, that can be used to effect motion of the tracking device to track the target object.

FIG. 7 illustrates the change in position of a bounding box in a plurality of image frames when a target object moves relative to a tracking device in a direction orthogonal to an optical axis of an imaging device on the tracking device, in accordance with some embodiments. The tracking device may include a movable object carrying the imaging device. In part A of FIG. 7, a movable object 702 carrying an imaging device 706 may be directly above a target object 708 at time t1. An optical axis 712 may extend from a mirror center of the imaging device to a center portion of the target object. The optical axis 712 may pass through the center of a first image plane 710-1 located at a focal length distance 709 from the mirror center of the imaging device.

The imaging device may be configured to capture a first image 714-1 of the target object onto the first image plane 710-1. Points on the first image plane 710-1 may be represented by a set of (u, v) image coordinates. A first bounding box 716-1 may be configured to substantially surround the first image 714-1 of the target object. The bounding box may be configured to vary in size and/or position when the target object moves relative to the tracking device.

The size and position of the first bounding box may be defined by optical rays 718-1 and 720-1. The optical ray 718-1 may pass through the mirror center of the imaging device, a first image point on the first image plane 710-1, and a first target point on the target object 708. The optical ray 720-1 may pass through the mirror center of the imaging device, a second image point on the first image plane 710-1, and a second target point on the target object 708. In part A, the first bounding box may be located substantially at a center portion of the first image plane 710-1. For example, a set of center coordinates (x1, y1) of the first bounding box may coincide with a center C of the first image plane. In some alternative embodiments, the first bounding box may be located substantially away from the center portion of the first image plane 710-1, and that the center coordinates (x1, y1) of the first bounding box may not coincide with the center C of the first image plane.

In part B, the target object may have moved to a different position relative to the tracking device at time t2. For example, the target object may have moved along the X-axis. Accordingly, the optical axis 712 may no longer extend from the mirror center of the imaging device to the center portion of the target object at time t2.

The imaging device may be configured to capture a second image 714-2 of the target object onto a second image plane 710-2. Points on the second image plane 710-2 may also be represented by a set of (u, v) image coordinates. A second bounding box 716-2 may be configured to substantially surround the second image 714-2 of the target object. The size and position of the second bounding box may be defined by optical rays 718-2 and 720-2. The optical ray 718-2 may pass through the mirror center of the imaging device, a first image point on the second image plane 710-2, and the first target point on the target object 808. The optical ray 720-2 may pass through the mirror center of the imaging device, a second image point on the second image plane 710-2, and the second target point on the target object 708. Unlike part A, the second bounding box in part B may not be located at a center portion of the second image plane 710-2. For example, a set of center coordinates (x2, y2) of the second bounding box may not coincide with a center C of the second image plane. As shown in part B, the coordinate x2 may be shifted from the center C of the second image plane by an offset distance δ.

Parts C and D of FIG. 7 illustrate views of the tracking device and the target object as viewed from above. Part C corresponds to the configuration shown in Part A, and Part D corresponds to the configuration shown in Part B. Referring to Parts A and C, the target object is directly below the tracking device at time t1, such that the optical axis of the imaging device passes through the center of the target object. Referring to Parts B and D, the target object has moved away from the tracking device along the X-axis at time t2, such that the optical axis of the imaging device no longer passes through the center of the target object.

FIG. 8 provides a different visual depiction of the embodiment of FIG. 7, in accordance with some embodiments. FIG. 8 is similar to FIG. 7 except the first and second image planes are overlapped together in part A to illustrate the change in position of the bounding box at time t2 (relative to time t1). Part B is an exploded view of the first and second image planes, and shows the offset distance S between the first bounding box in the first image plane and the second bounding box in the second image plane.

FIG. 9 illustrates a block diagram of an exemplary feedback control system for adjusting movement of the tracking device based on the change in position of the bounding box in FIGS. 7 and 8, in accordance with some embodiments. The change in position of the bounding box between image frames may be caused by relative translational movement between the tracking device and the target object in a direction that is orthogonal to an optical axis of the imaging device. As shown in FIG. 9, a feedback control system 900 may comprise an imaging device 906, an image analyzer 907, a motion controller 950, and an actuation system 954. The motion controller may comprise a feedback controller 952. The feedback control system may be configured to obtain a first velocity component by minimizing the change in position of the bounding box between image frames. The first velocity component may be a translational velocity component. The feedback control system may be further configured to track the target object by adjusting movement of the tracking device based on the first velocity component.

The first velocity component may be obtained by minimizing a positional error using the feedback control loop. The positional error may be calculated based on a change in position of a bounding box between the first image frame and the second image frame. The change in position of the bounding box may be determined relative to a reference point within the first image frame and the second image frame. The first velocity component may be obtained by minimizing the difference between the positions of the bounding box at times t1 and t2 using the feedback control loop. As previously described in FIGS. 7 and 8, the change in position of the bounding box may be associated with the offset distance δ. The input to system 900 may comprise a threshold positional offset. In some cases, the threshold positional offset may be zero or substantially zero, in order to minimize the offset distance δ. When the threshold positional offset is zero, the system may adjust the translational movement of the tracking device such that the bounding box maintains substantially a same position across the image frames.

The imaging device may be configured to capture image data (e.g., the first and second image frames in FIGS. 7 and 8). The image data may be provided to the image analyzer. The image analyzer may be configured to analyze the image data to determine the change in position of the bounding box (offset distance δ) between image frames. The change in position of the bounding box may be compared against the input, and provided to the feedback controller. The feedback controller may be configured to calculate a positional error d_error1 in the bounding box at time t2 using the following equation:

$$d\_error1 = \tan(\delta * p) * Dz$$

where δ is the offset distance, p is an angle represented by each pixel in the first image frame, and Dz corresponds to a vertical distance along the Z-axis between the tracking device and the target object.

Next, the feedback controller may use a proportional-integral-derivative (PID) method (or a proportional-derivative (PD) method) to minimize d_error1, thereby obtaining a first velocity component Vt. The first velocity component Vt may be provided to the actuation system 954. The actuation system may be configured to adjust the movement of the tracking device along a predefined axis (e.g., X-axis) based on the first velocity component Vt, so as to track the target object. The first velocity component may be a translational velocity component. By adjusting the movement of the tracking device based on the first velocity component Vt, the bounding box can maintain substantially the same position across image frames. The adjusted movement of the tracking device may correspond to a motion output of the feedback control system. The above steps may be repeated iteratively in a closed loop until the difference d_error1 is equal to or less than the threshold positional offset. The first velocity component Vt may dynamically change during the one or more iterations in the above steps.

Figure 10:
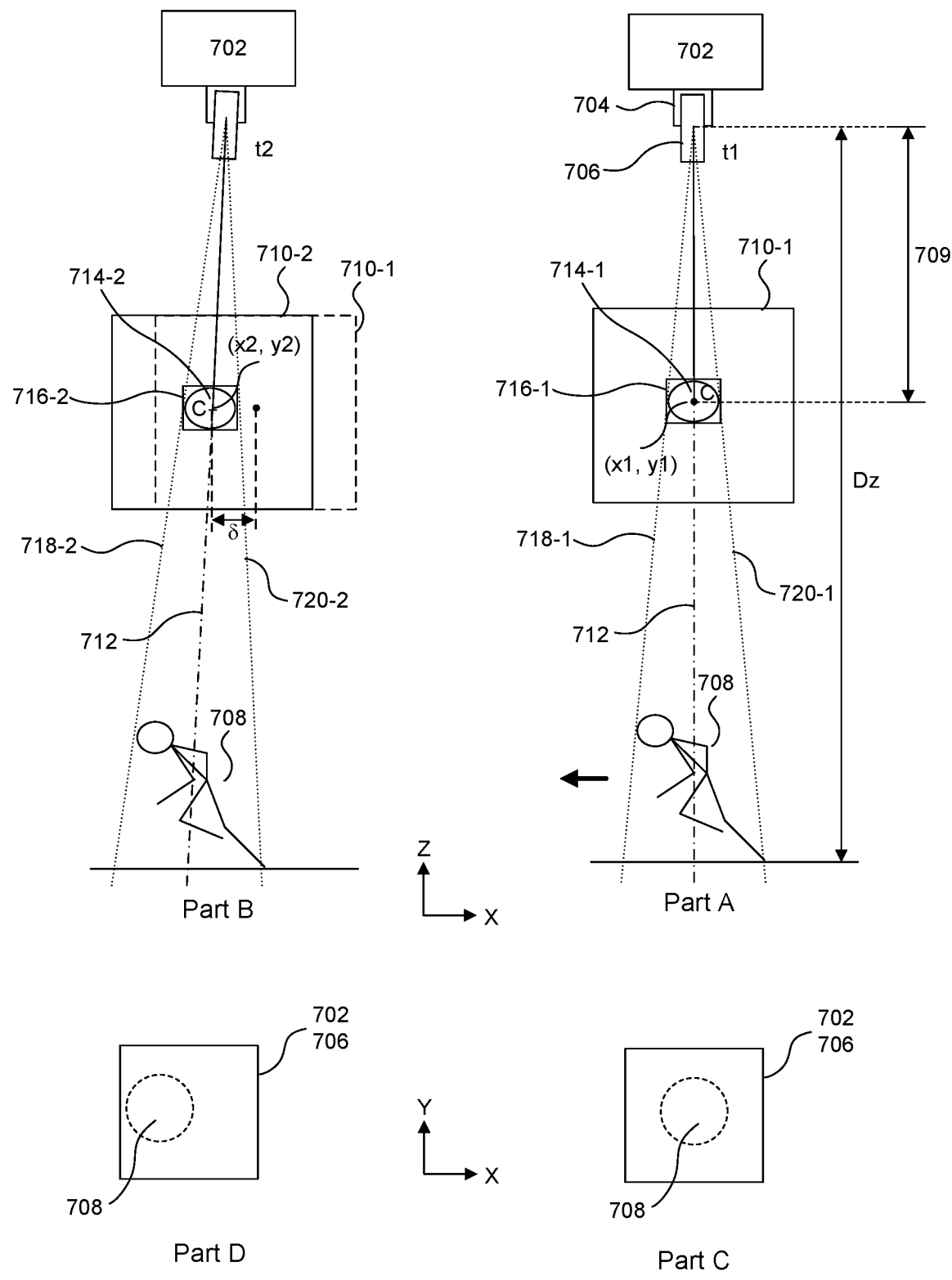
FIG. 10 illustrates tracking of a target object by rotating an imaging device on a tracking device about a pitch axis relative to the target object, in accordance with some embodiments.
Figure 11:
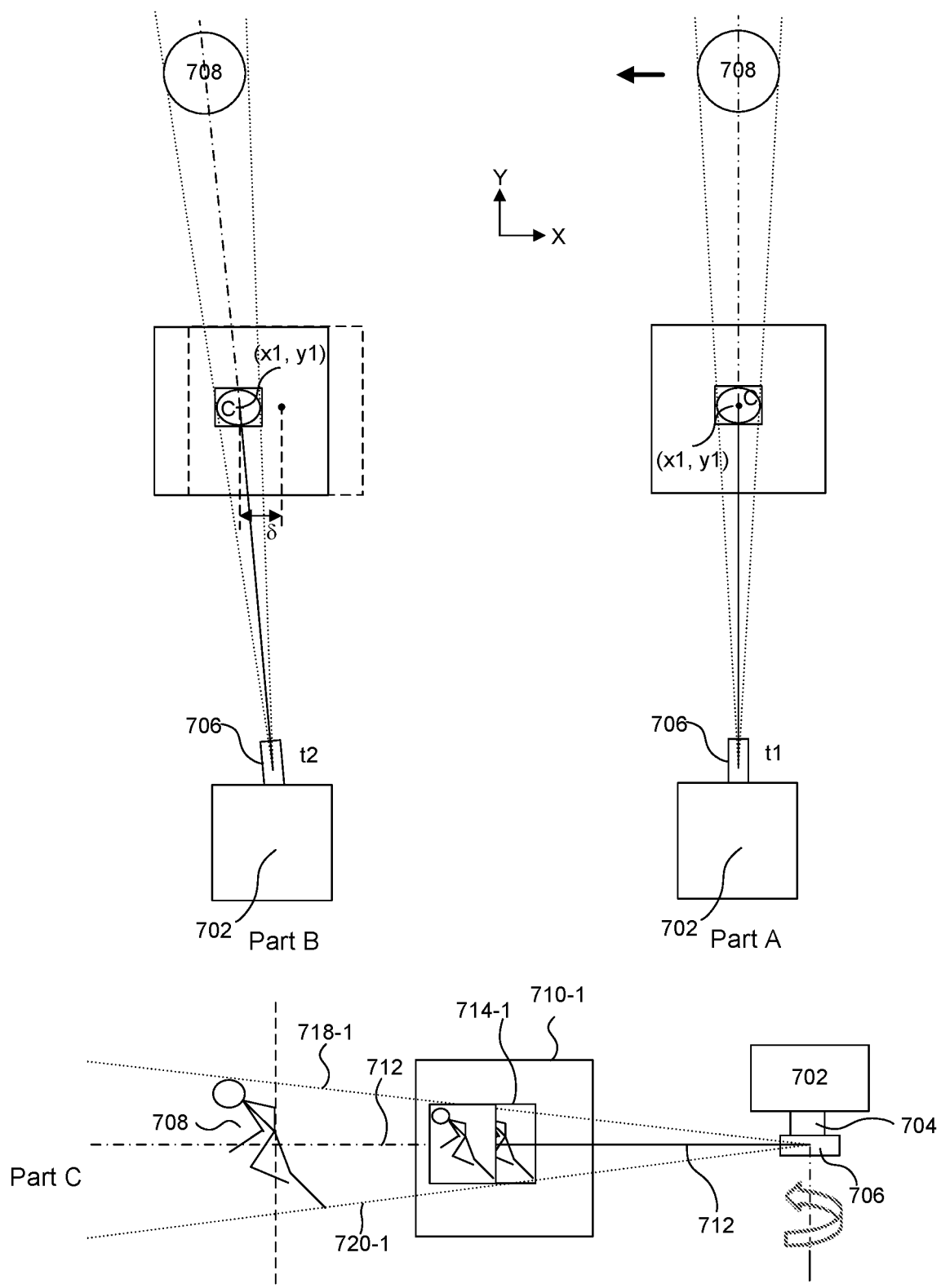
FIG. 11 illustrates tracking of a target object by rotating an imaging device on a tracking device about a yaw axis relative to a target object, in accordance with some embodiments.
Figure 12:
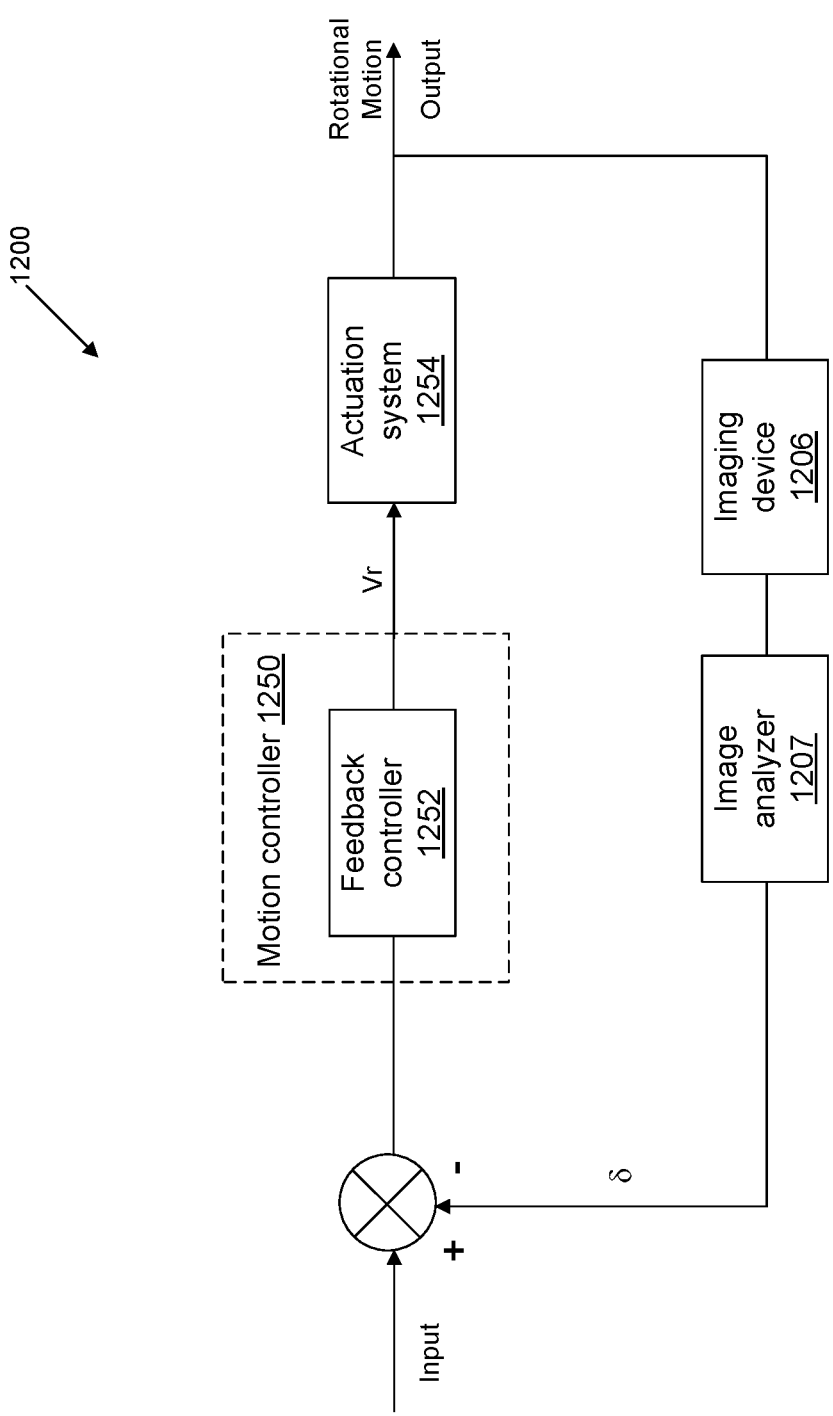
FIG. 12 illustrates a block diagram of an exemplary feedback control loop for tracking the target object in FIGS. 10 and 11 based on a change in orientation of the tracking device relative to the target object, in accordance with some embodiments.

FIGS. 10 and 11 illustrate a change in position of a bounding box within a plurality of image frames when a tracking device changes its orientation (e.g., attitude) to track the movement of a target object. FIG. 12 illustrates an exemplary feedback control loop for minimizing the change in position of the bounding boxes in FIGS. 10 and 11, to obtain a rotational velocity component of the tracking device.

FIG. 10 illustrates tracking of a target object by rotating an imaging device on a tracking device about a pitch axis relative to the target object, in accordance with some embodiments. Part A of FIG. 10 may be similar to Part A of FIG. 7.

In part B of FIG. 10, the target object may have moved to a different position at time t2. To continue tracking the target object, the imaging device on the tracking device may rotate to a different position relative to the target object at time t2, so as to maintain the position of the image of the target object substantially at the center of the image plane. For example, the imaging device may have rotated about a pitch axis (Y-axis) to track the movement of the target object. Accordingly, the optical axis continues to extend from the mirror center of the imaging device to the center portion of the target object at time t2. As such, the second bounding box in part B may be located at a center portion of the second image plane. For example, a set of center coordinates (x2, y2) of the second bounding box 716-2 may coincide with a center C' of the second image plane 710-2. As shown in part B, the coordinate x2 may be shifted from a center C of the first image plane 710-1 by an offset distance δ.

Parts C and D of FIG. 10 illustrate views of the tracking device and the target object as viewed from above. Part C corresponds to the configuration shown in Part A, and Part D corresponds to the configuration shown in Part B. Referring to Parts A and C, the target object may be directly below the center of the tracking device at time t1, such that the optical axis of the imaging device passes through the center of the target object, thereby resulting in the first bounding box being located at the center of the first image plane. Referring to Parts B and D, the target object may be below and offset from the center of the tracking device at time t2. However, since the optical axis of the imaging device passes through the center of the target object at time t2 due to rotation of the imaging device about the pitch axis, the second bounding box is therefore located at the center of the second image plane.

FIG. 11 illustrates tracking of a target object by rotating an imaging device on a tracking device about a yaw axis relative to the target object, in accordance with some embodiments. The views in FIG. 11 are provided from above the tracking device and the target object.

In part A of FIG. 11, a movable object 702 carrying an imaging device 706 may be located at a distance from a target object 708 at time t1. The tracking device and the target object may be located substantially on a same horizontal plane (e.g., at substantially a same height). An optical axis 712 may extend from a mirror center of the imaging device to a center portion of the target object. The optical axis may pass through the center of a first image plane 710-1 located at a focal length distance from the mirror center of the imaging device.

The imaging device may be configured to capture a first image 714-1 of the target object onto the first image plane 710-1 at time t1. Points on the first image plane 710-1 may be represented by a set of (u, v) image coordinates. A first bounding box 716-1 may be configured to substantially surround the first image 714-1 of the target object. The bounding box may be configured to change its position when the tracking device changes its orientation (e.g., in the yaw direction) relative to the target object.

The size and position of the first bounding box may be defined by optical rays 718-1 and 720-1. The optical ray 718-1 may pass through the mirror center of the imaging device, a top image point on the first image plane 710-1, and a first target point on the target object 708. The optical ray 720-1 may pass through the mirror center of the imaging device, a bottom image point on the first image plane 710-1, and a second target point on the target object 708. In some embodiments, the first bounding box may be located substantially at a center portion of the first image plane. For example, a set of center coordinates (x1, y1) of the first bounding box may coincide with a center C of the first image plane. In some alternative embodiments, the first bounding box may be located substantially away from the center portion of the first image plane 710-1, and the center coordinates (x1, y1) of the first bounding box may not coincide with the center C of the first image plane.

In part B, the target object may have moved to a different position at time t2. To continue tracking the target object, the imaging device may rotate to a different position relative to the target object at time t2, so as to maintain the position of the image of the target object substantially at the center of the image plane. For example, the imaging device may have rotated about a yaw axis (Z-axis) to track the movement of the target object. Accordingly, the optical axis continues to extend from the mirror center of the imaging device to the center portion of the target object at time t2. As such, the second bounding box in part B may be located at a center portion of the second image plane. For example, a set of center coordinates (x2, y2) of the second bounding box 716-2 may coincide with a center C' of the second image plane 710-2. As shown in part B, the coordinate x2 may be shifted from a center C of the first image plane 710-1 by an offset distance δ.

Part C of FIG. 11 illustrate views of the tracking device and the target object as seen from the side. Referring to Part C, the tracking device and the target object may be located substantially on a same horizontal plane (e.g., at substantially a same height) at times t1 and t2, even though the imaging device may have rotated about the yaw axis at time t2. As mentioned above, the optical axis of the imaging device passes through the center of the target object in Part A, thereby resulting in the first bounding box being located at the center of the first image plane. Similarly, the optical axis of the imaging device passes through the center of the target object in Part B due to rotation of the imaging device about the yaw axis, thereby resulting in the second bounding box being located at the center of the second image plane.

FIG. 12 illustrates a block diagram of an exemplary feedback control system for adjusting movement of the movable object based on the change in position of the bounding boxes in FIGS. 10 and 11, in accordance with some embodiments. The change in position of the bounding box may be caused by relative rotational movement between the tracking device and the target object. For example, the tracking device may rotate about a yaw, roll, and/or pitch axis relative to the target object. As shown in FIG. 12, a feedback control system 1200 may comprise an imaging device 1206, an image analyzer 1207, a motion controller 1250, and an actuation system 1254. The motion controller may comprise a feedback controller 1252. The feedback control system may be configured to obtain a rotational velocity component by minimizing the change in position of the bounding box between image frames. The feedback control system may be further configured to track the target object by adjusting movement of the movable object based on the rotational velocity component.

The rotational velocity component may be obtained by minimizing a positional error using the feedback control loop. The positional error may be calculated based on a change in position of a bounding box between the first image frame and the second image frame. The change in position of the bounding box may be determined relative to a reference point within the first image frame and the second image frame. The rotational velocity component may be obtained by minimizing the difference between the positions of the bounding box at times t1 and t2 using the feedback control loop. As previously described in FIGS. 10 and 11, the change in position of the bounding box may be associated with the offset distance δ. The input to system 1200 may comprise a threshold positional offset. In some cases, the threshold positional offset may be zero or substantially zero, in order to minimize the offset distance. When the threshold positional offset is zero, the system may adjust the rotational movement of the tracking device such that the bounding box maintains substantially a same position across the image frames.

Figure 13:
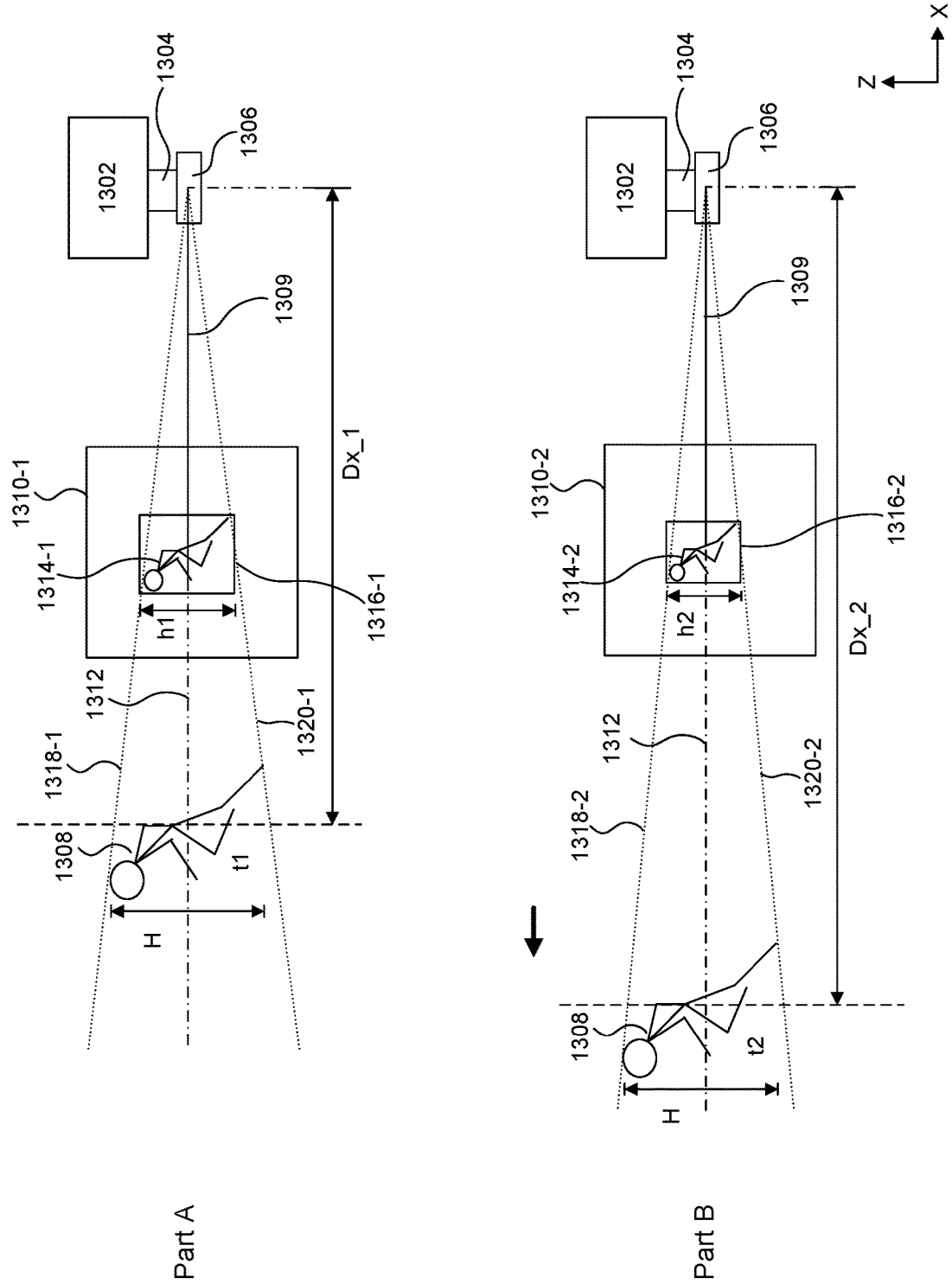
FIG. 13 illustrates the change in size of a bounding box in a plurality of image frames when a target object moves relative to a tracking device in a direction along and parallel to an optical axis of an imaging device on the tracking device, in accordance with some embodiments.

FIG. 13 illustrates the change in size of a bounding box in a plurality of image frames when a target object moves relative to a tracking device in a direction along or parallel to an optical axis of an imaging device on the tracking device, in accordance with some embodiments. The tracking device may include a movable object carrying the imaging device. In part A of FIG. 13, a movable object 1302 carrying an imaging device 1306 may be located at a distance $Dx\_1$ from a target object 1308 at time t1. The movable object and the target object may be located substantially on a same horizontal plane (e.g., at substantially a same height). The target object may have a height H. The height of the target object may be determined based on a scale within the image frames. Optionally, the height of the target object may be estimated depending on the type of object or object class (e.g., a person, a vehicle, etc.). An optical axis 1312 may extend from a mirror center of the imaging device to a center portion of the target object. The optical axis 1312-1 may pass through the center of a first image plane 1310-1 located at a focal length distance 1309 from the mirror center of the imaging device.

The imaging device may be configured to capture a first image 1314-1 of the target object onto the first image plane 1310-1 at time t1. Points on the first image plane 1310-1 may be represented by a set of (u, v) image coordinates. A first bounding box 1316-1 may be configured to substantially surround the first image 1314-1 of the target object. The bounding box may be configured to vary in size when the target object moves relative to the tracking device in a direction along the optical axis.

The size and position of the first bounding box may be defined by optical rays 1318-1 and 1320-1. The optical ray 1318-1 may pass through the mirror center of the imaging device, a top image point on the first image plane 1310-1, and a top target point on the target object 1308. The optical ray 1320-1 may pass through the mirror center of the imaging device, a bottom image point on the first image plane 1310-1, and a bottom target point on the target object 1308. In part A, a size of the first bounding box may be characterized by a first height h1. In some embodiments, the first bounding box may be located substantially at a center portion of the first image plane. For example, a set of center coordinates (x1, y1) of the first bounding box may coincide with a center C of the first image plane. In some alternative embodiments, the first bounding box may be located substantially away from the center portion of the first image plane 1310-1, and the center coordinates (x1, y1) of the first bounding box may not coincide with the center C of the first image plane.

In part B, the target object may have moved to a different position relative to the tracking device at time t2. For example, the target object may have moved along the X-axis. As shown in part B, the movement of the target object may be in a direction along the optical axis. Accordingly, the optical axis 1312 may continue to extend from the mirror center of the imaging device to the center portion of the target object.

The imaging device may be configured to capture a second image 1314-2 of the target object onto a second image plane 1310-2 at time t2. Points on the second image plane 1310-2 may also be represented by a set of (u, v) image coordinates. A second bounding box 1316-2 may be configured to substantially surround the second image 1314-2 of the target object. The size and position of the second bounding box may be defined by optical rays 1318-2 and 1320-2. The optical ray 1318-2 may pass through the mirror center of the imaging device, a top image point on the second image plane 1310-2, and the top target point on the target object 1308. The optical ray 1320-2 may pass through the mirror center of the imaging device, a bottom image point on the first image plane 1310-2, and the bottom target point on the target object 1308.

As shown in FIG. 13, when the target object moves further away from the tracking device in a direction along the optical axis, the size of the bounding box may decrease. For example, a size of the second bounding box in the second image frame may be characterized by a second height h2, where h2<h1. The second bounding box may be located substantially at the same position as the first bounding box within the first and second image frames, since relative movement between the target object and the tracking device is in a direction along the optical axis 1312. In some embodiments, the second bounding box may be located substantially at a center portion of the second image plane. For example, a set of center coordinates (x2, y2) of the second bounding box may coincide with a center C of the second image plane. In some alternative embodiments, the second bounding box may be located substantially away from the center portion of the second image plane 1310-2, and the center coordinates (x2, y2) of the second bounding box may not coincide with the center C of the second image plane.

Figure 14:
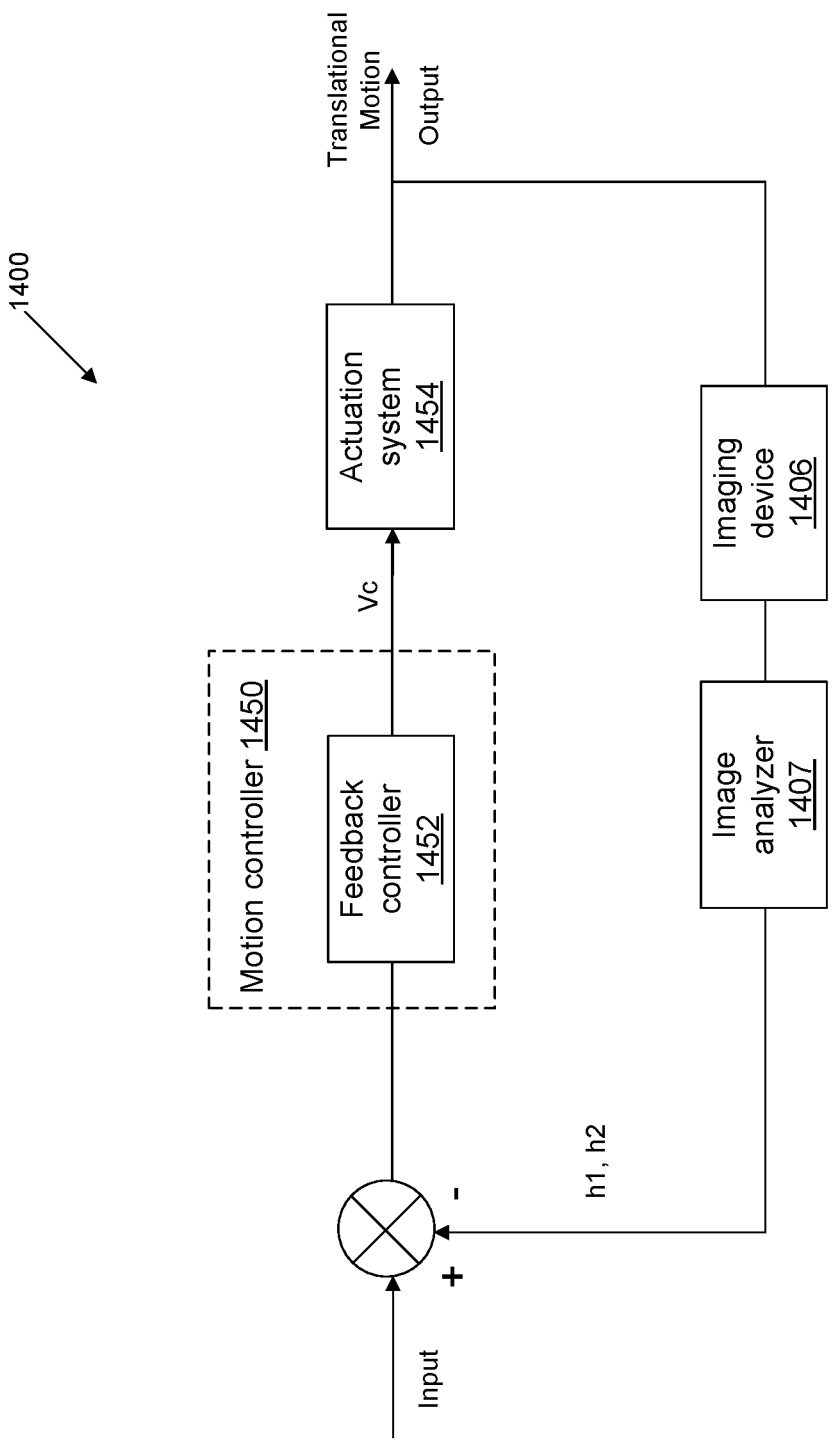
FIG. 14 illustrates a block diagram of an exemplary feedback control loop for tracking the target object in FIG. 13 based on relative translational movement between the tracking device and the target object in a direction along and parallel to the optical axis, in accordance with some embodiments.

FIG. 14 illustrates a block diagram of an exemplary feedback control system for adjusting movement of the tracking device based the change in size of the bounding box in FIG. 13, in accordance with some embodiments. As shown in FIG. 14, a feedback control system 1400 may comprise an imaging device 1406, an image analyzer 1407, a motion controller 1450, and an actuation system 1454. The motion controller may comprise a feedback controller 1452. The feedback control system may be configured to obtain a second velocity component by minimizing the change in size of the bounding box between image frames. The feedback control system may be further configured to track the target object by adjusting movement of the tracking device based on the second velocity component.

The second velocity component can be obtained by minimizing the change in size of the bounding box between image frames. The second velocity component may be obtained by minimizing a distance error using the feedback control loop. The distance error may be calculated based on a first distance between the tracking device and the target object at a first time instance (t1) and a second distance between the tracking device and the target object at a second time instance (t2). The first distance and the second distance may be calculated based on the size (e.g., height) of the bounding box in the first image frame and the second image frame.

The input to system 1400 may comprise a threshold distance. In some cases, the threshold distance may be zero or substantially zero, in order to minimize the distance error. When the threshold distance is zero, the system may adjust the movement of the tracking device such that the bounding box maintains substantially a same size across the image frames.

The imaging device may be configured to capture image data (e.g., the first and second image frames in FIG. 13). The image data may be provided to the image analyzer. The image analyzer may be configured to analyze the image data to determine the heights of the bounding box in the first and second image frames. The heights of the bounding box may be provided to the feedback controller 1452. A distance between the tracking device and the target object may be obtained based on the size (height) of the bounding box in each image frame. For example, the feedback controller may be configured to calculate a first distance Dx_1 between the tracking device and the target object at time t1, and a distance Dx_2 between the tracking device and the target object at time t2, using the following equations:

$$Dx\_1 = \frac{H}{2*\tan(h1*p)}$$

$$Dx\_2 = \frac{H}{2*\tan(h2*p)}$$

where p is an angle represented by each pixel in the first and second image frames, H is the height of the target object, h1 is the height of the first bounding box, and h2 is the height of the second bounding box.

The feedback controller may be further configured to calculate the distance error d_error2 between the positions of the target object at times t1 and t2, using the following equation:

$$d\_error2 = Dx\_1 - Dx\_2$$

Next, the feedback controller may use a proportional-integral-derivative (PID) method (or a proportional-derivative (PD) method) to minimize d_error2, thereby obtaining the second velocity component Vc. The second velocity component Vc may be provided to the actuation system 1454. The actuation system may be configured to adjust the movement of the tracking device along a predefined axis (e.g., X-axis or the optical axis in FIG. 13) based on the second velocity component Vc, so as to track the target object. By adjusting the movement of the tracking device based on the second velocity component Vc, the bounding box can maintain substantially the same size across image frames. The adjusted movement of the tracking device may correspond to a motion output of the feedback control system. The above steps may be repeated iteratively in a closed loop until the difference d_error2 is equal to or less than the threshold distance. The second velocity component Vc may dynamically change during the one or more iterations of the above steps.

As noted previously in the example of FIGS. 7 and 8, the relative movement between the target object and the tracking device may be in a direction orthogonal to an optical axis of the imaging device, and the tracking device and the target object may substantially lie on a same vertical plane. Conversely, in the example of FIG. 13, the relative movement between the target object and the tracking device may be in a direction along and parallel to an optical axis of the imaging device, such that the tracking device and the target object may substantially lie on a same horizontal plane. Alternatively, in the example of FIGS. 10 and 11, the relative movement between the target object and the tracking device may be a rotational movement of the tracking device about its yaw, roll, and/or pitch axis, while the distance between the tracking device and the target object remains unchanged. In some embodiments, the relative movement between the target object and the tracking device may be in a direction that is neither orthogonal to nor along an optical axis of the imaging device. Also, the tracking device and the target object may not lie on a same horizontal or vertical plane. For example, the tracking device may be tracking and/or following the target object at an arbitrary height and at an arbitrary angle. Examples of those embodiments may be illustrated in FIGS. 15 and 16.

Figure 15:
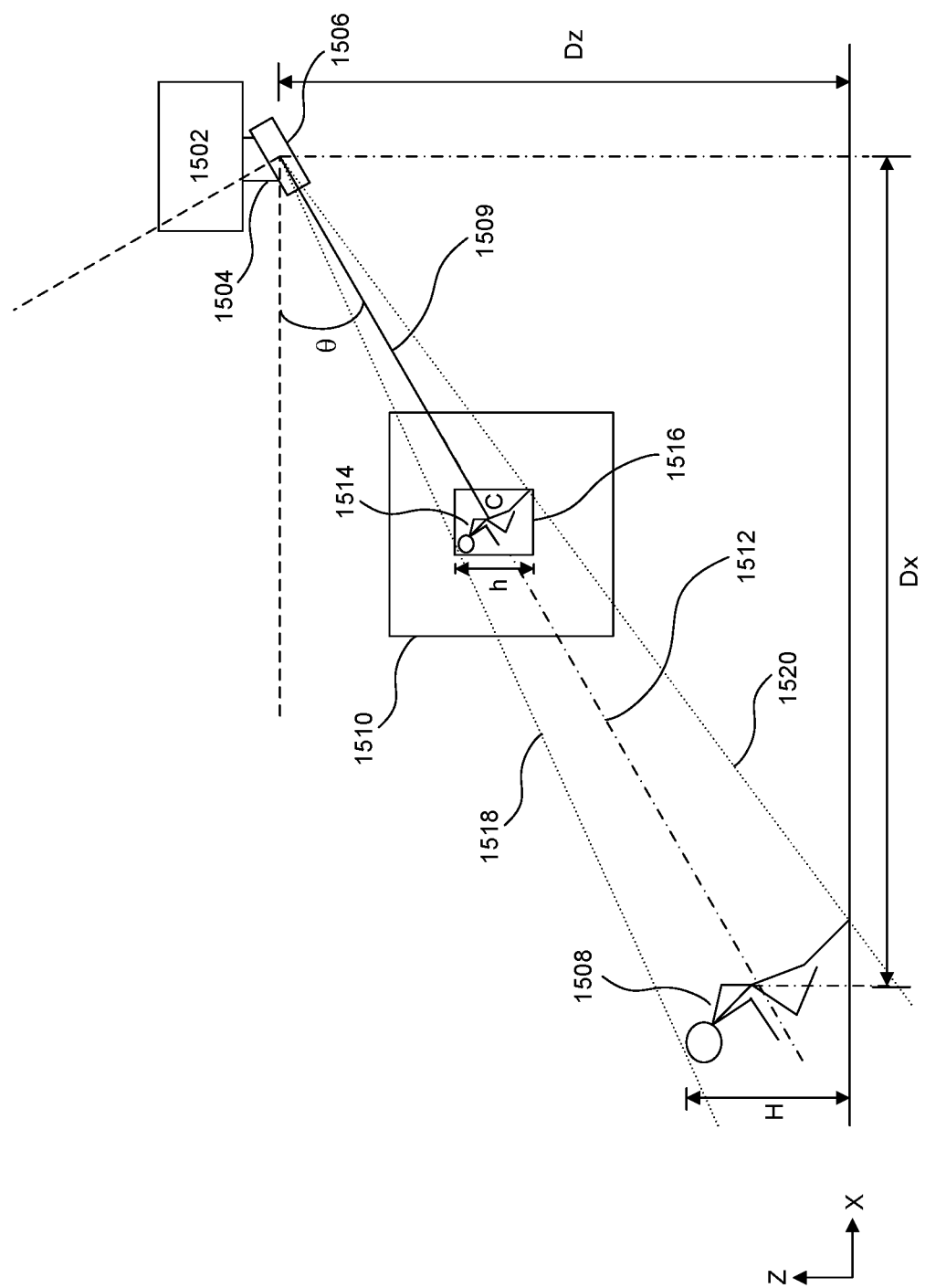
FIG. 15 illustrates tracking of a target object when a tracking device is at an arbitrary spatial disposition relative to the target object, in accordance with some embodiments.

FIG. 15 illustrates the tracking of a target object by a tracking device at an arbitrary spatial disposition relative to the target object, in accordance with some embodiments. The tracking device may comprise a movable object 1502 carrying an imaging device 1506. The imaging device may be coupled to the movable object using a carrier 1504. The carrier may allow the imaging device to move (e.g., rotate) about one or more axes relative to the movable object. The tracking device may be configured to track a target object 1508.

As shown in FIG. 15, the tracking device may be located at a distance Dx from the target object along the X-axis, and a distance Dz from the target object along the Z-axis. The distance Dx may correspond to a horizontal distance, and the distance Dz may correspond to a vertical distance. The imaging device may be rotated by an angle θ counterclockwise about the Y-axis (pitch direction) and relative to the movable object, in order to locate the target object in its field-of-view. An optical axis 1512 may extend from a mirror center of the imaging device to a center portion of the target object. The optical axis may pass through the center of an image plane 1510 located at a focal length distance 1509 from the mirror center of the imaging device.

The imaging device may be configured to capture an image 1514 of the target object onto the image plane 1510. Points on the image plane 1510 may be represented by a set of (u, v) image coordinates. A bounding box 1516 may be configured to substantially surround the image 1514 of the target object. The bounding box may be configured to vary in size and/or position when the target object moves relative to the tracking device.

The size and position of the bounding box may be defined by optical rays 1518 and 1520. The optical ray 1518 may pass through the mirror center of the imaging device, a first image point on the image plane 1510, and a first target point on the target object 1508. The optical ray 1520 may pass through the mirror center of the imaging device, a second image point on the image plane 1510, and a second target point on the target object 1508. The bounding box may be located substantially at a center portion of the image plane 1510. For example, a set of center coordinates (x, y) of the bounding box may coincide with a center C of the image plane. In some alternative embodiments, the bounding box may be located substantially away from the center portion of the image plane 1510, and the center coordinates (x, y) of the bounding box may not coincide with the center C of the image plane.

Figure 16:
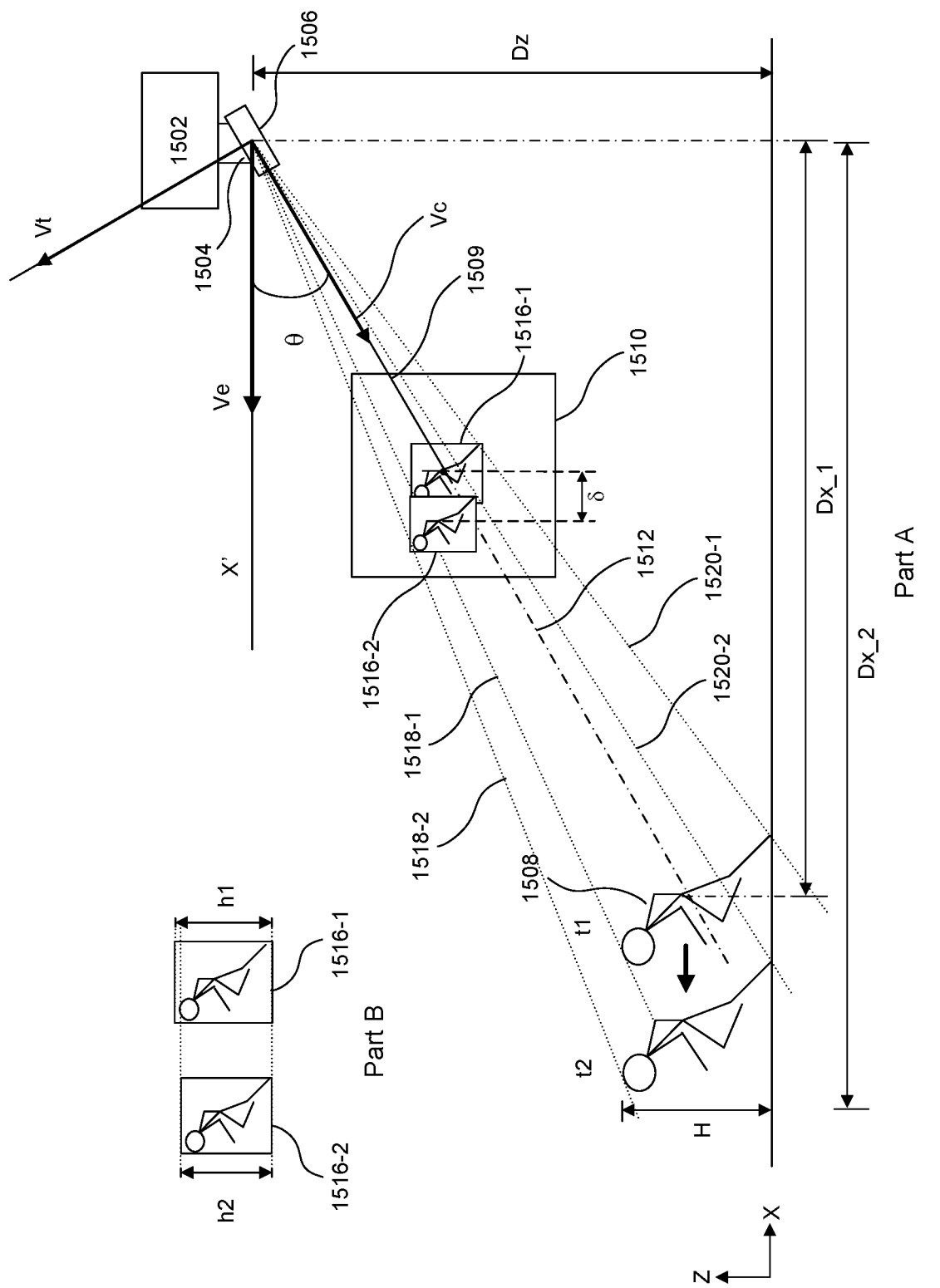
FIG. 16 illustrates tracking of the target object of FIG. 15 when the target object moves in a translational motion relative to the tracking device, in accordance with some embodiments.

FIG. 16 illustrates tracking of the target object of FIG. 15 when the target object moves relative to the tracking device, in accordance with some embodiments. As shown in part A of FIG. 16, the target object may be located at a horizontal distance Dx_1 and a vertical distance Dz from the tracking device at time t1. The target object may have a height H. The height of the target object may be determined based on a scale within the image frames. Optionally, the height of the target object may be estimated depending on the type of object or object class (e.g., a person, a vehicle, etc.).

The imaging device may be configured to capture a first image 1514-1 of the target object 1508 onto a first image plane 1510-1 at time t1. Points on the first image plane 1510-1 may be represented by a set of (u, v) image coordinates. A first bounding box 1516-1 may be configured to substantially surround the first image 1514-1 of the target object. The bounding box may be configured to vary in size and/or position when the target object moves relative to the tracking device.

The size and position of the first bounding box may be defined by optical rays 1518-1 and 1520-1. The optical ray 1518-1 may pass through the mirror center of the imaging device, a first image point on the first image plane 1510-1, and the first target point on the target object 1508. The optical ray 1520-1 may pass through the mirror center of the imaging device, a second image point on the first image plane 1510-1, and the second target point on the target object 1508. The first bounding box may be located substantially at a center portion of the first image plane 1510-1. For example, a set of center coordinates (x1, y1) of the first bounding box may coincide with a center C of the first image plane. In some alternative embodiments, the first bounding box may be located substantially away from the center portion of the first image plane 1510-1, and the center coordinates (x1, y1) of the first bounding box may not coincide with the center C of the first image plane. As shown in part A of FIG. 16, a size of the first bounding box may characterized by a first height h1.

Figure 17:
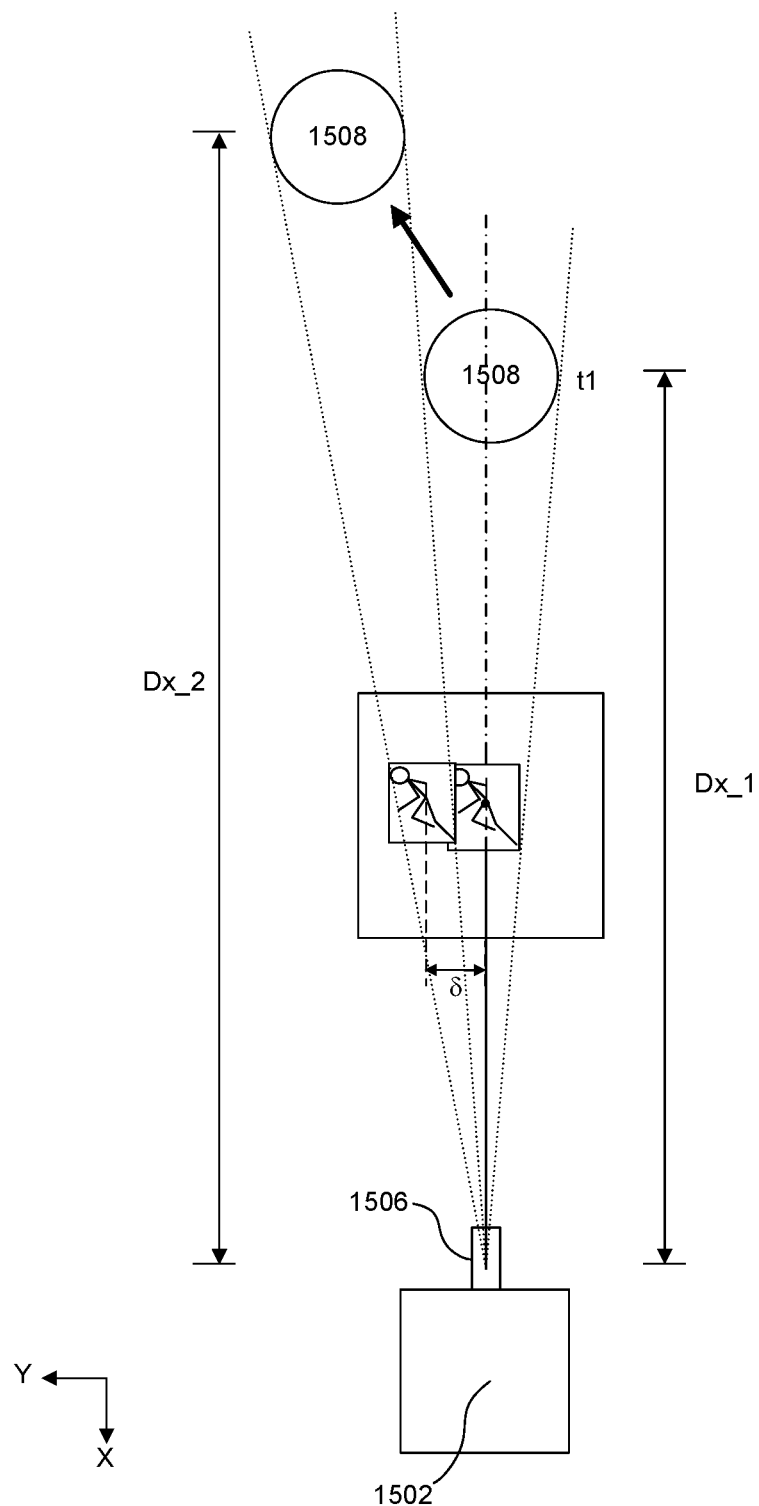
FIG. 17 illustrates a different visual depiction of the embodiment of FIG. 16, in accordance with some embodiments.

At time t2, the target object may have moved to a different position relative to the tracking device. For example, the target object may have moved away from the tracking device along both the X and Y axes (e.g., as shown in FIG. 17), such that the target object is located at a distance Dx_2 from the tracking device. FIG. 17 illustrates the tracking device and the target object as viewed from above, and shows the translational movement of the target object along the X-Y plane (e.g., a reference surface or a ground plane) as it moves away from the tracking device. The vertical distance Dz between the target object and the tracking device may remain unchanged. As shown in part A of FIG. 16, the optical axis 1512 may no longer extend from the mirror center of the imaging device to the center portion of the target object at time t2. When the target object moves further away from the tracking device, the size of the bounding box may decrease. For example, as shown in part B of FIG. 16, a size of the second bounding box in the second image frame may be characterized by a second height h2, where h2<h1.

The imaging device may be configured to capture a second image 1514-2 of the target object onto a second image plane 1510-2 at time t2. Points on the second image plane 1510-2 may also be represented by a set of (u, v) image coordinates. A second bounding box 1516-2 may be configured to substantially surround the second image 1514-2 of the target object. The size and position of the second bounding box may be defined by optical rays 1518-2 and 1520-2. The optical ray 1518-2 may pass through the mirror center of the imaging device, a first image point on the second image plane 1510-2, and the first target point on the target object 1508. The optical ray 1520-2 may pass through the mirror center of the imaging device, a second image point on the second image plane 1510-2, and the second target point on the target object 1508. Unlike the first bounding box, the second bounding box may not be located at a center portion of the second image plane 1510-2. For example, a set of center coordinates (x2, y2) of the second bounding box may not coincide with a center C of the second image plane. For example, as shown in FIGS. 16 and 17, the second bounding box may be shifted from the center C of the second image plane by an offset distance δ.

Figure 18:
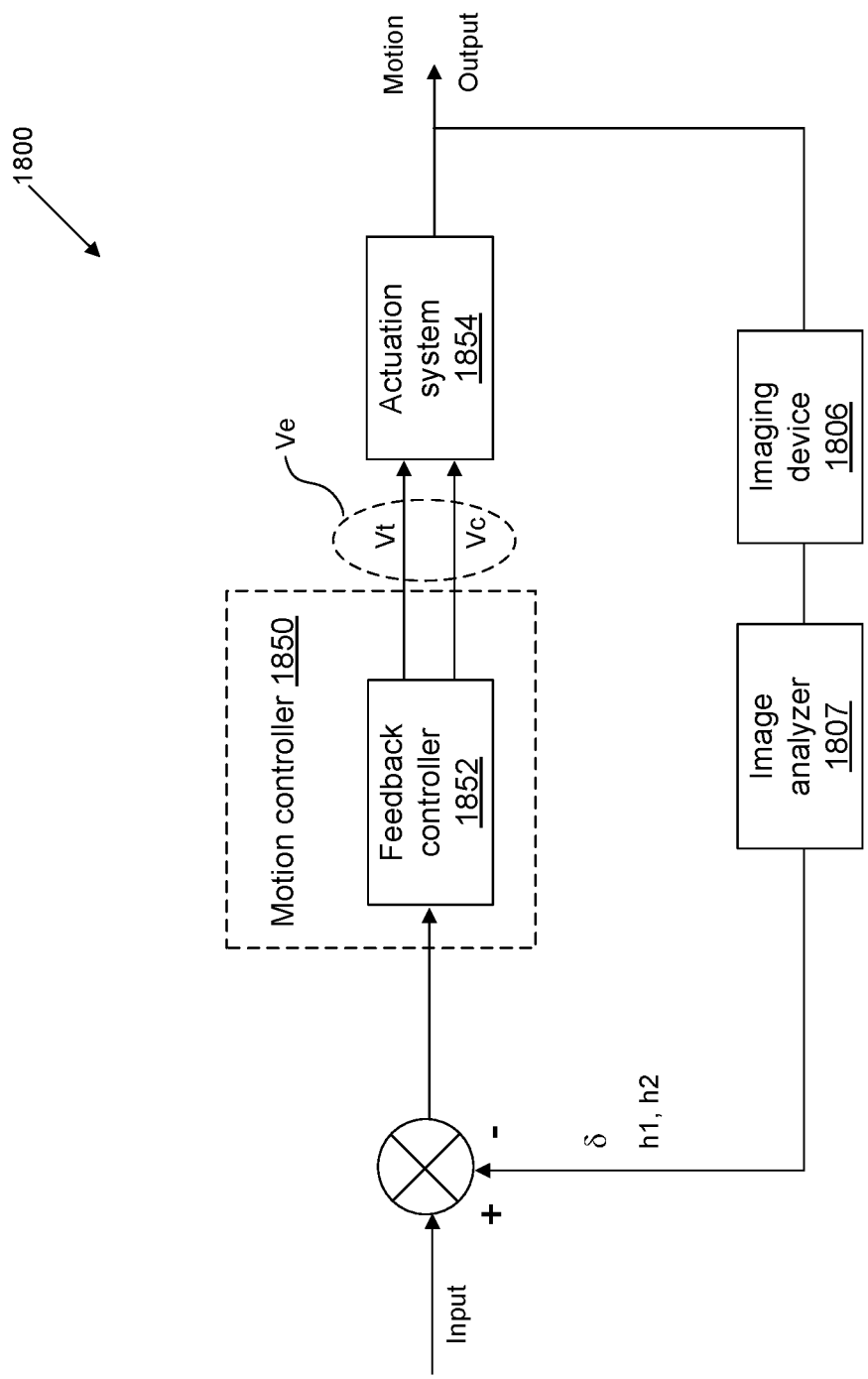
FIG. 18 illustrates a block diagram of an exemplary feedback control loop for tracking the target object in FIGS. 16 and 17 based on relative translational movement between the tracking device and the target object, in accordance with some embodiments.

FIG. 18 illustrates a block diagram of an exemplary feedback control system for adjusting movement of the tracking device based the change in size and position of the bounding box in FIGS. 16 and 17, in accordance with some embodiments. As shown in FIG. 18, a feedback control system 1800 may comprise an imaging device 1806, an image analyzer 1807, a motion controller 1850, and an actuation system 1854. The motion controller may comprise a feedback controller 1852. The feedback control system may be configured to obtain a first velocity component by minimizing the change in position of the bounding box between image frames, and a second velocity component by minimizing the change in size of the bounding box between image frames. The feedback control system may be further configured to track the target object by adjusting movement of the tracking device based on the first and second velocity components.

The first velocity component may be obtained by minimizing a positional error using the feedback control loop. The positional error may be calculated based on a change in position of a bounding box between the first image frame and the second image frame in FIGS. 16 and 17. The change in position of the bounding box may be determined relative to a reference point within the first image frame and the second image frame. The first velocity component may be obtained by minimizing the difference between the position of the bounding box at times t1 and t2 using the feedback control loop. As previously described, the change in position of the bounding box may be associated with the offset distance δ.

The second velocity component can be obtained by minimizing the change in size of the bounding box between image frames. The second velocity component may be obtained by minimizing a distance error using the feedback control loop. The distance error may be calculated based on a first distance between the tracking device and the target object at a first time instance (t1) and a second distance between the tracking device and the target object at a second time instance (t2). The first distance and the second distance may be calculated based on the size (e.g., height) of the bounding box in the first image frame and the second image frame.

The input to system 1800 may comprise a threshold positional offset and a threshold distance. In some cases, the threshold positional offset and the threshold distance may be zero or substantially zero, in order to minimize the offset distance δ and the distance error. When the threshold positional offset and the distance error are zero, the system may adjust the movement of the tracking device such that the bounding box maintains substantially a same position and size across the image frames.

The imaging device may be configured to capture image data (e.g., the first and second image frames in FIG. 16). The image data may be provided to the image analyzer. The image analyzer may be configured to analyze the image data to determine the change in position of the bounding box (offset distance δ) between image frames. The change in position of the bounding box may be compared against the input, and provided to the feedback controller. In FIG. 16, since the movement of the target object is not orthogonal to the optical axis (see FIG. 17), the positional error d_error1 described in FIGS. 7, 8, and 9 may have to be corrected to account for the orientation (tilt) in the imaging device. The feedback controller may be configured to correct for the positional error d_error1 by calculating a positional error d_error3 in the bounding box at time t2, using the following equation:

$$d\_error3 = \frac{Dz * \tan(\delta * p)}{\sin(\tau) * \sin(\tau - p * \delta)}$$

where δ is the offset distance, p is an angle represented by each pixel in the second image frame, Dz corresponds to a vertical distance along the Z-axis between the tracking device and the target object, and τ is an orientation of the imaging device. The orientation of the imaging device may comprise a roll, yaw, and/or pitch angle of the imaging device defined relative to the tracking device and/or movable object. In the example of FIG. 16, the orientation t of the imaging device may correspond to the pitch angle θ of the imaging device.

The image analyzer may also be configured to analyze the image data to determine the heights of the bounding box in the first and second image frames. The heights of the bounding box may be provided to the feedback controller 1852. A distance between the tracking device and the target object may be obtained based on the size (height) of the bounding box in each image frame. For example, the feedback controller may be configured to calculate a first distance Dx_1 between the tracking device and the target object at time t1, and a distance Dx_2 between the tracking device and the target object at time t2, using the following equations:

$$Dx\_1 = \frac{H}{2*\tan(h1*p)}$$

$$Dx\_2 = \frac{H}{2*\tan(h2*p)}$$

where p is an angle represented by each pixel in the first and second image frames, H is the height of the target object, h1 is the height of the first bounding box, and h2 is the height of the second bounding box.

The feedback controller may be further configured to calculate the distance error d_error2 between the positions of the target object at times t1 and t2, using the following equation:

$$d\_error2 = Dx\_1 - Dx\_2$$

Next, the feedback controller may use a proportional-integral-derivative (PID) method (or a proportional-derivative (PD) method) to minimize d_error3 and d_error2, thereby obtaining the first velocity component Vt and the second velocity component Vc. The first and second velocity components may be provided to the actuation system 1854. The actuation system may be configured to adjust the movement of the tracking device along a predefined axis X' based on the first and second velocity components, so as to track the target object. The predefined axis X' may correspond to a natural direction along which the tracking device moves (see, e.g., FIGS. 16 and 19). In some embodiments, the predefined axis X' may be parallel to a reference surface (e.g., a horizontal ground plane). The optical axis may be oblique to the predefined axis such that the optical axis may be at an angle θ relative to the predefined axis. The optical axis may lie on a plane that is oblique to the horizontal ground plane. In FIG. 16, the first velocity component Vl may be orthogonal to the optical axis 1612, and the second velocity component Vc may be parallel to or along the optical axis. Accordingly, the first velocity component Vt and the second velocity component Vc may be orthogonal to each other.

By adjusting the movement of the tracking device based on the first and second velocity components, the bounding box can maintain substantially the same position and size across image frames. The adjusted movement of the tracking device may correspond to a motion output of the feedback control system. The above steps may be repeated iteratively in a closed loop until the positional error d_error3 is equal to or less than the threshold positional offset, and the distance error d_error2 is equal to or less than the threshold distance. The first velocity component and/or the second velocity component may dynamically change during the one or more iterations in the above steps.

Figure 19:
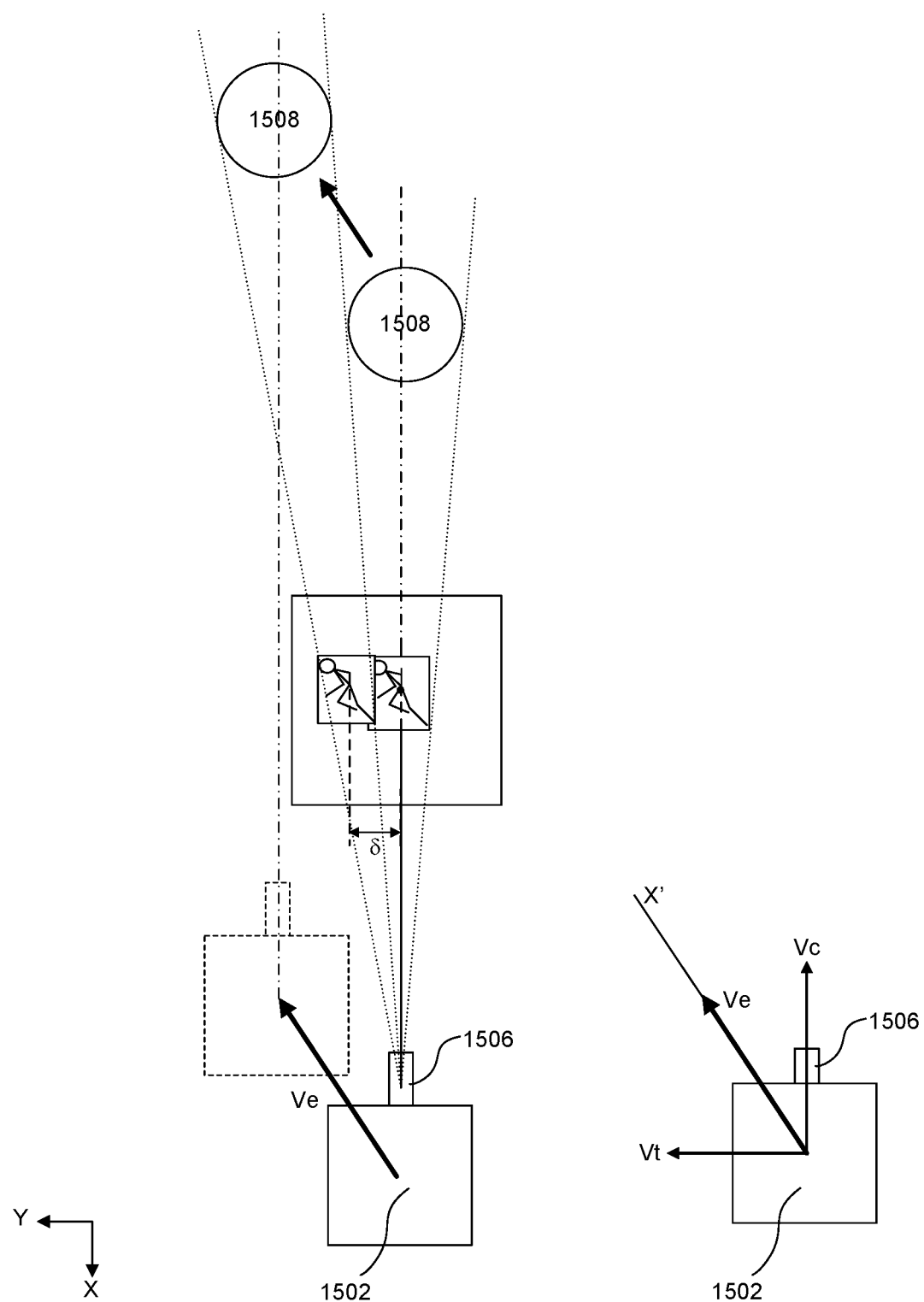
FIG. 19 illustrates tracking of the target object of FIGS. 16 and 17 using the feedback control system of FIG. 18, in accordance with some embodiments.

In the examples of FIGS. 15 through 19, the actuation system may be configured to adjust the movement of the tracking device along the predefined axis X' using the expected velocity vector Ve to track the target object as the target object moves in a translational motion relative to the tracking device. The expected velocity vector Ve may extend along the direction of the predefined axis X', for example as shown in FIG. 19. The actuation system may be configured to obtain (calculate) the expected velocity vector Ve based on the first velocity component Vt, the second velocity component Vc, and the orientation τ of the imaging device.

The expected velocity vector may be a fusion (or combination) of the first and second velocity components. A fusion factor λ may be a function of the orientation of the imaging device. In some cases, the fusion factor λ may be given by $\sin^2 \tau$. In other cases, the fusion factor λ may be given by $\cos^2 \tau$. In some embodiments, the expected velocity vector may be obtained by (1) multiplying Vt with λ, (2) multiplying Vc with (1-λ), and (3) taking a square root of the sum of the products in (1) and (2). In some embodiments, the expected velocity vector may be obtained by applying different weights to the first velocity component Vt and the second velocity component Vc. The different weights may be based on the orientation τ and/or the fusion factor λ. For example, a higher weight may be applied to the first velocity component Vt than the second velocity component Vc when the tracking device is substantially located above the target object (e.g., as shown in FIG. 7). Conversely, a higher weight may be applied to the second velocity component Vc than the first velocity component Vt when the tracking device is located substantially in line with the target object on a horizontal axis (e.g., as shown in FIG. 13).

Figure 20:
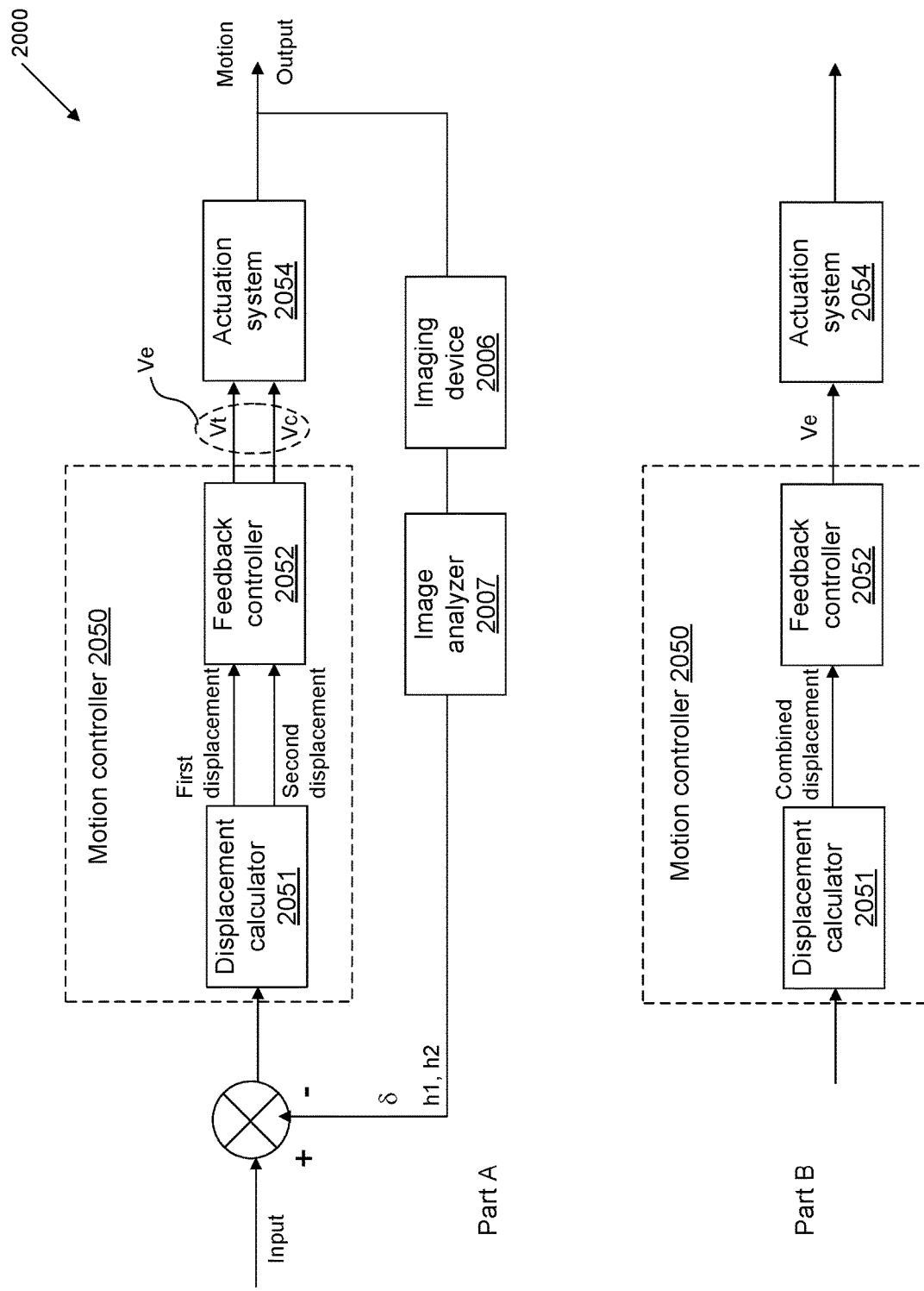
FIG. 20 illustrates a block diagram of an exemplary feedback control loop for tracking the target object in FIGS. 16 and 17 based on minimization of the change in relative displacements between the tracking device and the target object, in accordance with some embodiments.

The orientation of the imaging device may comprise a roll, yaw, and/or pitch angle of the imaging device. In the example of FIGS. 15 through 19, the orientation τ of the imaging device may correspond to the pitch angle θ of the imaging device. FIG. 20 illustrates a block diagram of an exemplary feedback control system for adjusting movement of the tracking device based the change in size and position of the bounding box in FIGS. 16 and 17, in accordance with some further embodiments. The system of FIG. 20 may be similar to the system of FIG. 18 except for the following differences. As shown in Part A of FIG. 20, the motion controller 2050 may further comprise a displacement calculator 2051. The displacement calculator may be configured to calculate a first relative displacement between the tracking device and the target object based on the change in position of the bounding box between the first image frame and the second image frame in FIGS. 16 and 17. The displacement calculator may be configured to calculate a second relative displacement between the tracking device and the target object based on the change in size of the bounding box between the first image frame and the second image frame in FIGS. 16 and 17.

The feedback controller may be configured to receive signals indicative of the first relative displacement and the second relative displacement from the displacement calculator. Next, the feedback controller may use a proportional-integral-derivative (PID) method (or a proportional-derivative (PD) method) to minimize the first and second relative displacements, thereby obtaining the first velocity component Vt and the second velocity component Vc. The first and second velocity components may be provided to the actuation system 2054. The actuation system may be configured to adjust the movement of the tracking device along a predefined axis X' based on the first and second velocity components, so as to track the target object.

By adjusting the movement of the tracking device based on the first and second velocity components, the bounding box can maintain substantially the same position and size across image frames. The adjusted movement of the tracking device may correspond to a motion output of the feedback control system. The above steps may be repeated iteratively in a closed loop until the first relative displacement is equal to or less than a first threshold displacement, and the second relative displacement is equal to or less than a second threshold displacement. The first and second threshold displacements may be the same or different. In some cases, the first and second threshold displacements may be substantially equal to zero. The first velocity component and/or the second velocity component may dynamically change during the one or more iterations in the above steps.

Part B of FIG. 20 illustrates another embodiment of the motion controller, and is similar to the motion controller in Part A except for the following differences. In Part B, the displacement calculator may be configured to further calculate a combined displacement by fusing or combining together the first relative displacement and the second relative displacement. The feedback controller may be configured to receive signals indicative of the combined displacement from the displacement calculator. Next, the feedback controller may use a proportional-integral-derivative (PID) method (or a proportional-derivative (PD) method) to minimize the combined displacement, so as to obtain an expected velocity component Ve. As previously described, the expected velocity component Ve may be a fusion of the first velocity component Vt and the second velocity component Vc. However, in part B of the FIG. 20, the fusing together of the first and second velocity components need not be performed since the expected velocity component can be obtained directly from the combined displacement (e.g., as a derivative of the combined displacement as a function of time). The expected velocity component may be provided to the actuation system 2054. The actuation system may be configured to adjust the movement of the tracking device along a predefined axis X' based on the expected velocity component, so as to track the target object.

By adjusting the movement of the tracking device based on the expected velocity component, the bounding box can maintain substantially the same position and size across image frames. The adjusted movement of the tracking device may correspond to a motion output of the feedback control system. The above steps may be repeated iteratively in a closed loop until the combined displacement is equal to or less than a threshold combined displacement. In some cases, the threshold combined displacement may be substantially equal to zero. The expected velocity component may dynamically change during the one or more iterations in the above steps.

In some embodiments, an expected rotating angular speed for the movable object may be obtained based on a change in one or more characteristics associated with the one or more features, as described below with reference to FIGS. 21 and 22.

Figure 21:
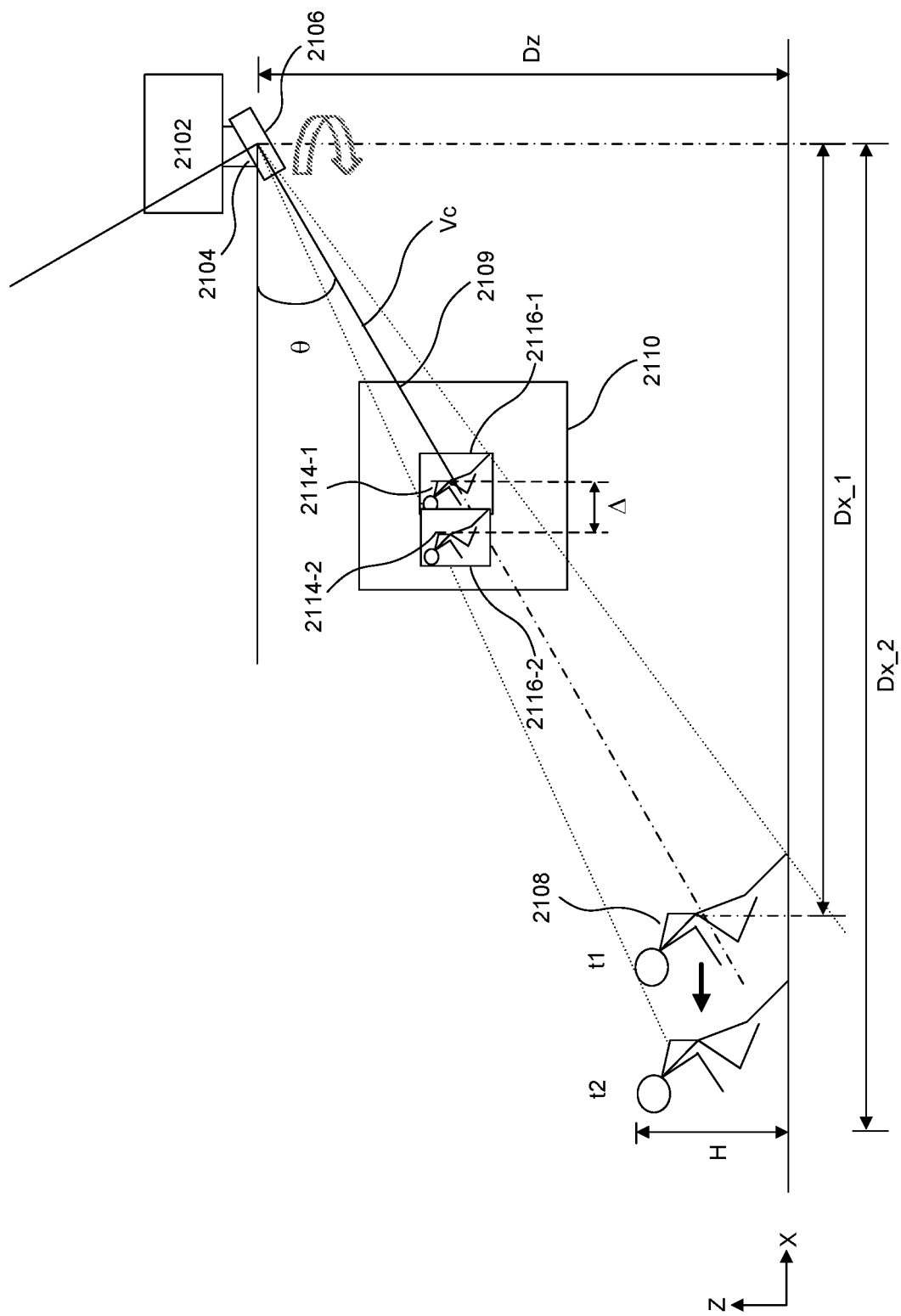
FIG. 21 illustrates tracking of the target object of FIG. 15 by changing the orientation of the tracking device relative to the target object, in accordance with some embodiments.

Referring to FIG. 21, an imaging device on a tracking device may be configured to capture a first image 2114-1 of a target object onto a first image plane 2110-1 at time t1. A first bounding box 2116-1 may be configured to substantially surround the first image 2114-1 of the target object. The bounding box may be configured to vary in size and/or position when the orientation of the tracking device changes relative to the target object. For example, the tracking device may rotate about a yaw, roll, and/or pitch axis defined relative to the movable object on which the tracking device is carried. The first bounding box may be located substantially at a center portion of the first image plane 2110-1 at time t1. For example, a set of center coordinates (x1, y1) of the first bounding box may coincide with a center C of the first image plane. In some alternative embodiments, the first bounding box may be located substantially away from the center portion of the first image plane 2110-1, and the center coordinates (x1, y1) of the first bounding box may not coincide with the center C of the first image plane.

At time t2, the target object may have moved to a different position in both X and Y directions. To continue tracking the target object, the imaging device (or the tracking device) may rotate in a yaw direction (e.g., about the Z-axis) relative to the target object, as shown in FIG. 22. The imaging device may be configured to capture a second image 2114-2 of the target object onto a second image plane 2110-2 at time t2. A second bounding box 2116-2 may be configured to substantially surround the second image 2114-2 of the target object. Similar to the first bounding box, the second bounding box may be located at a center portion of the second image plane 2110-2 due to rotation of the imaging device about the yaw axis. For example, a set of center coordinates (x2, y2) of the second bounding box may coincide with a center C of the second image plane. The coordinate y2 may be shifted from a center C of the first image plane by an offset distance Δ.

Figure 23:
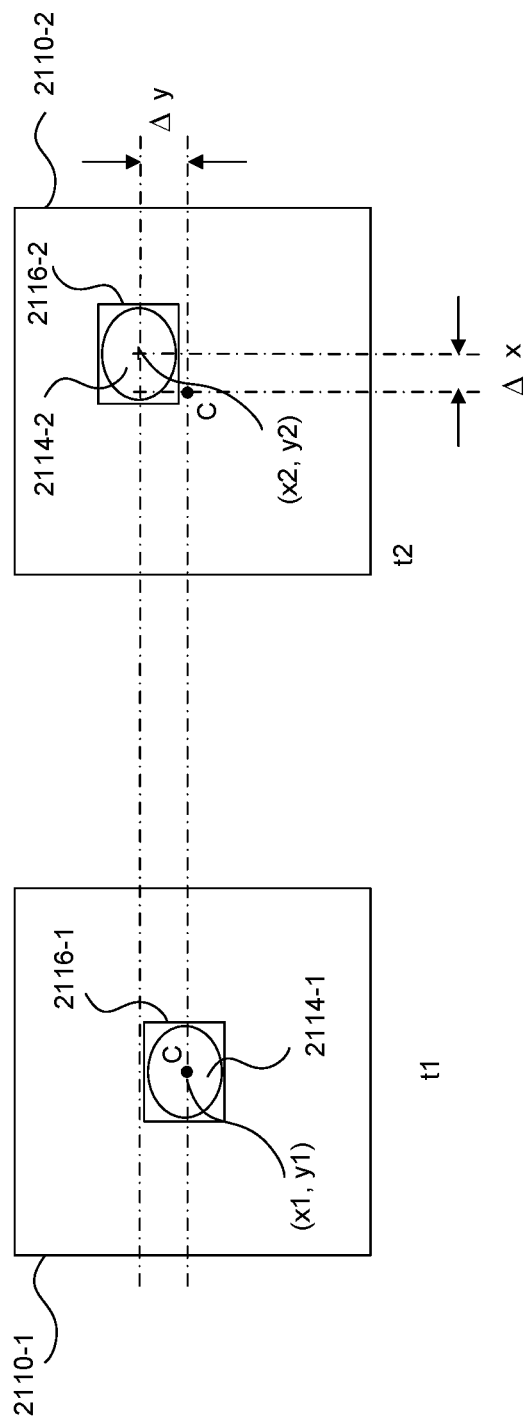
FIG. 23 illustrates the change in position of a bounding box in a plurality of image frames when a tracking device changes its orientation in a yaw direction and a pitch direction relative to a target object, in accordance with some embodiments.

In some embodiments, the change in orientation of the tracking device may include a rotation of the tracking device in both a yaw direction (Z-axis) and a pitch direction (Y-axis). For example, as shown in FIG. 23, the coordinate y2 may be shifted from the center C of the second image plane by an offset distance Δy, and the coordinate x2 may be shifted from the center C of the second image plane by an offset distance Δx. The offset distance Δy may be caused by the rotation of the tracking device about the pitch axis, and the offset distance Δx may be caused by the rotation of the tracking device about the yaw axis.

The feedback control systems of FIG. 12 can be configured to obtain the expected rotating angular speed based on a change in one or more characteristics associated with one or more features. For example, the expected rotating angular speed may be obtained based on the offset distance Δ along the u and/or v axes of the image frames or image planes. The feedback control system may be configured to obtain the expected rotating angular speed by minimizing the change in position (positional offset) of the bounding box between image frames. The feedback control system may be further configured to adjust movement of the tracking device based on the expected rotating angular speed to track the target object. For example, the feedback control system may effect a change in orientation of the tracking device (e.g., about a yaw, roll, and/or pitch axis) according to the expected rotating angular speed to track the target object.

The expected rotating angular speed may be obtained by minimizing a positional error using the feedback control loop. The positional error may be calculated based on a change in position of a bounding box between the first image frame and the second image frame in FIGS. 21, 22, and 23. The change in position of the bounding box may be determined relative to a reference point within the first image frame and the second image frame. The expected rotating angular speed may be obtained by minimizing the difference between the positions of the bounding box at times t1 and t2 using the feedback control loop. As previously described in FIGS. 21, 22, and 23, the change in position of the bounding box may be associated with the offset distance Δ. The offset distance Δ may be along the u and/or v axes of the image frames or image planes. The input to the system may comprise a threshold positional offset. In some cases, the threshold positional offset may be zero or substantially zero, in order to minimize the offset distance Δ. When the threshold positional offset is zero, the system may adjust the movement (e.g., rotation about a yaw, roll, and/or pitch axis) of the tracking device such that the bounding box maintains substantially a same position across the image frames.

Figure 22:
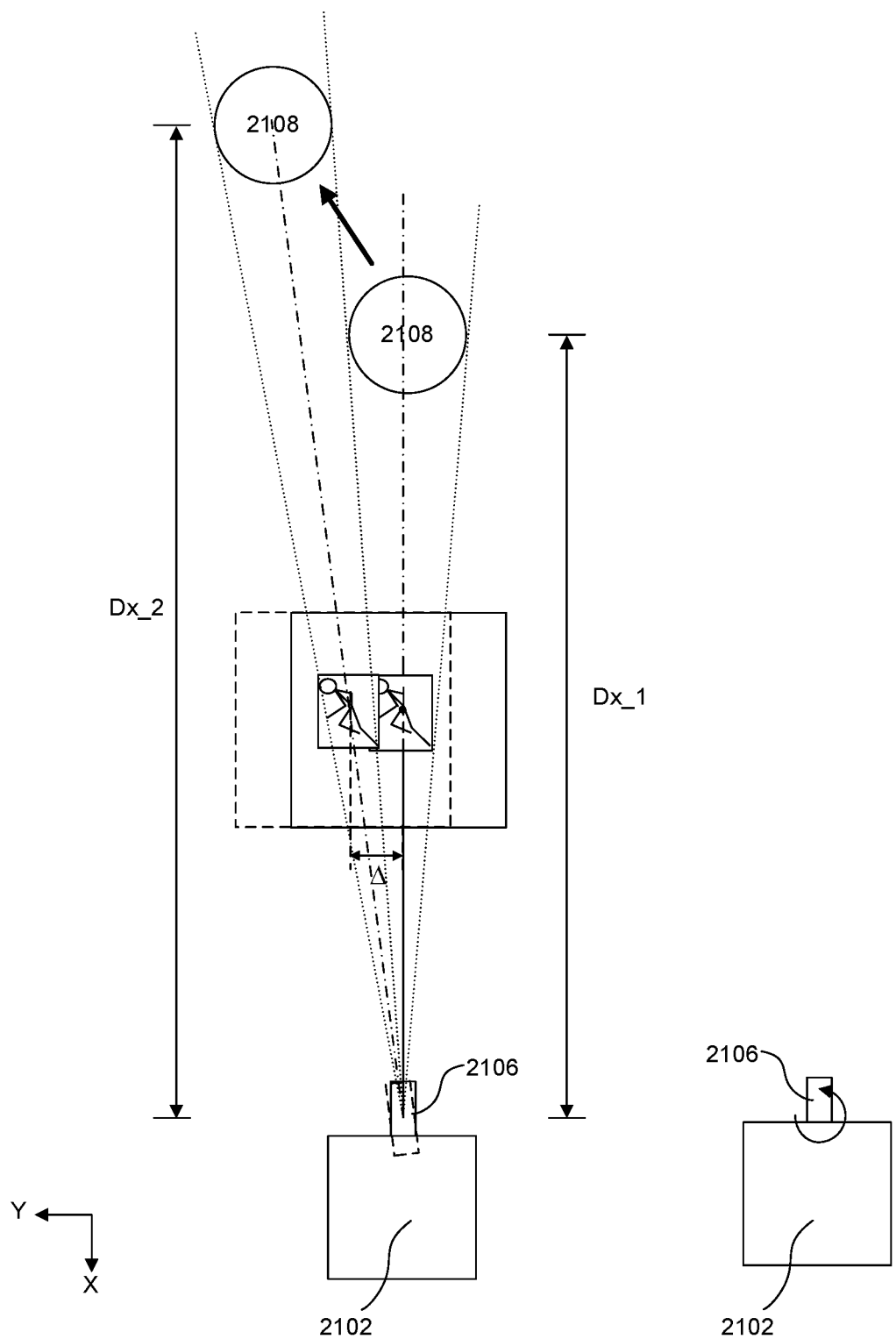
FIG. 22 illustrates a different visual depiction of the embodiment of FIG. 21, in accordance with some embodiments.

The imaging device may be configured to capture image data (e.g., the first and second image frames in FIGS. 21, 22, and 23). The image data may be provided to the image analyzer. The image analyzer may be configured to analyze the image data to determine the change in position of the bounding box (offset distance Δ) between image frames. The change in position of the bounding box may be compared against the input, and provided to the feedback controller.

Next, the feedback controller may use a proportional-integral-derivative (PID) method (or a proportional-derivative (PD) method) to minimize the offset distance Δ, thereby obtaining the expected rotating angular speed. The expected rotating angular speed may be provided to the actuation system. The actuation system may be configured to adjust the movement of the tracking device about an axis (e.g., a yaw, roll, and/or pitch axis) based on the expected rotating angular speed, so as to track the target object. By adjusting the movement of the tracking device based on the expected rotating angular speed, the bounding box can maintain substantially the same position across image frames. The adjusted movement of the tracking device may correspond to a motion output of the feedback control system. The above steps may be repeated iteratively in a closed loop until the offset distance Δ is equal to or less than the threshold positional offset. The expected rotating angular speed may dynamically change during the one or more iterations in the above steps.

In the above example, the offset distance Δ may be used to determine the expected rotating angular speed of the tracking device in order to track the target object. However, the disclosure is not limited thereto. As one of ordinary skill in the art would appreciate, the offset distance Δ can also be used to calculate a third velocity component Vt'. Unlike the first velocity component Vt which is in the X-direction, the third velocity component Vt' may be in a Y-direction. Accordingly, the movement of the tracking device may also be adjusted along the Y-direction to track the target object. For example, the feedback controller may be configured to calculate a positional error d_error4 in the bounding box at time t2 using the following equation:

$$d\_error4 = \tan(\Delta y \cdot p) \cdot Dz$$

where Δy is the offset distance along a v-axis in the second image frame, p is an angle represented by each pixel in the second image frame, and Dz corresponds to a vertical distance along the Z-axis between the tracking device and the target object.

Next, the feedback controller may use a proportional-integral-derivative (PID) method (or a proportional-derivative (PD) method) to minimize d_error4, thereby obtaining the third velocity component Vt'. The third velocity component Vt' may be provided to the actuation system. The actuation system may be configured to adjust the movement of the tracking device along a predefined axis (e.g., Y-axis) based on the third velocity component Vt', so as to track the target object. By adjusting the movement of the tracking device based on the third velocity component Vt', the bounding box can maintain substantially the same position across image frames. The adjusted movement of the tracking device may correspond to a motion output of the feedback control system. The above steps may be repeated iteratively in a closed loop until the positional error d_error4 is equal to or less than the threshold positional offset. The third velocity component Vt' may dynamically change during the one or more iterations in the above steps.

As previously described, the offset distance δ may be used to determine the first velocity component Vt. In some embodiments, the offset distance δ can also be used to calculate an expected gimbal pitch angle θ', so as to control the pitch angle of the tracking device. In those embodiments, the expected velocity vector along the predefined axis (e.g., X-axis) may be obtained by taking a difference between a current gimbal pitch angle and an initial gimbal pitch angle as an error amount, and minimizing the error amount to obtain the expected gimbal pitch angle θ', so as to implement tracking of the target object.

In some embodiments, the feedback control systems of FIGS. 9, 12, 14, and 18, and 20 may comprise one or more filters for filtering the image data. The filters may be applied to reduce noise in the image data. The filters may comprise one or more first-order filters. In some embodiments, the filters may include one or more higher order complex filters such as finite-impulse-response (FIR) filters or infinite-impulse-response (IIR) filters. For example, the filters may include a Kalman filter or a Parks-McClellan filter. In some instances, the image of the target object may not lie completely within the first bounding box in the first image frame, and/or a center of the first bounding box may not be aligned with a center of the image of the target object in the first image frame. Likewise, in some instances, the image of the target object may not lie completely within the second bounding box in the second image frame, and/or a center of the second bounding box is not aligned with a center of the image of the target object in the second image frame. In those instances, the one or more filters may be applied to the image data when minimizing the positional offset and/or the distance error to respectively obtain the first velocity component and the second velocity component. The one or more filters may be applied to compensate for the offset between the first bounding box and an image of the target object in the first image frame, and/or the offset between the second bounding box and an image of the target object in the second image frame.

The systems, devices, and methods described herein can be applied to a wide variety of movable objects. A movable object may serve as a tracking device or constitute part of a tracking device. As previously mentioned, any description herein of an aerial vehicle may apply to and be used for any movable object. A movable object of the present disclosure can be configured to move within any suitable environment, such as in air (e.g., a fixed-wing aircraft, a rotary-wing aircraft, or an aircraft having neither fixed wings nor rotary wings), in water (e.g., a ship or a submarine), on ground (e.g., a motor vehicle, such as a car, truck, bus, van, motorcycle; a movable structure or frame such as a stick, fishing pole; or a train), under the ground (e.g., a subway), in space (e.g., a spaceplane, a satellite, or a probe), or any combination of these environments. The movable object can be a vehicle, such as a vehicle described elsewhere herein. In some embodiments, the movable object can be mounted on a living subject, such as a human or an animal. Suitable animals can include avines, canines, felines, equines, bovines, ovines, porcines, delphines, rodents, or insects.

The movable object may be capable of moving freely within the environment with respect to six degrees of freedom (e.g., three degrees of freedom in translation and three degrees of freedom in rotation). Alternatively, the movement of the movable object can be constrained with respect to one or more degrees of freedom, such as by a predetermined path, track, or orientation. The movement can be actuated by any suitable actuation mechanism, such as an engine or a motor. The actuation mechanism of the movable object can be powered by any suitable energy source, such as electrical energy, magnetic energy, solar energy, wind energy, gravitational energy, chemical energy, nuclear energy, or any suitable combination thereof. The movable object may be self-propelled via a propulsion system, as described elsewhere herein. The propulsion system may optionally run on an energy source, such as electrical energy, magnetic energy, solar energy, wind energy, gravitational energy, chemical energy, nuclear energy, or any suitable combination thereof. Alternatively, the movable object may be carried by a living being.

In some instances, the movable object can be a vehicle. Suitable vehicles may include water vehicles, aerial vehicles, space vehicles, or ground vehicles. For example, aerial vehicles may be fixed-wing aircraft (e.g., airplane, gliders), rotary-wing aircraft (e.g., helicopters, rotorcraft), aircraft having both fixed wings and rotary wings, or aircraft having neither (e.g., blimps, hot air balloons). A vehicle can be self-propelled, such as self-propelled through the air, on or in water, in space, or on or under the ground. A self-propelled vehicle can utilize a propulsion system, such as a propulsion system including one or more engines, motors, wheels, axles, magnets, rotors, propellers, blades, nozzles, or any suitable combination thereof. In some instances, the propulsion system can be used to enable the movable object to take off from a surface, land on a surface, maintain its current position and/or orientation (e.g., hover), change orientation, and/or change position.

The movable object can be controlled remotely by a user or controlled locally by an occupant within or on the movable object. In some embodiments, the movable object is an unmanned movable object, such as a UAV. An unmanned movable object, such as a UAV, may not have an occupant onboard the movable object. The movable object can be controlled by a human or an autonomous control system (e.g., a computer control system), or any suitable combination thereof. The movable object can be an autonomous or semi-autonomous robot, such as a robot configured with an artificial intelligence.

The movable object can have any suitable size and/or dimensions. In some embodiments, the movable object may be of a size and/or dimensions to have a human occupant within or on the vehicle. Alternatively, the movable object may be of size and/or dimensions smaller than that capable of having a human occupant within or on the vehicle. The movable object may be of a size and/or dimensions suitable for being lifted or carried by a human. Alternatively, the movable object may be larger than a size and/or dimensions suitable for being lifted or carried by a human. In some instances, the movable object may have a maximum dimension (e.g., length, width, height, diameter, diagonal) of less than or equal to about: 2 cm, 5 cm, 10 cm, 50 cm, 1 m, 2 m, 5 m, or 10 m. The maximum dimension may be greater than or equal to about: 2 cm, 5 cm, 10 cm, 50 cm, 1 m, 2 m, 5 m, or 10 m. For example, the distance between shafts of opposite rotors of the movable object may be less than or equal to about: 2 cm, 5 cm, 10 cm, 50 cm, 1 m, 2 m, 5 m, or 10 m. Alternatively, the distance between shafts of opposite rotors may be greater than or equal to about: 2 cm, 5 cm, 10 cm, 50 cm, 1 m, 2 m, 5 m, or 10 m.

In some embodiments, the movable object may have a volume of less than 100 cm×100 cm×100 cm, less than 50 cm×50 cm×30 cm, or less than 5 cm×5 cm×3 cm. The total volume of the movable object may be less than or equal to about: 1 cm$^3$, 2 cm$^3$, 5 cm$^3$, 10 cm$^3$, 20 cm$^3$, 30 cm$^3$, 40 cm$^3$, 50 cm$^3$, 60 cm$^3$, 70 cm$^3$, 80 cm$^3$, 90 cm$^3$, 100 cm$^3$, 150 cm$^3$, 200 cm$^3$, 300 cm$^3$, 500 cm$^3$, 750 cm$^3$, 1000 cm$^3$, 5000 cm$^3$, 10,000 cm$^3$, 100,000 cm$^3$, 1 m$^3$, or 10 m$^3$. Conversely, the total volume of the movable object may be greater than or equal to about: 1 cm$^3$, 2 cm$^3$, 5 cm$^3$, 10 cm$^3$, 20 cm$^3$, 30 cm$^3$, 40 cm$^3$, 50 cm$^3$, 60 cm$^3$, 70 cm$^3$, 80 cm$^3$, 90 cm$^3$, 100 cm$^3$, 150 cm$^3$, 200 cm$^3$, 300 cm$^3$, 500 cm$^3$, 750 cm$^3$, 1000 cm$^3$, 5000 cm$^3$, 10,000 cm$^3$, 100,000 cm$^3$, 1 m$^3$, or 10 m$^3$.

In some embodiments, the movable object may have a footprint (which may refer to the lateral cross-sectional area encompassed by the movable object) less than or equal to about: 32,000 cm$^2$, 20,000 cm$^2$, 10,000 cm$^2$, 1,000 cm$^2$, 500 cm$^2$, 100 cm$^2$, 50 cm$^2$, 10 cm$^2$, or 5 cm$^2$. Conversely, the footprint may be greater than or equal to about: 32,000 cm$^2$, 20,000 cm$^2$, 10,000 cm$^2$, 1,000 cm$^2$, 500 cm$^2$, 100 cm$^2$, 50 cm$^2$, 10 cm$^2$, or 5 cm$^2$.

In some instances, the movable object may weigh no more than 1000 kg. The weight of the movable object may be less than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg. Conversely, the weight may be greater than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg.

In some embodiments, a movable object may be small relative to a load carried by the movable object. The load may include a payload and/or a carrier, as described in further detail below. In some examples, a ratio of a movable object weight to a load weight may be greater than, less than, or equal to about 1:1. In some instances, a ratio of a movable object weight to a load weight may be greater than, less than, or equal to about 1:1. Optionally, a ratio of a carrier weight to a load weight may be greater than, less than, or equal to about 1:1. When desired, the ratio of an movable object weight to a load weight may be less than or equal to: 1:2, 1:3, 1:4, 1:5, 1:10, or even less. Conversely, the ratio of a movable object weight to a load weight can also be greater than or equal to: 2:1, 3:1, 4:1, 5:1, 10:1, or even greater.

In some embodiments, the movable object may have low energy consumption. For example, the movable object may use less than about: 5 W/h, 4 W/h, 3 W/h, 2 W/h, 1 W/h, or less. In some instances, a carrier of the movable object may have low energy consumption. For example, the carrier may use less than about: 5 W/h, 4 W/h, 3 W/h, 2 W/h, 1 W/h, or less. Optionally, a payload of the movable object may have low energy consumption, such as less than about: 5 W/h, 4 W/h, 3 W/h, 2 W/h, 1 W/h, or less.

In some embodiments, a UAV can include a propulsion system having a plurality of rotors. Any number of rotors may be provided (e.g., one, two, three, four, five, six, or more). The rotors, rotor assemblies, or other propulsion systems of the unmanned aerial vehicle may enable the unmanned aerial vehicle to hover/maintain position, change orientation, and/or change location. The distance between shafts of opposite rotors can be any suitable length. For example, the length can be less than or equal to 2 m, or less than equal to 5 m. In some embodiments, the length can be within a range from 40 cm to 1 m, from 10 cm to 2 m, or from 5 cm to 5 m. Any description herein of a UAV may apply to a movable object, such as a movable object of a different type, and vice versa.

In some embodiments, the movable object can be configured to carry a load. The load can include one or more of passengers, cargo, equipment, instruments, and the like. The load can be provided within a housing. The housing may be separate from a housing of the movable object, or be part of a housing for an movable object. Alternatively, the load can be provided with a housing while the movable object does not have a housing. Alternatively, portions of the load or the entire load can be provided without a housing. The load can be rigidly fixed relative to the movable object. Optionally, the load can be movable relative to the movable object (e.g., translatable or rotatable relative to the movable object).

In some embodiments, the load includes a payload. The payload can be configured not to perform any operation or function. Alternatively, the payload can be a payload configured to perform an operation or function, also known as a functional payload. For example, the payload can include one or more sensors for surveying one or more targets. Any suitable sensor can be incorporated into the payload, such as an image capture device (e.g., a camera), an audio capture device (e.g., a parabolic microphone), an infrared imaging device, or an ultraviolet imaging device. The sensor can provide static sensing data (e.g., a photograph) or dynamic sensing data (e.g., a video). In some embodiments, the sensor provides sensing data for the target of the payload. Alternatively or in combination, the payload can include one or more emitters for providing signals to one or more targets. Any suitable emitter can be used, such as an illumination source or a sound source. In some embodiments, the payload includes one or more transceivers, such as for communication with a module remote from the movable object. Optionally, the payload can be configured to interact with the environment or a target. For example, the payload can include a tool, instrument, or mechanism capable of manipulating objects, such as a robotic arm.

Optionally, the load may include a carrier. The carrier can be provided for the payload and the payload can be coupled to the movable object via the carrier, either directly (e.g., directly contacting the movable object) or indirectly (e.g., not contacting the movable object). Conversely, the payload can be mounted on the movable object without requiring a carrier. The payload can be integrally formed with the carrier. Alternatively, the payload can be releasably coupled to the carrier. In some embodiments, the payload can include one or more payload elements, and one or more of the payload elements can be movable relative to the movable object and/or the carrier, as described above.

The carrier can be integrally formed with the movable object. Alternatively, the carrier can be releasably coupled to the movable object. The carrier can be coupled to the movable object directly or indirectly. The carrier can provide support to the payload (e.g., carry at least part of the weight of the payload). The carrier can include a suitable mounting structure (e.g., a gimbal platform) capable of stabilizing and/or directing the movement of the payload. In some embodiments, the carrier can be adapted to control the state of the payload (e.g., position and/or orientation) relative to the movable object. For example, the carrier can be configured to move relative to the movable object (e.g., with respect to one, two, or three degrees of translation and/or one, two, or three degrees of rotation) such that the payload maintains its position and/or orientation relative to a suitable reference frame regardless of the movement of the movable object. The reference frame can be a fixed reference frame (e.g., the surrounding environment). Alternatively, the reference frame can be a moving reference frame (e.g., the movable object, a payload target).

In some embodiments, the carrier can be configured to permit movement of the payload relative to the carrier and/or movable object. The movement can be a translation with respect to up to three degrees of freedom (e.g., along one, two, or three axes) or a rotation with respect to up to three degrees of freedom (e.g., about one, two, or three axes), or any suitable combination thereof.

In some instances, the carrier can include a carrier frame assembly and a carrier actuation assembly. The carrier frame assembly can provide structural support to the payload. The carrier frame assembly can include individual carrier frame components, some of which can be movable relative to one another. The carrier actuation assembly can include one or more actuators (e.g., motors) that actuate movement of the individual carrier frame components. The actuators can permit the movement of multiple carrier frame components simultaneously, or may be configured to permit the movement of a single carrier frame component at a time. The movement of the carrier frame components can produce a corresponding movement of the payload. For example, the carrier actuation assembly can actuate a rotation of one or more carrier frame components about one or more axes of rotation (e.g., roll axis, pitch axis, or yaw axis). The rotation of the one or more carrier frame components can cause a payload to rotate about one or more axes of rotation relative to the movable object. Alternatively or in combination, the carrier actuation assembly can actuate a translation of one or more carrier frame components along one or more axes of translation, and thereby produce a translation of the payload along one or more corresponding axes relative to the movable object.

In some embodiments, the movement of the movable object, carrier, and payload relative to a fixed reference frame (e.g., the surrounding environment) and/or to each other, can be controlled by a terminal. The terminal can be a remote control device at a location distant from the movable object, carrier, and/or payload. The terminal can be disposed on or affixed to a support platform. Alternatively, the terminal can be a handheld or wearable device. For example, the terminal can include a smartphone, tablet, laptop, computer, glasses, gloves, helmet, microphone, or suitable combinations thereof. The terminal can include a user interface, such as a keyboard, mouse, joystick, touchscreen, or display. Any suitable user input can be used to interact with the terminal, such as manually entered commands, voice control, gesture control, or position control (e.g., via a movement, location or tilt of the terminal).

The terminal can be used to control any suitable state of the movable object, carrier, and/or payload. For example, the terminal can be used to control the position and/or orientation of the movable object, carrier, and/or payload relative to a fixed reference from and/or to each other. In some embodiments, the terminal can be used to control individual elements of the movable object, carrier, and/or payload, such as the actuation assembly of the carrier, a sensor of the payload, or an emitter of the payload. The terminal can include a wireless communication device adapted to communicate with one or more of the movable object, carrier, or payload.

The terminal can include a suitable display unit for viewing information of the movable object, carrier, and/or payload. For example, the terminal can be configured to display information of the movable object, carrier, and/or payload with respect to position, translational velocity, translational acceleration, orientation, angular velocity, angular acceleration, or any suitable combinations thereof. In some embodiments, the terminal can display information provided by the payload, such as data provided by a functional payload (e.g., images recorded by a camera or other image capturing device).

Optionally, the same terminal may both control the movable object, carrier, and/or payload, or a state of the movable object, carrier and/or payload, as well as receive and/or display information from the movable object, carrier and/or payload. For example, a terminal may control the positioning of the payload relative to an environment, while displaying image data captured by the payload, or information about the position of the payload. Alternatively, different terminals may be used for different functions. For example, a first terminal may control movement or a state of the movable object, carrier, and/or payload while a second terminal may receive and/or display information from the movable object, carrier, and/or payload. For example, a first terminal may be used to control the positioning of the payload relative to an environment while a second terminal displays image data captured by the payload. Various communication modes may be utilized between a movable object and an integrated terminal that both controls the movable object and receives data, or between the movable object and multiple terminals that both control the movable object and receives data. For example, at least two different communication modes may be formed between the movable object and the terminal that both controls the movable object and receives data from the movable object.

Figure 24:
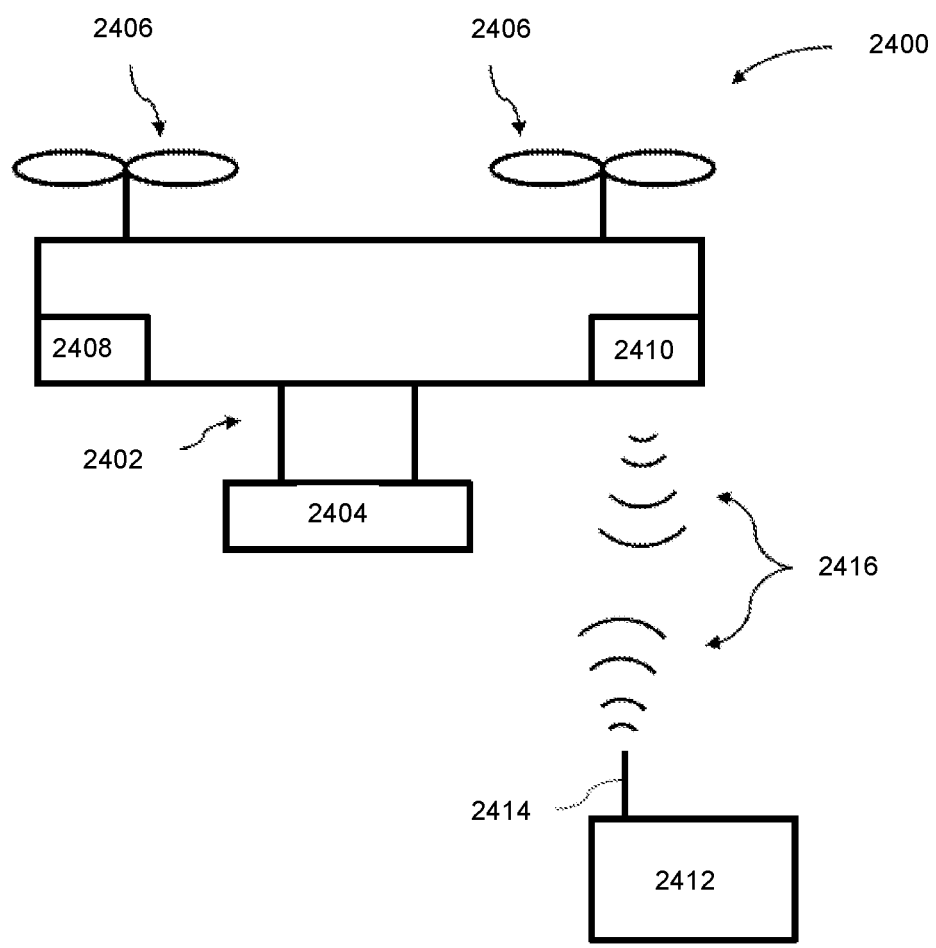
FIG. 24 is a schematic block diagram of a system for controlling a tracking device, in accordance with some embodiments.

FIG. 24 illustrates a movable object 2400 including a carrier 2402 and a payload 2404, in accordance with embodiments. Although the movable object 2400 is depicted as an aircraft, this depiction is not intended to be limiting, and any suitable type of movable object can be used, as previously described herein. One of skill in the art would appreciate that any of the embodiments described herein in the context of aircraft systems can be applied to any suitable movable object (e.g., an UAV). In some instances, the payload 2404 may be provided on the movable object 2400 without requiring the carrier 2402. The movable object 2400 may include propulsion mechanisms 2406, a sensing system 2408, and a communication system 2410.

The propulsion mechanisms 2406 can include one or more of rotors, propellers, blades, engines, motors, wheels, axles, magnets, or nozzles, as previously described. For example, the propulsion mechanisms 2406 may be self-tightening rotors, rotor assemblies, or other rotary propulsion units, as disclosed elsewhere herein. The movable object may have one or more, two or more, three or more, or four or more propulsion mechanisms. The propulsion mechanisms may all be of the same type. Alternatively, one or more propulsion mechanisms can be different types of propulsion mechanisms. The propulsion mechanisms 2406 can be mounted on the movable object 2400 using any suitable means, such as a support element (e.g., a drive shaft) as described elsewhere herein. The propulsion mechanisms 2406 can be mounted on any suitable portion of the movable object 2400, such on the top, bottom, front, back, sides, or suitable combinations thereof.

In some embodiments, the propulsion mechanisms 2406 can enable the movable object 2400 to take off vertically from a surface or land vertically on a surface without requiring any horizontal movement of the movable object 2400 (e.g., without traveling down a runway). Optionally, the propulsion mechanisms 2406 can be operable to permit the movable object 2400 to hover in the air at a specified position and/or orientation. One or more of the propulsion mechanisms 2400 may be controlled independently of the other propulsion mechanisms. Alternatively, the propulsion mechanisms 2400 can be configured to be controlled simultaneously. For example, the movable object 2400 can have multiple horizontally oriented rotors that can provide lift and/or thrust to the movable object. The multiple horizontally oriented rotors can be actuated to provide vertical takeoff, vertical landing, and hovering capabilities to the movable object 2400. In some embodiments, one or more of the horizontally oriented rotors may spin in a clockwise direction, while one or more of the horizontally rotors may spin in a counterclockwise direction. For example, the number of clockwise rotors may be equal to the number of counterclockwise rotors. The rotation rate of each of the horizontally oriented rotors can be varied independently in order to control the lift and/or thrust produced by each rotor, and thereby adjust the spatial disposition, velocity, and/or acceleration of the movable object 2400 (e.g., with respect to up to three degrees of translation and up to three degrees of rotation).

The sensing system 2408 can include one or more sensors that may sense the spatial disposition, velocity, and/or acceleration of the movable object 2400 (e.g., with respect to up to three degrees of translation and up to three degrees of rotation). The one or more sensors can include global positioning system (GPS) sensors, motion sensors, inertial sensors, proximity sensors, or image sensors. The sensing data provided by the sensing system 2408 can be used to control the spatial disposition, velocity, and/or orientation of the movable object 2400 (e.g., using a suitable processing unit and/or control module, as described below). Alternatively, the sensing system 2408 can be used to provide data regarding the environment surrounding the movable object, such as weather conditions, proximity to potential obstacles, location of geographical features, location of manmade structures, and the like.

The communication system 2410 enables communication with terminal 2412 having a communication system 2414 via wireless signals 2416. The communication systems 2410, 2414 may include any number of transmitters, receivers, and/or transceivers suitable for wireless communication. The communication may be one-way communication, such that data can be transmitted in only one direction. For example, one-way communication may involve only the movable object 2400 transmitting data to the terminal 2412, or vice-versa. The data may be transmitted from one or more transmitters of the communication system 2410 to one or more receivers of the communication system 2412, or vice-versa. Alternatively, the communication may be two-way communication, such that data can be transmitted in both directions between the movable object 2400 and the terminal 2412. The two-way communication can involve transmitting data from one or more transmitters of the communication system 2410 to one or more receivers of the communication system 2414, and vice-versa.

In some embodiments, the terminal 2412 can provide control data to one or more of the movable object 2400, carrier 2402, and payload 2404 and receive information from one or more of the movable object 2400, carrier 2402, and payload 2404 (e.g., position and/or motion information of the movable object, carrier or payload; data sensed by the payload such as image data captured by a payload camera). In some instances, control data from the terminal may include instructions for relative positions, movements, actuations, or controls of the movable object, carrier and/or payload. For example, the control data may result in a modification of the location and/or orientation of the movable object (e.g., via control of the propulsion mechanisms 2406), or a movement of the payload with respect to the movable object (e.g., via control of the carrier 2402). The control data from the terminal may result in control of the payload, such as control of the operation of a camera or other image capturing device (e.g., taking still or moving pictures, zooming in or out, turning on or off, switching imaging modes, change image resolution, changing focus, changing depth of field, changing exposure time, changing viewing angle or field of view). In some instances, the communications from the movable object, carrier and/or payload may include information from one or more sensors (e.g., of the sensing system 2408 or of the payload 2404). The communications may include sensed information from one or more different types of sensors (e.g., GPS sensors, motion sensors, inertial sensor, proximity sensors, or image sensors). Such information may pertain to the position (e.g., location, orientation), movement, or acceleration of the movable object, carrier and/or payload. Such information from a payload may include data captured by the payload or a sensed state of the payload. The control data provided transmitted by the terminal 2412 can be configured to control a state of one or more of the movable object 2400, carrier 2402, or payload 2404. Alternatively or in combination, the carrier 2402 and payload 2404 can also each include a communication module configured to communicate with terminal 2412, such that the terminal can communicate with and control each of the movable object 2400, carrier 2402, and payload 2404 independently.

In some embodiments, the movable object 2400 can be configured to communicate with another remote device in addition to the terminal 2412, or instead of the terminal 2412. The terminal 2412 may also be configured to communicate with another remote device as well as the movable object 2400. For example, the movable object 2400 and/or terminal 2412 may communicate with another movable object, or a carrier or payload of another movable object. When desired, the remote device may be a second terminal or other computing device (e.g., computer, laptop, tablet, smartphone, or other mobile device). The remote device can be configured to transmit data to the movable object 2400, receive data from the movable object 2400, transmit data to the terminal 2412, and/or receive data from the terminal 2412. Optionally, the remote device can be connected to the Internet or other telecommunications network, such that data received from the movable object 2400 and/or terminal 2412 can be uploaded to a website or server.

In some embodiments, a system for controlling a movable object may be provided in accordance with embodiments. The system can be used in combination with any suitable embodiment of the systems, devices, and methods disclosed herein. The system can include a sensing module, processing unit, non-transitory computer readable medium, control module, and communication module.

The sensing module can utilize different types of sensors that collect information relating to the movable objects in different ways. Different types of sensors may sense different types of signals or signals from different sources. For example, the sensors can include inertial sensors, GPS sensors, proximity sensors (e.g., lidar), or vision/image sensors (e.g., a camera). The sensing module can be operatively coupled to a processing unit having a plurality of processors. In some embodiments, the sensing module can be operatively coupled to a transmission module (e.g., a Wi-Fi image transmission module) configured to directly transmit sensing data to a suitable external device or system. For example, the transmission module can be used to transmit images captured by a camera of the sensing module to a remote terminal.

The processing unit can have one or more processors, such as a programmable processor (e.g., a central processing unit (CPU)). The processing unit can be operatively coupled to a non-transitory computer readable medium. The non-transitory computer readable medium can store logic, code, and/or program instructions executable by the processing unit for performing one or more steps. The non-transitory computer readable medium can include one or more memory units (e.g., removable media or external storage such as an SD card or random access memory (RAM)). In some embodiments, data from the sensing module can be directly conveyed to and stored within the memory units of the non-transitory computer readable medium. The memory units of the non-transitory computer readable medium can store logic, code and/or program instructions executable by the processing unit to perform any suitable embodiment of the methods described herein. For example, the processing unit can be configured to execute instructions causing one or more processors of the processing unit to analyze sensing data produced by the sensing module. The memory units can store sensing data from the sensing module to be processed by the processing unit. In some embodiments, the memory units of the non-transitory computer readable medium can be used to store the processing results produced by the processing unit.

In some embodiments, the processing unit can be operatively coupled to a control module configured to control a state of the movable object. For example, the control module can be configured to control the propulsion mechanisms of the movable object to adjust the spatial disposition, velocity, and/or acceleration of the movable object with respect to six degrees of freedom. Alternatively or in combination, the control module can control one or more of a state of a carrier, payload, or sensing module.

The processing unit can be operatively coupled to a communication module configured to transmit and/or receive data from one or more external devices (e.g., a terminal, display device, or other remote controller). Any suitable means of communication can be used, such as wired communication or wireless communication. For example, the communication module can utilize one or more of local area networks (LAN), wide area networks (WAN), infrared, radio, WiFi, point-to-point (P2P) networks, telecommunication networks, cloud communication, and the like. Optionally, relay stations, such as towers, satellites, or mobile stations, can be used. Wireless communications can be proximity dependent or proximity independent. In some embodiments, line-of-sight may or may not be required for communications. The communication module can transmit and/or receive one or more of sensing data from the sensing module, processing results produced by the processing unit, predetermined control data, user commands from a terminal or remote controller, and the like.

The components of the system can be arranged in any suitable configuration. For example, one or more of the components of the system can be located on the movable object, carrier, payload, terminal, sensing system, or an additional external device in communication with one or more of the above. In some embodiments, one or more of the plurality of processing units and/or non-transitory computer readable media can be situated at different locations, such as on the movable object, carrier, payload, terminal, sensing module, additional external device in communication with one or more of the above, or suitable combinations thereof, such that any suitable aspect of the processing and/or memory functions performed by the system can occur at one or more of the aforementioned locations.

As used herein A and/or B encompasses one or more of A or B, and combinations thereof such as A and B. It will be understood that although the terms "first," "second," "third" etc. may be used herein to describe various elements, components, regions and/or sections, these elements, components, regions and/or sections should not be limited by these terms. These terms are merely used to distinguish one element, component, region or section from another element, component, region or section. Thus, a first element, component, region or section discussed below could be termed a second element, component, region or section without departing from the teachings of the present disclosure.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," or "includes" and/or "including," when used in this specification, specify the presence of stated features, regions, integers, steps, operations, elements and/or components, but do not preclude the presence or addition of one or more other features, regions, integers, steps, operations, elements, components and/or groups thereof.

Furthermore, relative terms, such as "lower" or "bottom" and "upper" or "top" may be used herein to describe one element's relationship to other elements as illustrated in the figures. It will be understood that relative terms are intended to encompass different orientations of the elements in addition to the orientation depicted in the figures. For example, if the element in one of the figures is turned over, elements described as being on the "lower" side of other elements would then be oriented on the "upper" side of the other elements. The exemplary term "lower" can, therefore, encompass both an orientation of "lower" and "upper," depending upon the particular orientation of the figure. Similarly, if the element in one of the figures were turned over, elements described as "below" or "beneath" other elements would then be oriented "above" the other elements. The exemplary terms "below" or "beneath" can, therefore, encompass both an orientation of above and below.

While some embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure. Numerous different combinations of embodiments described herein are possible, and such combinations are considered part of the present disclosure. In addition, all features discussed in connection with any one embodiment herein can be readily adapted for use in other embodiments herein. It is intended that the following claims define the scope of the invention and that methods and structures within the scope of these claims and their equivalents be covered thereby.

What is claimed is:

1. A method for controlling a movable object to track a target object, comprising:
    determining a change in one or more features between a first image frame and a second image frame, including determining a change associated with a bounding box between the first image and the second image, the first image frame and the second image frame being captured at different points in time using an imaging device on the movable object, and the change associated with the bounding box including at least one of an offset distance associated with the bounding box or a change in height of the bounding box;
    obtaining at least one of a first velocity component, a second velocity component, or an expected velocity vector, wherein:
        the first velocity component is obtained based on the offset distance and a vertical distance between the tracking device and the target object;
        the second velocity component is obtained based on the height of the bounding box and a height of the target object; and
        the expected velocity is obtained based on the first velocity component, the second velocity component, and an orientation of the imaging device;
    adjusting a movement of the movable object with respect to the target object according to one of the first velocity component, the second velocity component, or the expected velocity vector, such that the movable object adjusts the movement according to the first velocity component to track the target object vertically with respect to the target object, adjusts the movement according to the second velocity component to track the target object with a same horizontal level with the target object, and adjusts the movement according to the expected velocity component to track the target object from an inclined angle with respect to the target object.

2. The method of claim 1, wherein the change in the one or more features comprises at least one of:
    a change in size of the one or more features between the first image frame and the second image frame, or
    a change in position of the one or more features between the first image frame and the second image frame.

3. The method of claim 1, further comprising one of:
    adjusting an orientation of the imaging device based on the change in the one or more features between the first image frame and the second image frame;
    adjusting an orientation of the imaging device relative to the target object based on the change in the one or more features; and
    adjusting the movement of the movable object relative to the target object based on the change in the one or more features.

4. The method of claim 1, wherein the change in the one or more features comprises the change in size of the bounding box between the first image frame and the second image frame, the change in size of the bounding box including the change in height of the bounding box.

5. The method of claim 4, further comprising:
    determining a change in distance between the movable object and the target object, based on the change in height of the bounding box; and
    controlling a relative movement between the movable object and the target object based on the change in distance.

6. The method of claim 1, wherein the change in the one or more features comprises the change in position of the bounding box between the first image frame and the second image frame, the change in position of the bounding box including the offset distance associated with the bounding box.

7. The method of claim 6, further comprising:
    measuring the change in position of the bounding box relative to a reference point within the first image frame and the second image frame, the reference point including an optical axis of the imaging device.

8. The method of claim 7, further comprising:
    determining the offset distance between the reference point and a datum point associated with the bounding box, based on the change in position of the bounding box, the datum point, associated with the bounding box, including a center of the bounding box.

9. The method of claim 8, further comprising:
controlling a relative movement between the movable object and the target object based on the offset distance between the reference point and the datum point.

10. The method of claim 8, wherein the offset distance is generated as the target object moves towards or away from the movable object.

11. The method of claim 1, further comprising:
obtaining an expected rotating angular speed based on the at least one of the rotational velocity component, the first velocity component, or the second velocity component; and
adjusting the movement of the movable object based on the expected velocity vector and the expected rotating angular speed.

12. The method of claim 11, further comprising:
obtaining a first displacement based on a change in position of the one or more features;
obtaining a second displacement based on a change in size of the one or more features;
combining the first displacement and the second displacement to obtain a combined displacement; and
minimizing a change in the combined displacement to obtain the expected velocity vector.

13. The method of claim 12, wherein:
the change in position of the one or more features is associated with a relative movement between the movable object and the target object in a first direction; and
the change in size of the one or more features is associated with a relative movement between the movable object and the target object in a second direction.

14. The method of claim 11, further comprising:
fusing the first velocity component and the second velocity component to obtain the expected velocity vector.

15. The method of claim 14, wherein the change in position of the one or more features is associated with a relative movement between the movable object and the target object in a first direction.

16. The method of claim 15, wherein the change in size of the one or more features is associated with a relative movement between the movable object and the target object in a second direction along an optical axis of the imaging device.

17. The method of claim 16, wherein the expected velocity vector extends in a third direction that is different from the first direction and the second direction.

18. A non-transitory computer-readable medium storing instructions that, when executed, causes a computer to perform a method for controlling a movable object to track a target object, the method comprising:
determining a change in one or more features between a first image frame and a second image frame, including determining a change associated with a bounding box between the first image and the second image, the first image frame and the second image frame being captured at different points in time using an imaging device on the movable object, and the change associated with the bounding box including at least one of an offset distance associated with the bounding box or a change in height of the bounding box;
obtaining at least one of a first velocity component, a second velocity component, or an expected velocity vector, wherein:
the first velocity component is obtained based on the offset distance and a vertical distance between the tracking device and the target object;
the second velocity component is obtained based on the height of the bounding box and a height of the target object; and
the expected velocity is obtained based on the first velocity component, the second velocity component, and an orientation of the imaging device; and
adjusting a movement of the movable object with respect to the target object according to one of the first velocity component, the second velocity component, or the expected velocity vector, such that the movable object adjusts the movement according to the first velocity component to track the target object vertically with respect to the target object, adjust the movement according to the second velocity component to track the target object with a same horizontal level with the target object, and adjusts the movement according to the expected velocity component to track the target object from an inclined angle with respect to the target object.

19. An unmanned aerial vehicle (UAV) system comprising:
an imaging device configured to capture a first image frame and a second image frame at different points in time; and
an apparatus operable to control the UAV to track a target object, the apparatus comprising one or more processors that are, individually or collectively, configured to:
determine a change in one or more features between the first image frame and the second image frame, including determining a change associated with a bounding box between the first image and the second image, and the change associated with the bounding box including at least one of an offset distance associated with the bounding box or a change in height of the bounding box;
obtain at least one of a first velocity component, a second velocity component, or an expected velocity vector, wherein:
the first velocity component is obtained based on the offset distance and a vertical distance between the tracking device and the target object;
the second velocity component is obtained based on the height of the bounding box and a height of the target object; and
the expected velocity is obtained based on the first velocity component, the second velocity component, and an orientation of the imaging device; and
adjust a movement of the UAV with respect to the target object according to one of the first velocity component, the second velocity component, or the expected velocity vector, such that the movable object adjusts the movement according to the first velocity component to track the target object vertically with respect to the target object, adjusts the movement according to the second velocity component to track the target object with a same horizontal level with the target object, and adjusts the movement according to the expected velocity component to track the target object from an inclined angle with respect to the target object.

* * * * *